(12) United States Patent
Kajiwara

(10) Patent No.: US 6,819,041 B2
(45) Date of Patent: Nov. 16, 2004

(54) LUMINESCENCE CRYSTAL PARTICLE, LUMINESCENCE CRYSTAL PARTICLE COMPOSITION, DISPLAY PANEL AND FLAT-PANEL DISPLAY

(75) Inventor: Kazuo Kajiwara, Tokyo (JP)

(73) Assignee: Sony Corporation (JP)

( * ) Notice: Subject to any disclaimer, the term of this patent is extended or adjusted under 35 U.S.C. 154(b) by 268 days.

(21) Appl. No.: 09/789,603

(22) Filed: Feb. 22, 2001

(65) Prior Publication Data

US 2001/0024084 A1 Sep. 27, 2001

(30) Foreign Application Priority Data

Feb. 25, 2000 (JP) ..................................... P2000-048666

(51) Int. Cl.$^7$ ............................................... H01J 9/227
(52) U.S. Cl. .............................. 313/496; 252/301.4 H; 252/301.4 R
(58) Field of Search .................. 252/301.4 R, 301.4 H; 313/496

(56) References Cited

U.S. PATENT DOCUMENTS

| | | | | |
|---|---|---|---|---|
| 3,596,095 A | * | 7/1971 | Leach ..................... | 250/461.1 |
| 4,081,398 A | * | 3/1978 | Hase et al. ............ | 252/301.4 R |
| 4,152,623 A | * | 5/1979 | Kagami et al. .............. | 313/495 |
| 4,275,333 A | * | 6/1981 | Kagami et al. ........ | 252/301.4 F |
| 4,857,799 A | * | 8/1989 | Spindt et al. ................ | 313/309 |
| 5,015,912 A | * | 5/1991 | Spindt et al. ................ | 313/309 |
| 5,137,847 A | * | 8/1992 | Shimakura et al. .......... | 438/745 |
| 5,441,788 A | * | 8/1995 | Bloomquist et al. ........ | 428/65.6 |
| 5,448,133 A | * | 9/1995 | Ise ............................... | 313/308 |
| 5,558,554 A | * | 9/1996 | Finklea et al. ............... | 313/495 |
| 5,608,554 A | * | 3/1997 | Do et al. ........................ | 349/61 |
| 5,653,619 A | * | 8/1997 | Cloud et al. ................... | 445/24 |
| 5,695,685 A | * | 12/1997 | Chau .................... | 252/301.4 R |
| 5,728,623 A | * | 3/1998 | Mori ........................... | 438/455 |
| 5,851,428 A | * | 12/1998 | Matsuda et al. ....... | 252/301.4 R |
| 5,958,296 A | * | 9/1999 | Do et al. ................ | 252/301.4 R |
| 5,977,697 A | * | 11/1999 | Jin et al. ..................... | 313/310 |
| 5,985,173 A | | 11/1999 | Gray et al. | |
| 6,013,199 A | * | 1/2000 | McFarland et al. ... | 252/301.4 R |
| 6,013,979 A | * | 1/2000 | Picht et al. .................. | 313/467 |

FOREIGN PATENT DOCUMENTS

JP        5-144570        6/1993

OTHER PUBLICATIONS

Leverenz, "An Introduction to Luminescence of Solids 1950", Chapman & Hall, Ltd., p. 88–90.*
EPO Search Report dated Feb. 10, 2003.

* cited by examiner

Primary Examiner—Alan Cariaso
Assistant Examiner—Dalei Dong
(74) Attorney, Agent, or Firm—Rader, Fishman & Grauer PLLC; Ronald P. Kananen

(57) ABSTRACT

A luminescence crystal particle which emits light upon irradiation with an energy beam and which has a crystal defect density of $5\times10^7$ defects/cm$^2$ or less in a region located from the surface of the luminescence crystal particle to a portion as deep as the energy beam reaches.

16 Claims, 35 Drawing Sheets

IRRADIATION OF ULTRAVIOLET RAY

[STEP-100]

[STEP-110]

[STEP-120]

[STEP-120] CONTINUED

[STEP-200]

[STEP-210]

[STEP-220]

[STEP-230]

[STEP-240]

[STEP-240]

[STEP-300]

[STEP-310]

[STEP-330]

[STEP-400]

[STEP-410]

[STEP-410] CONTINUED

[STEP-520]

[STEP-530]

[STEP-530] CONTINUED

[STEP-540]

[STEP-600]

[STEP-620]

[STEP-630]

[STEP-800]

[STEP-810]

[STEP-820]

[STEP-840]

[STEP-850]

[STEP-900]

[STEP-910]

[STEP-920]

[STEP-1000]

[STEP-1010]

[STEP-1020]

[STEP-1120]

[STEP-1130]

[STEP-1140]

[STEP-1150]

[STEP-1200]

[STEP-1210]

[STEP-1220]

LUMINESCENCE CRYSTAL PARTICLE, LUMINESCENCE CRYSTAL PARTICLE COMPOSITION, DISPLAY PANEL AND FLAT-PANEL DISPLAY

BACKGROUND OF THE INVENTION AND RELATED ART STATEMENT

The present invention relates to a luminescence crystal particle which emits light upon irradiation with an energy beam, a luminescence crystal particle composition, a display panel constituted of such luminescence crystal particles and a flat-panel display having such a display panel.

As an image display device that can be substituted for a currently mainstream cathode ray tube (CRT), flat-screen (flat-panel) displays are studied in various ways. Such fat-panel displays include a liquid crystal display (LCD), an electroluminescence display (ELD) and a plasma display (PDP). There has been also proposed a cold cathode field emission display capable of emitting electrons into a vacuum from a solid without relying on thermal excitation, a so-called field emission display (FED), and it attracts attention from the viewpoint of the brightness of a display screen and low power consumption.

FIG. 1 shows a typical constitution of the cold cathode field emission display. In this display, a display panel 20 and a back panel 10 are placed so as to face each other, and these two panels 10 and 20 are bonded to each other through a frame (not shown) in their circumferential portions. A space closed with these two panels forms a vacuum space. The back panel 10 has cold cathode field emission devices (to be referred to as "field emission devices" hereinafter) as electron-emitting elements. One example shown in FIG. 1 is a so-called Spindt-type field emission device having a conical electron-emitting portion 16. The Spindt-type field emission device comprises a stripe-shaped cathode electrode 12 formed on a substrate 11; an insulating layer 13 formed on the cathode electrode 12 and the substrate 11; a stripe-shaped gate electrode 14 formed on the insulating layer 13; and a conical electron-emitting portion 16 formed in an opening portion 15 formed in the gate electrode 14 and the insulating layer 13. The electron-emitting portion 16 is formed on a portion of the cathode electrode 12 which portion is positioned in a bottom portion of the opening portion 15. Generally, a number of such electron-emitting portions 16 are formed to correspond to one of phosphor layers 22 to be described later. A relatively negative voltage (video signal) is applied to the electron-emitting portion 16 from a cathode electrode driving circuit 31 through the cathode electrode 12, and a negatively positive voltage (scanning signal) is applied to the gate electrode 14 from a gate electrode driving circuit 32. An electric field is generated due to the application of these voltages, and due to the electric field, electrons are emitted from the top end of the electron-emitting portion 16 on the basis of a quantum tunnel effect. The electron-emitting element shall not be limited to the above Spindt-type field emission device, and field emission devices of other types such as edge-type, flat-type or crown-type field emission devices are used in some cases. Further, reversibly, the scanning signal may be inputted to the cathode electrode 12, and the video signal may be inputted to the gate electrode 14.

The display panel 20 has a plurality of phosphor layers 22 which are formed on a support member 21 made of glass or the like and have the form of dots or stripes, and an anode electrode 24 made of an electrically conductive reflection film formed on the phosphor layers 22 and the support member 21. A positive voltage higher than the positive voltage applied to the gate electrode 14 is applied to the anode electrode 24 from an accelerating power source (anode electrode driving circuit) 33, and it works to guide electrons emitted from the electron-emitting portion 16 to the vacuum space toward the phosphor layer 22. Further, the anode electrode 24 functions to protect the phosphor particles constituting the phosphor layer 22 from sputtering by particles such as ions, functions to reflect light emitted from the phosphor layers 22 on the basis of electron excitation to the side of the support member 21 to improve the brightness of a display screen observed from an outside of the support member 21, and functions to prevent excess charge to stabilize the potential of the display panel 20. That is, the anode electrode 24 not only carries out its function as an anode electrode but also carries out the function of a member known as a metal back layer in the field of a cathode ray tube (CRT). The anode electrode 24 is generally constituted of a thin aluminum film. A black matrix 23 is formed between one phosphor layer 22 and another phosphor layer 22.

FIG. 2A shows a schematic plan view of the display panel having phosphor layers 22R, 22G and 22B formed in the form of dots, and FIG. 2B shows a schematic partial cross-sectional view taken along a line X—X in FIG. 2A. A region where the phosphor layers 22R, 22G and 22B are arranged is an effective field which carries out a practical function, and a region where the anode electrode is formed is nearly in agreement with the effective field. For clear showing in FIG. 2A, the region where the anode electrode is formed is provided with slanting lines. A circumferential region to the effective field is an ineffective field for supporting the function of the effective field, where peripheral circuits are formed and a display screen is mechanically supported.

In the cold cathode field emission display, the anode electrode is not necessarily required to be constituted of the anode electrode 24 made of an electrically conductive reflection film. It may be constituted of an anode electrode 25 made of a transparent electrically conductive film formed on the support member 21, as is shown in FIG. 2C which is a schematic partial cross-sectional view similarly taken along a line X—X in FIG. 2A. On the support member 21, each of the anode electrodes 24 and 25 is formed nearly on the entire surface of the effective field.

FIG. 3A shows a schematic plan view of the display panel having the phosphor layers 22R, 22G and 22B formed in the form of stripes, and FIGS. 3B and 3C show schematic partial cross-sectional views taken along a line X—X in FIG. 3A. In FIGS. 3A, 3B and 3C, the same portions as those in FIGS. 2A, 2B and 2C are shown by the same reference numerals, and detailed explanations of the same portions are omitted. FIG. 3B shows a constitution in which the anode electrode 24 is made of an electrically conductive reflection film, and FIG. 3C shows a constitution in which the anode electrode 25 is made of a transparent electrically conductive film. Each of the anode electrodes 24 and 25 is formed nearly on the entire surface of the effective field of the display panel.

In the cold cathode field emission display that is a flat-panel display, the flying distance of electrons is far smaller than the counterpart in a cathode ray tube, so that it is difficult to increase an electron-accelerating voltage to the level of an electron-accelerating voltage in the cathode ray tube. In the cold cathode field emission display, if the electron-accelerating voltage is too high, spark discharge is liable to take place between the electron-emitting portion in the back panel and the film which functions as an anode electrode in the display panel, and the display quality of the cold cathode field emission display may be impaired to a great extent. The accelerating voltage is therefore controlled to be approximately 10 kilovolts or lower.

In addition to the above problem, the cold cathode field emission display for which it is required to select the above low electron-accelerating voltage involves characteristic problems from which the cathode ray tube is free. In a cathode ray tube permitting the acceleration at a high voltage, electrons enter the phosphor layers deep, so that the electron energy is received in a relatively broad region inside the phosphor layers to excite a relatively large number of phosphor particles present in such a broad region at once, and high brightness can be attained. When the accelerating voltage is set at 31.5 kilovolts and when the phosphor layer is made of ZnS, Monte Carlo simulation is conducted with regard to a relationship between an energy loss of electrons which have entered the phosphor layer and the electron penetration depth into the phosphor layer on the basis of the Bethe expression represented by the following equation (1) (see "practical Scanning Electron Microscopy", J. I. Goldstein and H. Yokowitz, p 50, Plenun Press, New York (1975)). FIG. 32 shows the result thereof. It is seen from FIG. 32 that when the accelerating voltage is 31.5 kilovolts, the peak of electron energy loss is positioned approximately 1 $\mu$m apart from the surface of the phosphor layer. Further, electrons enter approximately 5 $\mu$m deep from the surface of the phosphor layer.

$$-(dE_m/dX)=2\pi e^4 N_0(Z/A)(\rho/E_m)1n(1.166Em/J) \quad (1)$$

In the cold cathode field emission display, however, the accelerating voltage is required to be approximately 10 kilovolts or lower, for example, approximately 6 kilovolts. When the accelerating voltage is set at 6 kilovolts and when the phosphor layer is made of ZnS, Monte Carlo simulation is conducted with regard to a relationship between an energy loss of electrons which have entered the phosphor layer and the electron penetration depth into the phosphor layer on the basis of the above Bethe expression, and FIGS. 33 and 34 show the results. In FIG. 33, a 0.045 $\mu$m thick aluminum thin film is formed on the surface of the phosphor layer, and in FIG. 34, a 0.07 $\mu$m thick aluminum thin film is formed on the surface of the phosphor layer. FIGS. 33 and 34 show that the peak of electron energy loss is positioned near the outermost surface of the phosphor layer. Further, electrons enter only approximately 0.2 to 0.3 $\mu$m deep from the surface of the phosphor layer. In the cold cathode field emission display in which the accelerating voltage is lower than that in the cathode ray tube, the electron penetration depth into the phosphor layer is small, and the electron energy is received only in a narrow region of the phosphor layer (particularly, only near the surface of the phosphor layer).

In the phosphor layer, further, 10% of the energy of electrons contributes to light emission, and the remaining approximately 90% of the energy is converted to heat. That is, heat is generated greatly near the surface of the phosphor layer. As a result, when the phosphor layer is constituted of phosphor particles made of a sulfide, sulfur that is a component therefore is dissociated in the form of a single atom or in the form of sulfur monoxide (SO) or sulfur dioxide ($SO_2$), and the phosphor particles made of a sulfide alter in composition or a luminescence center disappears. When the accelerating voltage is set at 6 kilovolts and when the phosphor layer is made of ZnS, Monte Carlo simulation is conducted with regard to a relationship between an energy loss of electrons which have entered the phosphor layer and the electron penetration depth into the phosphor layer on the basis of the above Bethe expression, and FIG. 35 shows the result thereof. In FIG. 35, it is assumed that a 0.07 $\mu$m thick aluminum thin film is formed on the surface of the phosphor layer and that Zn is formed due to dissociation of sulfur (S) from ZnS in a thickness ranging from the surface of the phosphor layer to a portion approximately 0.03 $\mu$m deep from the surface. FIG. 35 clearly shows that the peak of electron energy loss is positioned in a region of the phosphor layer which region is made of Zn due to the dissociation of sulfur (S) from ZnS. Further, electrons reaches only approximately 0.2 $\mu$m deep from the surface of the phosphor layer.

In the cold cathode field emission display, further, the position in the phosphor layer (more specifically, phosphor particles) with which position electrons emitted from one field emission device collide is generally constant unlike the cathode ray tube. Therefore, the phosphor particles with which the electrons collide constantly is deteriorated greatly as compared with other phosphor particles, and the phosphor particles are deteriorated faster that the counterpart in the cathode ray tube.

Further, the outermost surface of the phosphor particle suffers various strains during the processes of producing the phosphor particles and producing the display panel and is liable to have lattice defects. Moreover, it is required to drive the cold cathode field emission display at a higher current density (emitted-electron density) than the cathode ray tube for attaining desired brightness. For example, a current density in the cathode ray tube is 0.1 to 1 $\mu A/cm^2$, while the cold cathode field emission display requires a current density of as high as 5 to 10 $\mu A/cm^2$. It is therefore required to operate the outermost surface of the phosphor particle or a portion nearby under high-excitation conditions. While the cold cathode field emission display is operated, crystal defects are liable to be formed or multiplied newly in the phosphor particle, which is considered to cause the brightness deterioration to proceed faster.

The above-explained deterioration of the phosphor layer or the phosphor particles results in the fluctuation of emitted-light color and luminescence efficiency, the contamination of internal components of the cold cathode field emission display and a consequent decrease in reliability and lifetime characteristics of the cold cathode field emission display. It is therefore strongly desired to develop a phosphor layer or phosphor particles free from deterioration for improving the cold cathode field emission display in reliability and lifetime characteristics.

For attaining finer display with a cathode ray tube, it is required to decrease a diameter of an electron beam that collides with the phosphor layer. That is, it is required to increase the current density of the electron beam that collides with the phosphor layer. In this method, however, the phosphor particles that emit light in green are particularly liable to be damaged, and such a phenomenon leads to the generation of a magenta ring. The above magenta ring refers to a phenomenon in which the phosphor particles that emit light in red and light in blue are scarcely damaged, and in the cathode ray tube, a magenta color that is a complementary color to green is observed in the form of a ring. In the conventional cathode ray tube, the current density of the electron beam that collides with the phosphor layer and the lifetime of the cathode ray tube are inversely proportional to each other. For preventing a decrease in the lifetime of the cathode ray tube while increasing the current density of the electron beam that collides with the phosphor layer, it is strongly desired to develop a phosphor layer or phosphor particles which is/are deteriorated to a less degree.

OBJECT AND SUMMARY OF THE INVENTION

It is therefore an object of the present invention to provide luminescence crystal particles that are deteriorated to a less degree even in use for a long period of time, namely, that suffer a decrease in brightness to a less degree, a display panel constituted of such luminescence crystal particles, a flat-panel display having such a display panel, and a luminescence crystal particle composition.

According to the present invention, the above object can be achieved by a luminescence crystal particle which emits light upon irradiation with an energy beam and which has a crystal defect density of $5 \times 10^7$ defects/cm$^2$ or less in a region located from the surface of the luminescence crystal particle to a portion as deep as the energy beam reaches.

The luminescence crystal particle of the present invention or a luminescence crystal particle composition to be described later can be used for constituting, for example, a cold cathode field emission display or the front panel (anode panel) thereof; a commercial (home-use), industrial (for example, a computer display), digital broadcasting or a projection type cathode ray tube or a face plate thereof; or a plasma display or a rear panel thereof. The rear panel for an AC driven or DC driven plasma display comprises, for example, a support member; separation walls (ribs) formed on the support member; various electrodes (for example, data electrode) formed on the support member located between one separation wall and another separation wall; and a luminescence layer made of the luminescence crystal particles formed between one separation wall and another separation wall. The front panel (anode panel) of the cold cathode field emission display and the face plate of the cathode ray tube will be discussed later.

According to the present invention, the above object can be also achieved by a display panel comprising a support member, a luminescence layer made of luminescence crystal particles which emit light upon irradiation with electrons flying from a vacuum space, and an electrode, said luminescence crystal particle having a crystal defect density of $5 \times 10^7$ defects/cm$^2$ or less in a region located from the surface of the luminescence crystal particle to a portion as deep as the electrons reach.

The display of the present invention includes a so-called face plate of a commercial (home-use), industrial (computer display), digital broadcasting or projection type cathode ray tube; or a front panel (anode panel) for a cold cathode field emission display. The face plate for a cathode ray tube generally comprises a glass panel (corresponding to the support member of the display panel of the present invention); luminescence layers made of the luminescence crystal particles and formed on an inner surface of the glass panel in the form of stripes or dots; a black matrix formed on the inner surface of the glass panel between one luminescence layer and another luminescence layer; and a metal back layer (corresponding to the electrode of the display panel of the present invention) formed on the luminescence layers and the black matrix. The front panel (anode panel) of a cold cathode field emission display comprises a support member; luminescence layers made of the luminescence crystal particles and formed in the form of stripes or dots (luminescence layers which are patterned in the form of stripes or dots and correspond to three primary colors, red (R), green (G) and blue (B), and are alternately arranged for a color display); and an anode electrode (corresponding to the electrode of the display panel of the present invention). A black matrix may be formed between one luminescence layer and another luminescence layer.

Further, according to the present invention, the above object can be achieved by a flat-panel display having a display panel and a back panel having a plurality of electron-emitting regions, wherein the display and the back panel face each other through a vacuum space, said display panel comprising a support member, a luminescence layer made of luminescence crystal particles which emit light upon irradiation with electrons flying from the electron-emitting region, and an electrode, and said luminescence crystal particle having a crystal defect density of $5 \times 10^7$ defects/cm$^2$ or less in a region located from the surface of the luminescence crystal particle to a portion as deep as the electrons reach.

The display panel of the flat-panel display of the present invention includes the front panel (anode panel) of the above cold cathode field emission display.

In the display panel of the present invention or the display panel of the flat-panel display of the present invention, the luminescence layer can be formed by a screen printing method or a slurry method. In the screen printing method, the luminescence crystal particle composition of the present invention to be described later is printed on the support member (on the electrode and the support member in some cases), the applied composition is dried and calcined, whereby the luminescence layer can be formed. In the slurry method, the luminescence crystal particle composition of the present invention containing a photosensitive polymer and being in the state of a slurry is applied to the support member (to the electrode and the support member in some cases), and then, the photosensitive polymer is insolubilized to a developer solution by exposure to light, whereby the luminescence layer can be formed. For displaying three primary colors of (R,G,B), three luminescence crystal particle compositions or three slurries are consecutively used, and the luminescence layers for emitting light in such three colors can be formed by the screen printing method or the slurry method.

According to the present invention, the above object can be achieved by a luminescence crystal particle composition comprising a dispersion of luminescence crystal particles which emit light upon irradiation with an energy beam and each of which has a crystal defect density of $5 \times 10^7$ defects/cm$^2$ or less in a region located from the surface of the luminescence crystal particle to a portion as deep as the energy beam reaches, in a dispersing medium.

In the luminescence crystal particle composition of the present invention, water can be used as a dispersing medium. The luminescence crystal particle composition of the present invention may contain polyvinyl alcohol as a dispersing agent or a retaining agent, and ammonium bichromate may be used as a photosensitive polymer. The luminescence crystal particles of the present invention may be surface-treated for improving the dispersing property and adhesion thereof.

In the luminescence crystal particle, the display panel, the flat-panel display or the luminescence crystal particle composition (these will be sometimes referred to as "the present invention" hereinafter), more preferably, the crystal defect density in a region located from the surface of the luminescence crystal particle to a portion as deep as the energy beam reaches or the electrons reach is $1 \times 10^7$ defects/cm$^2$ or less. The above crystal defect includes dislocation, stacking fault and twin boundary.

The energy beam or electron penetration depth from the surface of each luminescence crystal particle can be determined by assuming the energy of an energy beam or electrons and a material constituting the luminescence crystal particles and carrying out Monte Carlo simulation of the energy loss of the energy beam or the electrons which has/have entered each luminescence crystal particle and the energy beam or electron penetration depth in the luminescence crystal particle on the basis of the above Bethe expression. In the simulation, it is assumed that the electrons lose their energy of an average of approximately 43 eV (mean free path of approximately 4.8 nm) per scattering and halt after they undergo elastic scattering 150 times.

Further, the crystal defect density of crystal defects such as dislocations, stacking faults and twin boundaries can be determined by observing the luminescence crystal particle (s) through a transmission electron microscope, counting crystal defects in an area having a size of 5 $\mu$m×5 $\mu$m in the luminescence crystal particle and converting the counted number to a density per $cm^2$.

In the present invention, the luminescence crystal particle includes a phosphor particle. The blue-emitting phosphor particle includes ZnS:Ag, ZnS:Ag,Al and ZnZ:Ag,Cl. The green-emitting phosphor particle includes $Zn_2SiO_4:Mn^{2+}$, (Zn,Cd)S:Ag, (Zn,Cd)S:Cu and ZnS:Cu,Al. The red-emitting phosphor particle includes $Zn_3(PO_4)_2:Mn^{2+}$, (Zn,Cd)S:Ag, $YVO_4:Eu^{3+}$, $Y_2O_2S:Eu^{3+}$ and $Y_2O_3:Eu^{3+}$. Further, the reddish orange-emitting phosphor particle includes $Y_2O_2S:Eu^{3+}$, and the marine blue-emitting phosphor particle includes ZnS:Ag.

In the luminescence crystal particle or the luminescence crystal particle composition of the present invention, an electron beam can be used as an energy beam. The energy of the electron beam for irradiation of the luminescence crystal particle is preferably set at 0.5 keV to 35 keV. In the above constitution, specifically, the luminescence crystal particle can be used for constituting a cold cathode field emission display or a front panel (anode panel) thereof, a commercial (home-use), industrial (for example, computer display), digital broadcasting or projection type cathode ray tube or a face plate thereof. Otherwise, there may be employed a constitution in which the energy of the electron beam for irradiation of the luminescence crystal particle is 0.5 keV to 10 keV and the electron penetration depth from the surface of the luminescence crystal particle is 0.5 $\mu$m or less. In the above constitution, specifically, the luminescence crystal particle can be used for constituting a cold cathode field emission display or a front panel (anode panel) therefore. Otherwise, in the luminescence crystal particle of the present invention, an ultraviolet ray can be used as an energy beam. In this case, preferably, the ultraviolet ray for irradiation of the luminescence crystal particle has a wavelength of 100 nm to 400 nm. In the above constitution, specifically, the luminescence crystal particle can be used for constituting a plasma display or a rear panel therefore.

In the present invention, desirably, the average particle diameter of the luminescence crystal particles is $1\times10^{-8}$ m to $1\times10^{-5}$ m, preferably $1\times10^{-6}$ m to $1\times10^{-5}$ m, more preferably $4\times10^{-6}$ m to $8\times10^{-6}$ m. The luminescence crystal particles can be measured for an average particle diameter $D_{50}$ according to a light scattering method or a Coulter counter method. Preferably, the luminescence crystal particle has an average surface roughness of 5 nm or less. The average surface roughness is defined to be that which is obtained by observing the luminescence crystal particle through a transmission electron microscope, measuring concave and convex portions of the luminescence crystal particle, determining level differences between bottom positions of the convex portions where the surface changes from the concave portions to the convex portions and peak positions where the surface changes from convex portions to the concave portions and further determining an average of the level differences as an average surface roughness.

The flat-panel display of the present invention can have a structure in which each electron-emitting region comprises one cold cathode field emission device or a plurality of cold cathode field emission devices, said cold cathode field emission device comprises;

(A) a substrate, (B) a stripe-shaped cathode electrode formed on the substrate, (C) an insulating layer formed on the substrate and the cathode electrode, (D) a stripe-shaped gate electrode formed on the insulating layer, (E) an opening portion penetrating through the gate electrode and the insulating layer, and (F) an electron-emitting portion formed on a portion of the cathode electrode which portion is positioned in the bottom portion of the opening portion, and the electron-emitting portion exposed in the bottom portion of the opening portion is for emitting electrons.

The above structure will be referred to a cold cathode field emission device having a first structure. The type of the above cold cathode field emission device includes a Spindt-type cold cathode field emission device (cold cathode field emission device having a conical electron-emitting portion formed on a portion of the cathode electrode which portion is positioned in the bottom portion of the opening portion), a crown-type cold cathode field emission device (cold cathode field emission device having a crown-shaped electron-emitting portion formed on a portion of the cathode electrode which portion is positioned in the bottom portion of the opening portion), and a plane-type cold cathode field emission device (cold cathode field emission device having a nearly flat electron-emitting portion formed on a portion of the cathode electrode which portion is positioned in the bottom portion of the opening portion).

Otherwise, the flat-panel display of the present invention can have a structure in which each electron-emitting region comprises one cold cathode field emission device or a plurality of cold cathode field emission devices, said cold cathode field emission device comprises;

(A) a substrate, (B) a stripe-shaped cathode electrode formed on the substrate, (C) an insulating layer formed on the substrate and the cathode electrode, (D) a stripe-shaped gate electrode formed on the insulating layer, and (E) an opening portion penetrating through the gate electrode and the insulating layer, the cathode electrode being exposed in the bottom portion of the opening portion, and the portion of the cathode electrode which portion is exposed in the bottom portion of the opening portion is for emitting electrons.

The above structure will be referred to as a cold cathode field emission device having a second structure. The type of the above cold cathode field emission device includes a flat-type cold cathode field emission device which emits electrons from the flat surface of the cathode electrode and a crater-type cold cathode field emission device which emits electrons from a convex portion of the surface of the cathode electrode having convexo-concave form.

Further, the flat-panel display of the present invention can have a structure in which each electron-emitting region comprises one cold cathode field emission device or a plurality of cold cathode field emission devices, said cold cathode field emission device comprises;
(A) a substrate,
(B) a stripe-shaped cathode electrode having an edge portion formed on or above the substrate,
(C) an insulating layer formed at least on the cathode electrode,
(D) a stripe-shaped gate electrode formed on the insulating layer, and
(E) an opening portion penetrating through at least the gate electrode and the insulating layer, and
the edge portion of the cathode electrode which edge portion is exposed in the bottom portion or the side wall of the opening portion is for emitting electrons.

The above structure will be referred to as a cold cathode field emission device having a third structure or an edge-type cold cathode field emission device.

In the cold cathode field emission device having the first, second or third structure, the material for constituting the gate electrode includes at least one metal selected from the group consisting of tungsten (W), niobium (Nb), tantalum (Ta), titanium (Ti), molybdenum (Mo), chromium (Cr), aluminum (Al), copper (Cu), gold (Au), silver (Ag), nickel (Ni), cobalt (Co), zirconium (Zr), iron (Fe), platinum (Pt) and zinc (Zn); alloys or compounds containing these metal elements (for example, nitrides such as TiN and silicides such as $WSi_2$, $MoSi_2$, $TiSi_2$ and $TaSi_2$); semiconductors such as silicon (Si); and electrically conductive metal oxides such as ITO (indium tin oxide), indium oxide and zinc oxide. The gate electrode can be made by forming a thin layer made of the above material on the insulating layer by a known thin film forming method such as a CVD method, a sputtering method, a vapor deposition method, an ion plating method, an electrolytic plating method, an electroless plating method, a screen printing method, a laser abrasion method or a sol-gel method. When the thin film is formed on the entire surface of the insulating layer, the thin film is patterned by a known patterning method to form the gate electrode in the form of a stripe. The opening portion may be formed in the gate electrode after the gate electrode in the form of a strip is formed, or the opening portion may be formed concurrently with the formation of the gate electrode in the form of a stripe. A patterned resist may be formed on the insulating layer in advance of the formation of the thin film, the gate electrode in the form of a stripe can be formed by a lift-off method. Further, vapor deposition may be carried out using a mask having openings conforming to the gate electrodes, or screen printing may be carried out with a screen having such openings. In these cases, no patterning is required after the formation of the thin film. Further, the gate electrode can be formed on the insulating layer by preparing an opening-portion-possessing stripe-shaped thin layer (foil) made of an electrically conductive material in advance and fixing such a thin layer on the insulating layer.

In the cold cathode field emission device having the first structure of a Spindt-type cold cathode field emission device, the material for constituting an electron-emitting portion can be made of at least one material selected from the group consisting of tungsten, a tungsten alloy, molybdenum, a molybdenum alloy, titanium, a titanium alloy, niobium, a niobium alloy, tantalum, a tantalum alloy, chromium, a chromium alloy and impurity-containing silicon (polysilicon or amorphous silicon).

In the cold cathode field emission device having the first structure of a crown-type cold cathode field emission device, the material for constituting an electron-emitting portion includes electrically conductive particles and a combination of electrically conductive particles with a binder. The material of the electrically conductive particles includes carbon-containing materials such as graphite; refractory metals such as tungsten (W), niobium (Nb), tantalum (Ta), titanium (Ti), molybdenum (Mo) and chromium (Cr); and transparent electrically conductive materials such as ITO (indium tin oxide). The binder includes glass such as water glass and general purpose resins. Examples of the general purpose resins include thermoplastic resins such as a vinyl chloride resin, a polyolefin resin, a polyamide resin, a cellulose ester resin and a fluorine resin, and thermosetting resins such as an epoxy resin, an acrylic resin and a polyester resin. For improving electron emission efficiency, preferably, the particle size of the electrically conductive particles is sufficiently small as compared with dimensions of the electron-emitting portion. Although not specially limited, the form of the electrically conductive particles is spherical, polyhedral, plate-like, acicular, columnar or amorphous. Preferably, the electrically conductive particles have such a form that exposed portions of the particles form acute projections. Electrically conductive particles having different dimensions and different forms may be used as a mixture.

In the cold cathode field emission device having the first structure of a plane-type cold cathode field emission device, preferably, the electron-emitting portion is made of a material having a smaller work function $\Phi$ than a material for constituting a cathode electrode. The material for constituting an electron-emitting portion can be selected on the basis of the work function of a material for constituting a cathode electrode, a potential difference between the gate electrode and the cathode electrode, a required current density of emitted electrons, and the like. Typical examples of the material for constituting a cathode electrode of the cold cathode field emission device include tungsten ($\Phi$=4.55 eV), niobium ($\Phi$=4.02–4.87 eV), molybdenum ($\Phi$=4.53–4.95 eV), aluminum ($\Phi$=4.28 eV), copper ($\Phi$=4.6 eV), tantalum ($\Phi$=4.3 eV), chromium ($\Phi$=4.5 eV) and silicon ($\Phi$=4.9 eV). The material for constituting an electron-emitting portion preferably has a smaller work function $\Phi$ than these materials, and the value of the work function thereof is preferably approximately 3 eV or smaller. Examples of such a material include carbon ($\Phi$<1 eV), cesium ($\Phi$=2.14 eV), $LaB_6$ ($\Phi$=2.66–2.76 eV), BaO ($\Phi$=1.6–2.7 eV), SrO ($\Phi$=1.25–1.6 eV), $Y_2O_3$ ($\Phi$=2.0 eV), CaO ($\Phi$=1.6–1.86 eV), BaS ($\Phi$=2.05 eV), TiN ($\Phi$=2.92 eV) and ZrN ($\Phi$=2.92 eV). More preferably, the electron-emitting portion is made of a material having a work function $\Phi$ of 2 eV or smaller. The material for constituting an electron-emitting portion is not necessarily required to have electric conductivity.

As a material for constituting an electron-emitting portion, particularly, carbon is preferred. More specifically, diamond is preferred, and above all, amorphous diamond is preferred. When the electron-emitting portion is made of amorphous diamond, an emitted-electron current density necessary for the flat-panel display can be obtained at an electric field intensity of $5 \times 10^7$ V/m or lower. Further, since amorphous diamond is an electric resister, emitted-electron currents obtained from the electron-emitting portions can be brought into uniform currents, and the fluctuation of brightness can be suppressed when such cold cathode field emission devices are incorporated into a flat-panel display. Further, since the amorphous diamond exhibits remarkably high durability against sputtering by ions of residual gas in the flat-panel display, cold cathode field emission devices having a longer lifetime can be attained.

Otherwise, the material for constituting an electron-emitting portion can be selected from materials having a secondary electron gain δ greater than the secondary electron gain δ of the electrically conductive material for constituting a cathode electrode. That is, the above material can be properly selected from metals such as silver (Ag), aluminum (Al), gold (Au), cobalt (Co), copper (Cu), molybdenum (Mo), niobium (Nb), nickel (Ni), platinum (Pt), tantalum (Ta), tungsten (W) and zirconium (Zr); semiconductors such as silicon (Si) and germanium (Ge); inorganic simple substances such as carbon and diamond; and compounds such as aluminum oxide ($Al_2O_3$), barium oxide (BaO), beryllium oxide (BeO), calcium oxide (CaO), magnesium oxide (MgO), tin oxide ($SnO_2$), barium fluoride ($BaF_2$) and calcium fluoride ($CaF_2$). The material for constituting an electron-emitting portion is not necessarily required to have electric conductivity.

In the cold cathode field emission device having the second structure (flat-type or crater-type cold cathode field emission device) or the cold cathode field emission device having the third structure (edge-type cold cathode field emission device), the material for constituting a cathode electrode corresponding to the electron-emitting region can be selected from metals such as tungsten (W), tantalum (Ta), niobium (Nb), titanium (Ti), molybdenum (Mo), chromium (Cr), aluminum (Al), copper (Cu), gold (Au) and silver (Ag); alloys and compounds of these metals (for example, nitrides such as TiN and silicides such as $WSi_2$, $MoSi_2$, $TiSi_2$ and $TaSi_2$); semiconductors such as diamond; and a thin carbon film. Although not specially limited, the thickness of the above cathode electrode is approximately 0.05 to 0.5 μm, preferably 0.1 to 0.3 μm. The method for forming the cathode electrode includes deposition methods such as an electron beam deposition method and a hot filament deposition method, a sputtering method, a combination of a CVD method or an ion plating method with an etching method, a screen-printing method and a plating method. When a screen-printing method or a plating method is employed, the cathode electrodes in the form of stripes can be directly formed.

In the cold cathode field emission device having the second structure (flat-type cold cathode field emission device or crater-type cold cathode field emission device), the cold cathode field emission device having the third structure (edge-type cold cathode field emission device) or the cold cathode field emission device having the first structure of the plane-type cold cathode field emission device, the cathode electrode or the electron-emitting portion can be formed from an electrically conductive paste prepared by dispersing electrically conductive fine particles. Examples of the electrically conductive fine particles include a graphite powder; a graphite powder mixed with at least one of metal powders, a barium oxide powder and a strontium oxide powder; diamond particles or a diamond-like carbon powder containing nitrogen, phosphorus, boron and triazole; a carbon-nano-tube powder; an (Sr, Ba, Ca)$CO_3$ powder; and a silicon carbide powder. It is particularly preferred to select a graphite powder as electrically conductive fine particles in view of a decrease in threshold electric field and an improvement in durability of the electron-emitting region. The electrically conductive fine particles may have the form of spheres or scales, or they may have any fixed or amorphous form. The particle diameter of the electrically conductive fine particles is not critical so long as it is equal to, or less than, the thickness or the pattern width of the cathode electrode or the electron-emitting portion. With a decrease in the above particle diameter, the number of electrons emitted per unit area can be increased. When the above particle diameter is too small, however, the cathode electrode or the electron-emitting portion may deteriorate in electric conductivity. The above particle diameter is therefore preferably in the range of from 0.01 to 4.0 μm. Such electrically conductive fine particles are mixed with a glass component or other proper binder to prepare an electrically conductive paste, a desired pattern of the electrically conductive paste is formed by a screen-printing method and the pattern is calcined or sintered, whereby the cathode electrode which works as an electron-emitting region or the electron-emitting portion can be formed. Otherwise, the cathode electrode which works as an electron-emitting region or the electron-emitting portion can be formed by a combination with a spin coating method and an etching method.

In the cold cathode field emission device having the first structure of the Spindt-type cold cathode field emission device or the crown-type cold cathode field emission device, the material for constituting a cathode electrode can be selected from metals such as tungsten (W), niobium (Nb), tantalum (Ta), molybdenum (Mo), chromium (Cr), aluminum (Al) and copper (Cu); alloys and compounds of these metals (for example, nitrides such as TiN and silicides such as $WSi_2$, $MoSi_2$, $TiSi_2$ and $TaSi_2$); semiconductors such as silicon (Si); and ITO (indium-tin oxide). The method for forming the cathode electrode includes deposition methods such as an electron beam deposition method and a hot filament deposition method, a sputtering method, a combination of a CVD method or an ion plating method with an etching method, a screen-printing method and a plating method. When a screen-printing method or a plating method is employed, the cathode electrodes in the form of stripes can be directly formed.

The material for constituting an anode electrode corresponding to the electrode in the flat-panel display of the present invention can be properly selected depending upon the constitution of the flat-panel display. That is, when the flat-panel display is a transmission type (the display panel corresponds to a display screen), and when the anode electrode and the luminescence layer are stacked on the support member in this order, not only the support member but also the anode electrode itself is required to be transparent, and a transparent electrically conductive material such as ITO (indium-tin oxide) is used. When the flat-panel display is a reflection type (the back panel corresponds to a display screen), and even when the flat-panel display is a transmission type and the luminescence layer and the anode electrode are stacked on the support member in this order, the materials for constituting a cathode electrode and the gate electrode can be properly selected from the above materials in addition to ITO. The constitution of the anode electrode and the luminescence layer includes (1) a constitution in which the anode electrode is formed on the support member and the luminescence layer is formed on the anode electrode and (2) a constitution in which the luminescence layer is formed on the support member and the anode electrode is formed on the luminescence layer. In the above constitution (1), a so-called metal back layer electrically connected to the anode electrode may be formed on the luminescence layer. In the above constitution (2), a metal back layer may be formed on the anode electrode.

In the cold cathode field emission device having any one of the first to third structures, from the viewpoint of simplification of the structure of the flat-panel display, preferably, the projection image of the gate electrode in the form of a stripe and the projection image of the cathode electrode in the form of a stripe extend in directions in which these projection images cross each other at right angles. The electron-emitting region (constituted of one or a plurality of the cold cathode field emission device(s)) is formed in an overlapping region of the projection images of the cathode electrode in the form of a stripe and the gate electrode in the form of a stripe (the overlapping region corresponds to a region of one pixel in a monochromatic display or a region of one sub-pixel of three sub-pixels constituting one pixel in a color display). Such overlapping regions are arranged in the effective field of the back panel (which field works as an actual display screen portion) and generally arranged in the form of a two-dimensional matrix.

In the cold cathode field emission device having any one of the first to third structures, the plan form of the opening portion (form obtained by cutting the opening portion with an imaginary plane in parallel with the substrate surface) may be any form such as a circle, an oval, a rectangle, a polygon, a rounded rectangle or a rounded polygon. The opening portion can be formed, for example, by isotropic etching or by a combination of anisotropic etching and isotropic etching. As a material for constituting an insulating layer, $SiO_2$, SiN, SiON and SOG (spin on glass) can be used alone or in combination. The insulating layer can be formed by a known method such as a CVD method, an application method, a sputtering method or a screen printing method. The insulating layer may be formed in the form of a rib. In this case, the insulating layer in the form of a rib can be formed in a region between neighboring cathode electrodes in the form of stripes or in a region between neighboring cathode electrode groups, each of which consists of a plurality of the cathode electrodes. The material for constituting an insulating layer in the form of a rib can be selected from known insulating materials, and for example, a material prepared by mixing a metal oxide such as alumina with a widely used low-melting glass can be used. The insulating layer in the form of a rib can be formed, for example, by a screen printing method, a sand blasting method, a dry filming method and a photosensitive method. The dry filming method refers to a method in which a photosensitive film is laminated on a substrate, the photosensitive film in a site where the insulating layer in the form of a rib is to be formed is removed by exposure and development and an insulating layer material is filled in an opening formed by the removal and is calcined. The photosensitive film is combusted and removed by the calcining, and the insulating layer material filled in the opening remains to constitute the insulating layer in the form of a rib. The photosensitive method refers to a method in which a photosensitive insulating material layer for a rib is formed on a substrate and the insulating material layer is patterned by exposure and development and then calcined.

In the cold cathode field emission device, a resistance layer may be formed between the cathode electrode and the electron-emitting portion. Otherwise, when the surface of the cathode electrode or the edge portion of the cathode electrode corresponds to the electron-emitting region, the cathode electrode may have a three-layered structure constituted of an electrically conductive material layer, a resistance layer and an electron-emitting layer corresponding to the electron-emitting region. The resistance layer can stabilize performances of the cold cathode field emission device and can attain uniform electron-emitting properties. The material for constituting a resistance layer includes carbon-containing materials such as silicon carbide (SiC); SiN; semiconductor materials such as amorphous silicon and the like; and refractory metal oxides such as ruthenium oxide ($RuO_2$), tantalum oxide and tantalum nitride. The resistance layer can be formed by a sputtering method, a CVD method or a screen-printing method. The resistance value of the resistance layer is approximately $1 \times 10^5$ to $1 \times 10^7$ Ω, preferably several MΩ.

In the flat-panel display of the present invention, the substrate for constituting the back panel or the support member for constituting the display panel may be any substrate or a support member so long as they have a surface made of an insulation material. The substrate or the support member includes a glass substrate, a glass substrate having an insulation layer formed on its surface, a quartz substrate, a quartz substrate having an insulation layer formed on its surface and semiconductor substrate having an insulation layer formed on its surface.

In the flat-panel display of the present invention, the back panel and the front panel can be bonded to each other with an adhesive or they can be bonded to each other with a combination of a frame made of an insulating rigid material such as glass or ceramic with an adhesive layer. When the frame and the adhesive layer are used in combination, a large distance between the back and display panels can be secured by selecting a proper height of the frame as compared with a case using an adhesive alone. While frit glass is generally used as an adhesive layer, a low-melting metal material having a melting point of 120 to 400° C. may be used. The low-melting metal material includes In (indium, melting point 157° C.); an indium-gold-containing low-melting alloy; tin (Sn)-containing high-temperature solders such as $Sn_{80}Ag_{20}$ (melting point 220–370° C.) and $Sn_{95}Cu_5$ (melting point 227–370° C.); lead (Pb)-containing high-temperature solders such as $Pb_{97.5}Ag_{2.5}$ (melting point 304° C.), $Pb_{94.5}Ag_{5.5}$ (melting point 304–365° C.) and $Pb_{97.5}Ag_{1.5}Sn_{1.0}$ (melting point 309° C.); zinc (Zn)-containing high-temperature solders such as $Zn_{95}Al_5$ (melting point 380° C.); tin-lead-containing standard solders such as $Sn_2Pb_{98}$ (melting point 316–322° C.); and soldering materials such as $Au_{88}Ga_{12}$ (melting point 381° C.). All of the above subscript values show atomic %.

In the flat-panel display of the present invention, when the back panel, the display panel and the frame are bonded, these members may be bonded at the same time, or one of the panels and the frame may be bonded in advance at a first step and the other panel may be bonded to the frame at a second step. When these three members are bonded at the same time or the other panel is bonded to the frame at the second step in a vacuum atmosphere, the space surrounded by the back panel, the display panel and the frame comes to be a vacuum concurrently with the bonding. Otherwise, the space surrounded by the back panel, the display panel and the frame may be vacuumed to form a vacuum space after these three members are bonded. When the vacuuming is carried out after the bonding, the atmosphere for the bonding may have atmospheric pressure or reduced pressure, and the gas constituting the atmosphere may be ambient atmosphere or an inert gas containing nitrogen gas or a gas coming under the group 0 of the periodic low table (for example, Ar gas).

When the vacuuming is carried out after the bonding, the vacuuming can be carried out through a tip tube preconnected to the back panel and/or the display panel. Typically, the tip tube is made of a glass tube and is bonded to a circumference of a through hole formed in a ineffective field of the back panel and/or the display panel with frit glass or the above low-melting metal material. After the space reaches a predetermined vacuum degree, the tip tube is sealed by thermal fusion. When the entire flat-panel display is once heated and then temperature-decreased before the sealing, properly, a residual gas can be released into the space, and the residual gas can be removed out of the space by the vacuuming.

As explained already, in the cold cathode field emission display, the accelerating voltage is required to be approximately 10 kilovolts or less, for example, approximately 6 kilovolts. In the above accelerating voltage, the electron energy loss peak is positioned near the outermost surface of the luminescence layer. Further, the electrons reach only as deep as approximately 0.2 to 0.3 μm from the surface of the luminescence layer. When conventional phosphor particles were observed through a transmission electron microscope, it was found according to present inventor's analysis that crystal defects such as dislocations, stacking faults and twin boundaries were present near the surface of the phosphor particle in a crystal defect density of $1 \times 10^8$ defects/cm$^2$ or more.

Further, as already explained, in the luminescence layer, approximately 10% of energy of the energy beam (for example, electrons) contributes to light emission, and the remaining approximately 90% of the energy is converted to heat. That is, heat is generated near the surface of the luminescence layer to a great extent. As a result, when the luminescence layer is formed of phosphor particles, for example, made of a sulfide, sulfur as a constituent is dissociated in the form of a single atom, sulfur monoxide (SO) or sulfur dioxide ($SO_2$), and the phosphor particles alter in composition or luminescence centers disappear. The above phenomenon comes to be more outstanding with an increase in the number of the crystal defects in the portion of the luminescence crystal particle which portion contributes to photon emission. Further, there is observed a phenomenon that the number of dislocations increases due to the heat generation of the luminescence layer. Further, with an increase in the number of the crystal defects, the luminescence efficiency of the luminescence crystal particles decreases.

In the present invention, the density of crystal defects such as dislocations, stacking faults and twin boundaries (to be simply referred to as "crystal defect density" hereinafter) in a region located from the surface of the luminescence crystal particle to a portion as deep as the energy beam reaches or penetrates or the electrons reach or penetrate (region of the luminescence crystal particle which region substantially contributes to photon emission) is $5 \times 10^7$ defects/cm$^2$ or less, preferably $1 \times 10^7$ defects/cm$^2$. As a result, not only the luminescence crystal particle can be improved in luminescence efficiency, but also the deterioration of the luminescence crystal particle can be prevented. When the initial value of brightness obtained by the photon emission of the luminescence crystal particles is assumed to be 100, the time period taken up to a brightness value of 50 at a current density of 0.2 μA/cm$^2$ in a cathode ray tube is $1 \times 10^4$ hours at a crystal defect density of $1 \times 10^8$ defects/cm$^2$. In contrast, the above time period comes to be $1 \times 10^6$ hours at a crystal defect density of $1 \times 10^7$ defects/cm$^2$. Further, when the current density in a cold cathode field emission display is 5 μA/cm$^2$, the above time period is $1 \times 10^3$ hours at a crystal defect density of $1 \times 10^8$ defects/cm$^2$. In contrast, the above time period comes to $1 \times 10^4$ hours at a crystal defect density of $4 \times 10^7$ defects/cm$^2$, and comes to be $1 \times 10^5$ hours at a crystal defect density of $1 \times 10^7$ defects/cm$^2$.

BRIEF DESCRIPTION OF THE DRAWINGS

The present invention will be explained with reference to Examples hereinafter.

FIG. 5B, are schematic partial end views of the substrate, etc., for explaining the method for producing the cold cathode field emission device of Example 1 having the first structure of the Spindt-type cold cathode field emission device.

FIG. 7B, are schematic partial end views of the substrate, etc., for explaining the method for producing the cold cathode field emission device of Example 2 having the first structure of the crown-type cold cathode field emission device.

FIG. 8C, are a schematic partial end view and a partial perspective view of the substrate, etc., for explaining the method for producing the cold cathode field emission device of Example 2 having the first structure of the crown-type cold cathode field emission device.

FIG. 12B, are schematic partial end views of the substrate, etc., for explaining the method for producing the cold cathode field emission device of Example 5 having the first structure of the plane-type cold cathode field emission device.

FIGS. 17A and 17B, are a schematic partial end view and a partial perspective view of the substrate, etc., for explaining the cold cathode field emission device of Example 8 having the second structure of the flat-type cold cathode field emission device.

FIGS. 18A and 18B, are a schematic partial end view and a partial perspective view of the substrate, etc., for explaining the cold cathode field emission device of Example 8 having the second structure of the flat-type cold cathode field emission device.

FIGS. 19A and 19B, are schematic partial end views of the substrate, etc., for explaining the cold cathode field emission device of Example 8 having the second structure of the flat-type cold cathode field emission device.

FIG. 23B, are schematic partial end views of the substrate, etc., for explaining the method for producing the cold cathode field emission device of Example 11 having the second structure of the flat-type cold cathode field emission device.

FIG. 29C, are schematic partial end views of the face plate, etc., for explaining processes of producing the color television glass bulb.

DESCRIPTION OF THE PREFERRED EMBODIMENTS

Example 1

Figure 1:
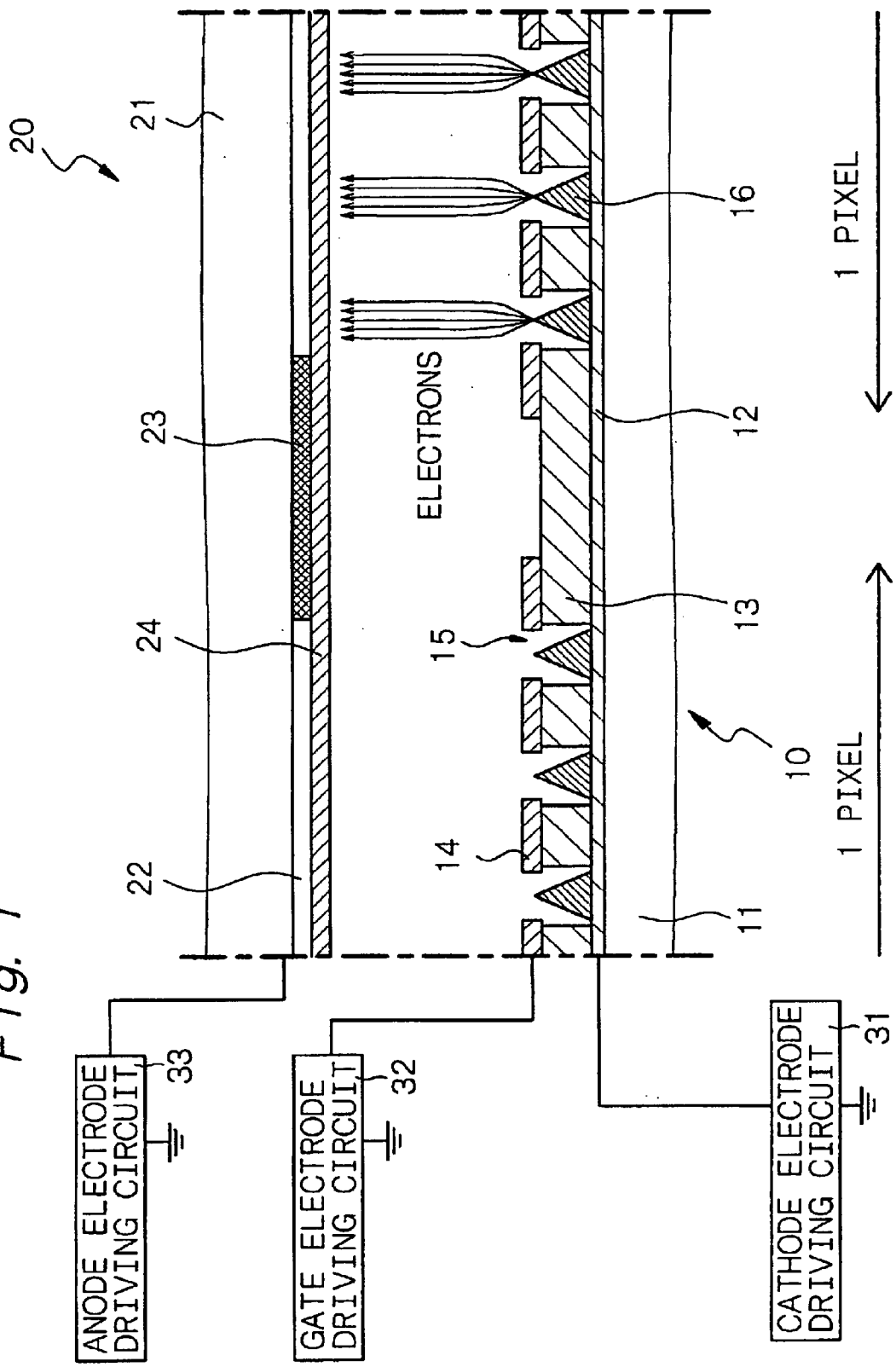
FIG. 1 is a schematic partial end view of a flat-panel display in Example 1 of the present invention.

$Y_2O_2S$:Eu was prepared as a red-emitting luminescence crystal particle, ZnS:Cu,Al was prepared as a green-emitting luminescence crystal particle, and ZnS:Ag,Al was prepared as a blue-emitting luminescence crystal particle. Each of these three types of the luminescence crystal particles had a crystal defect density of $5 \times 10^7$ defects/cm$^2$ in a region from the surface of each of the luminescence crystal particles to a portion as deep (approximately 0.3 $\mu$m) as the energy beam entered and reached, and each of these three types of the luminescence crystal particles had an average particle diameter of 7.6 $\mu$m and a surface average roughness of 5 nm or less.

In Example 1, a flat-panel display having cold cathode field emission devices (to be referred to as "field emission device" hereinafter) having the first structure was prepared. The flat-panel display of Example 1 had a cross-section similar to the schematic partial cross-sectional view shown in FIG. 1. In the flat-panel display, a display panel 20 and a back panel 10 having a plurality of electron-emitting regions are arranged so as to face each other through a vacuum space. Each electron-emitting region has a plurality of Spindt-type field emission devices. As shown in the schematic partial end view of FIG. 6B, the Spindt-type field emission device comprises a substrate 11; a stripe-shaped cathode electrode 12 formed on the substrate 11; an insulating layer 13 formed on the substrate 11 and the cathode electrode 12; a stripe-shaped gate electrode 14 formed on the insulating layer 13; an opening portion 15 penetrating through the gate electrode 14 and the insulating layer 13; and a conical electron-emitting portion 16 formed on a portion of the cathode electrode 12 which portion is positioned in the bottom portion of the opening portion 15. The projection image of the stripe-shaped cathode electrode 12 and the projection image of the stripe-shaped gate electrode 14 extend in different directions (for example, in directions which across at right angles). The electron-emitting region is positioned in a region (overlapping region) where the projection image of the stripe-shaped gate electrode 14 and the projection image of the stripe-shaped cathode electrode 12 overlap. The electron-emitting portion 16 is formed on a portion of the cathode electrode 12 which portion is positioned in the bottom portion of the opening portion 15. Many such electron-emitting portions 16 correspond to one of phosphor layers 22 to be described later. A relatively negative voltage (video signal) is applied to the electron-emitting portion 16 from a cathode electrode driving circuit 31 through the cathode electrode 12, and a relatively positive voltage (scanning signal) is applied to the gate electrode 14 from a gate electrode driving circuit 32. Due to an electric field generated by the application of the above voltages, electrons are emitted from the top portion of the electron-emitting portion 16 exposed in the bottom portion of the opening portion 15 on the basis of a quantum tunnel effect. In some cases, reversibly to the above, the scanning signal may be inputted to the cathode electrode 12 and the video signal may be inputted to the gate electrode 14.

The display panel 20 comprises a support member 21 made of glass or the like; a plurality of luminescence layers (phosphor layers 22) formed on the support member 21 and formed in the form of a matrix or dots; a black matrix 23 filled between the phosphor layers; and an electrode (anode electrode 24) formed on the entire surfaces of the phosphor layers 22 and the black matrix 23. The luminescence layers (phosphor layers 22) are formed of the above various luminescence crystal particles which emit photons upon irradiation with electrons flying from the electron-emitting regions. A positive voltage higher than the positive voltage applied to the gate electrode 14 is applied to the anode electrode 24 from an anode electrode driving circuit 33, and the anode electrode 24 works to lead electrons emitted into the vacuum space from the electron-emitting portion 16 toward the phosphor layer 22. Further, the anode electrode 24 works not only to protect the phosphor particles constituting the phosphor layer 22 against sputtering by particles such as ions, but also to reflect photons emitted from the phosphor layers 22 due to electron excitation to the support member side so that the display screen observed from an outside of the support member 21 is improved in brightness. The anode electrode 24 is formed, for example, of a thin aluminum film. The phosphor layers 22 and the anode electrode 24 can be arranged as shown in FIGS. 2A and 2B, FIGS. 2A and 2C, FIGS. 3A and 3B, or FIGS. 3A and 3C.

Figure 2A:
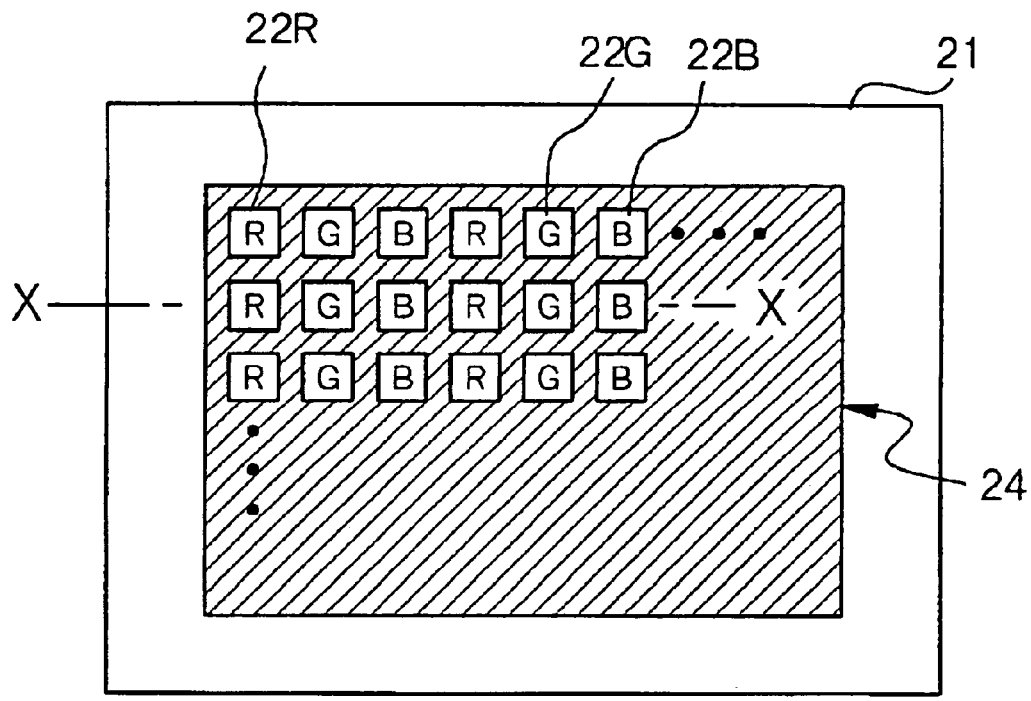
FIGS. 2A, 2B and 2C are a schematic plan view and partial cross-sectional views of a display panel having phosphor layers arranged in the form of a matrix.
Figure 2B:
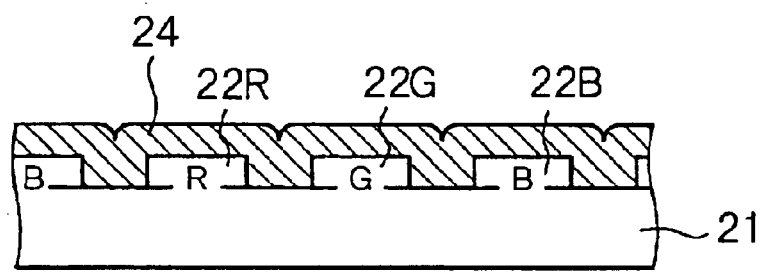
Figure 2C:
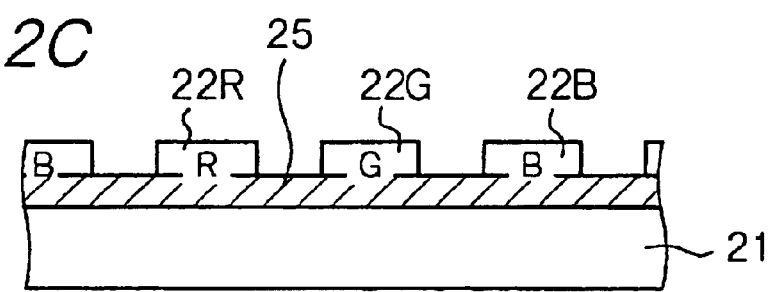
Figure 3A:
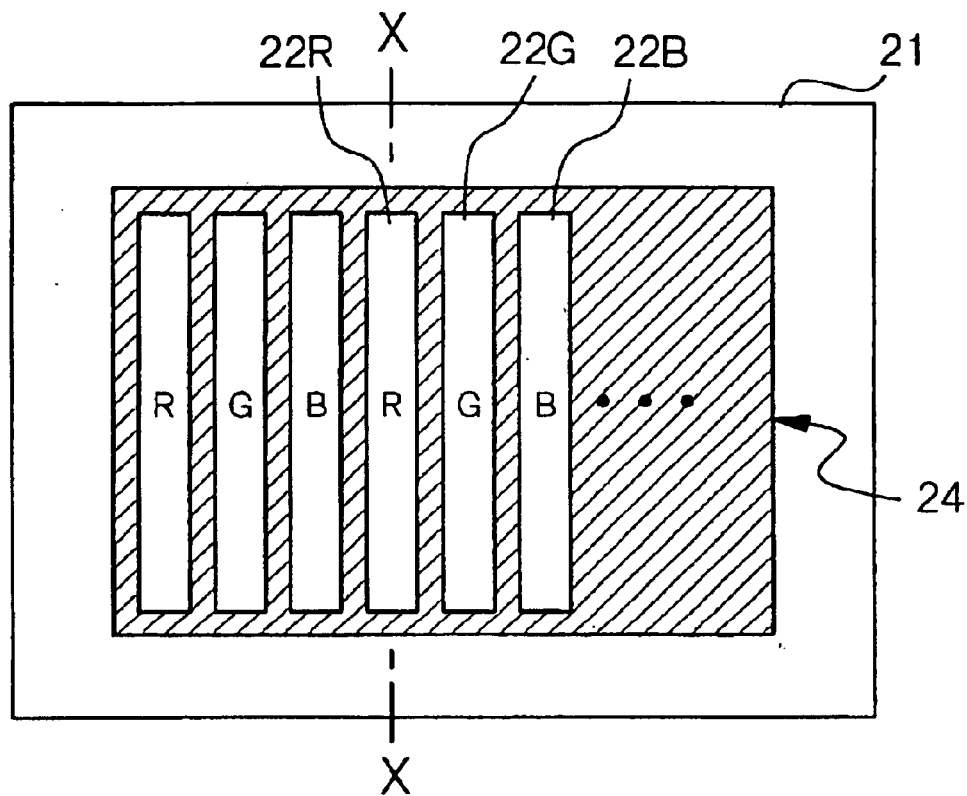
FIGS. 3A, 3B and 3C are a schematic plan view and partial cross-sectional views of a display panel having phosphor layers arranged in the form of stripes.
Figure 3B:
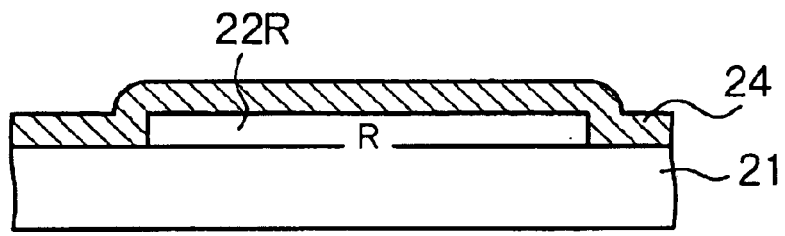
Figure 3C:
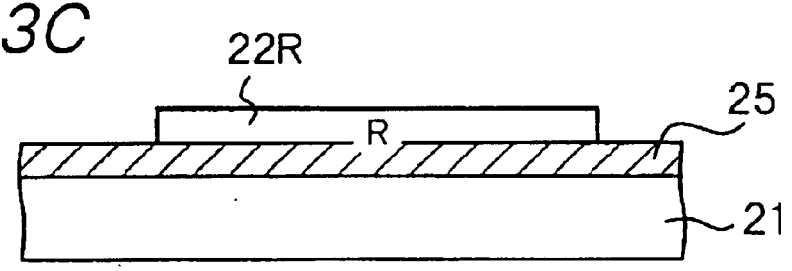
Figure 4A:
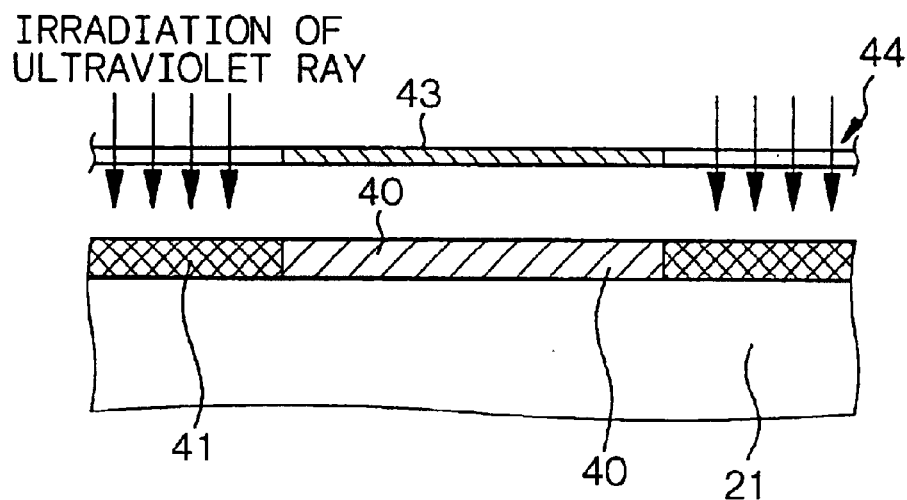
FIGS. 4A, 4B, 4C and 4D are schematic partial end views of a support member, etc., for explaining the method for producing a display panel.
Figure 4B:
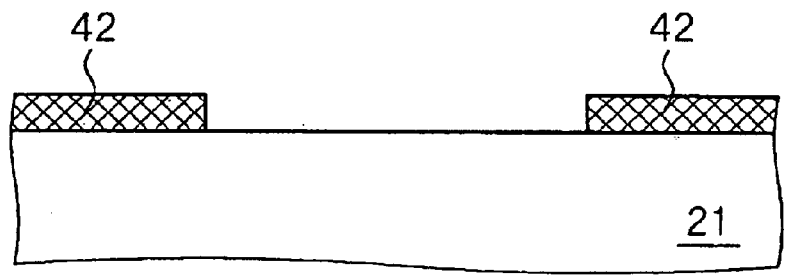
Figure 4C:
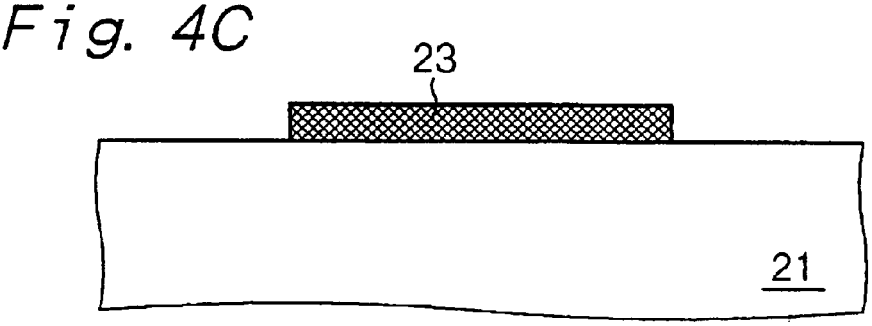
Figure 4D:
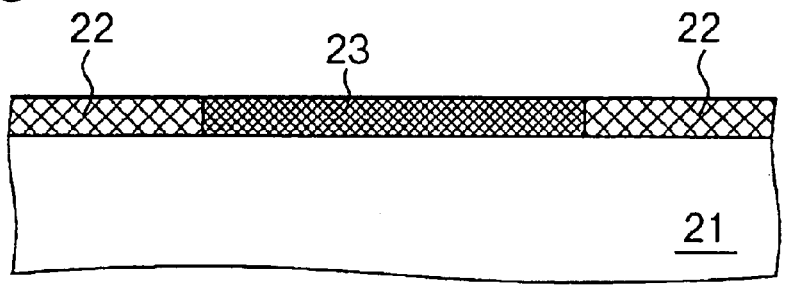
Figure 5A:
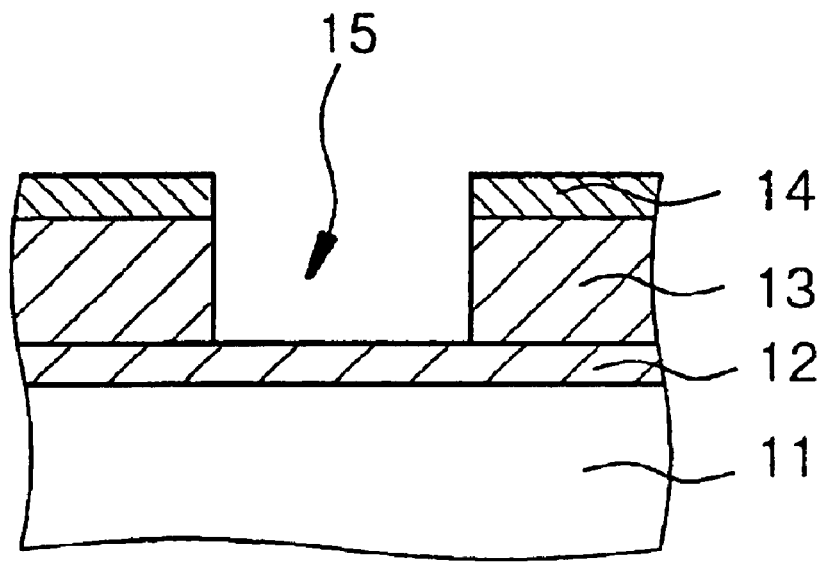
FIGS. 5A and 5B are schematic partial end views of a substrate, etc., for explaining the method for producing the cold cathode field emission device of Example 1 having a first structure of a Spindt-type cold cathode field emission device.
Figure 5B:
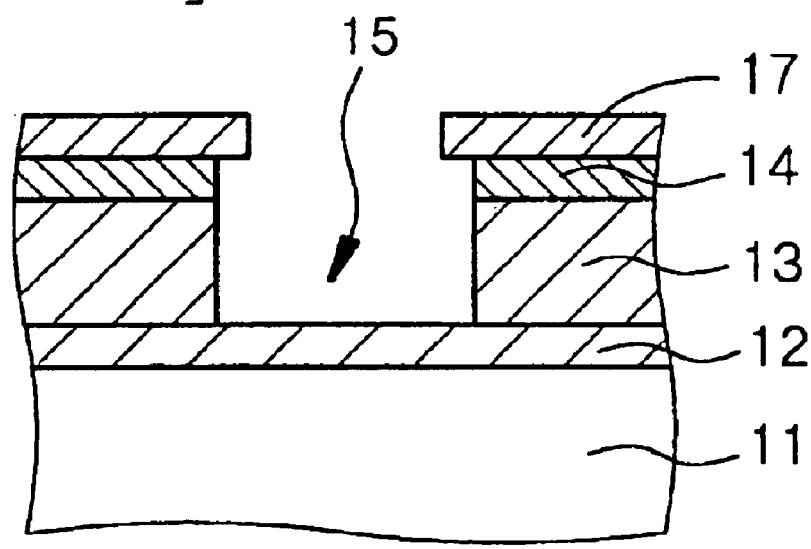

One example of the method for producing the display panel shown in FIGS. 2A and 2B will be explained with reference to FIGS. 4A to 4D. First, a luminescence crystal particle composition is prepared. For this purpose, for example, a dispersing agent is dispersed in purified water, and the dispersion is stirred with a homomixer at 3000 rpm for 1 minute. Then, the above-explained luminescence crystal particles are placed in the purified water, and the mixture is stirred with a homomixer at 5000 rpm for 5 minutes. Then, for example, polyvinyl alcohol and ammonium bichromate are added, and the mixture is fully stirred and then filtered.

In the production of the display panel, a photosensitive film 40 is formed (applied) on the entire surface of the support member 21 made, for example, of glass. Then, the photosensitive film 40 formed on the support member 21 is exposed to light which has been irradiated from a light source (not shown) and has passed through an opening 44 formed in a mask 43, to form an exposed region 41 (see FIG. 4A). Then, the photosensitive film 40 is developed to remove it selectively, whereby a remaining portion (exposed and developed photosensitive film) 42 is retained on the support member 21 (see FIG. 4B). Then, a carbon agent (carbon slurry) is applied to the entire surface, dried and calcined, and the remaining portion 42 of the photosensitive film and the carbon agent thereon are removed by a lift-off method, to form a black matrix 23 made of the carbon agent on the exposed support member 21 and also to remove the remaining portion 42 of the photosensitive film (see FIG. 4C). Then, phosphor layers 22 for red, green and blue are formed on the exposed support member 21 (see FIG. 4D). Specifically, luminescence crystal particle compositions made of the above luminescence crystal particles (phosphor particles) are used. For example, a red photosensitive luminescence crystal particle composition (phosphor slurry) can be applied to the entire surface, exposed to light and developed, then, a green photosensitive luminescence crystal particle composition (phosphor slurry) can be applied to the entire surface, exposed to light and developed, and then a blue photosensitive luminescence crystal particle composition (phosphor slurry) is applied to the entire surface, exposed to light and developed. Then, the anode electrode 24 made of a thin aluminum film having a thickness of approximately 0.07 $\mu$m is formed on the phosphor layers 22 and the black matrix 23 by a sputtering method. Alternatively, each phosphor layer 22 can be formed by a screen printing method.

The method for producing the Spindt-type field emission device will be explained below. The method for producing the Spindt-type field emission device is basically a method of forming the conical electron-emitting portion 16 by perpendicular deposition of a metal material. That is, deposition particles enter perpendicularly to the opening portion 15, and the amount of the deposition particles which reach the bottom portion of the opening portion 15 is gradually decreased by utilizing the masking effect of an overhanging deposit formed near the opening portion 15, whereby the electron-emitting portion 16 as a conical deposit is formed in a self-aligned matter. The method for producing a flat-panel display having the field emission device having the first structure of the Spindt-type field emission device according to a method in which a peel layer 17 is formed on the insulating layer 13 and the gate electrode 14 beforehand for making it easy to remove an unnecessary overhanging deposit will be outlined with reference to FIGS. 5A, 5B, 6A and 6B showing schematic partial end views of the substrate and the like.

[Step-100]

First, the cathode electrode 12 made of niobium (Nb) in the form of a stripe is formed on the substrate 11 made, for example, of glass, and the insulating layer 13 made of $SiO_2$ is formed on the entire surface. Further, the gate electrode 14 is formed on the insulating layer 13. The gate electrode 14 can be formed, for example, by a sputtering method, lithography and a dry etching method. Then, the opening portion 15 is formed in the gate electrode 14 and the insulating layer 13 by an RIE (reactive ion-etching) method, to expose the cathode electrode 12 in a bottom portion of the opening portion 15 (see FIG. 5A). The cathode electrode 12 may be a single-material layer, or it may be a stack of a plurality of material layers. For suppressing the fluctuation of electron emission characteristics of the electron-emitting portions to be formed at a step to come later, the surface layer portion of the cathode electrode 12 can be made of a material having a higher electric resistivity than a material forming the remaining portion.

[Step-110]

Then, the electron-emitting portion 16 is formed on the cathode electrode 12 exposed in the bottom portion of the opening portion 15. Specifically, aluminum is obliquely deposited on the entire surface to form the peel layer 17. In this case, it is arranged to make a sufficiently large incidence angle of vaporized particles with regard to a normal of the substrate 11, whereby the peel layer 17 can be formed on the gate electrode 14 and the insulating layer 13 almost without depositing aluminum in the bottom portion of the opening portion 15. The peel layer 17 extends from the opening edge portion of the opening portion 15 like eaves, whereby the opening portion 15 is substantially decreased in diameter (see FIG. 5B).

[Step-120]

Figure 6A:
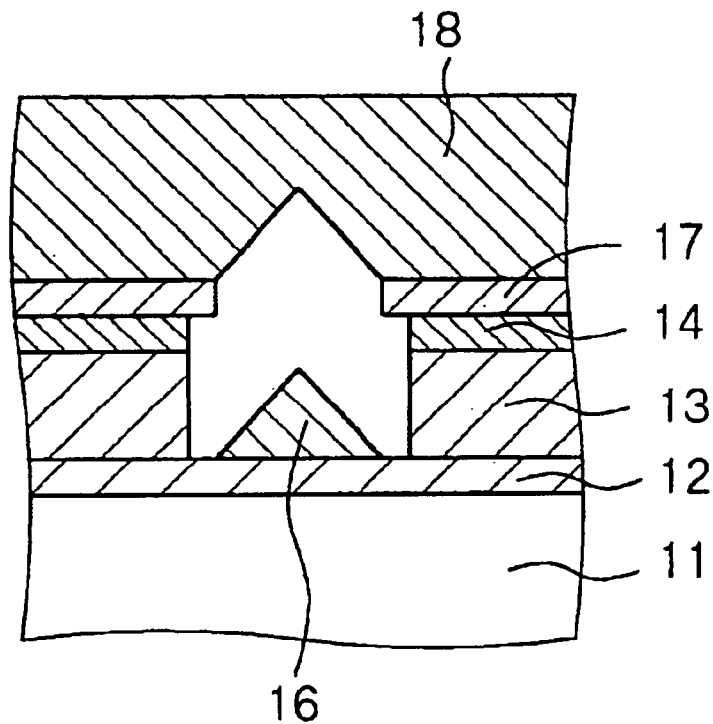
FIGS. 6A and 6B, following

Then, for example, molybdenum (Mo) is vertically deposited on the entire surface. In this case, as shown in FIG. 6A, with the growth of an electrically conductive layer 18 made of molybdenum having an overhanging form on the peel layer 17, the substantial diameter of the opening portion 15 is gradually decreased, so that vaporized particles which contribute to deposition in the bottom portion of the opening portion 15 gradually come to be limited to particles which pass by the center of the opening portion 15. As a result, a conical deposit is formed on the bottom portion of the opening portion 15, and the conical deposit constitutes the electron-emitting portion 16.

Figure 6B:
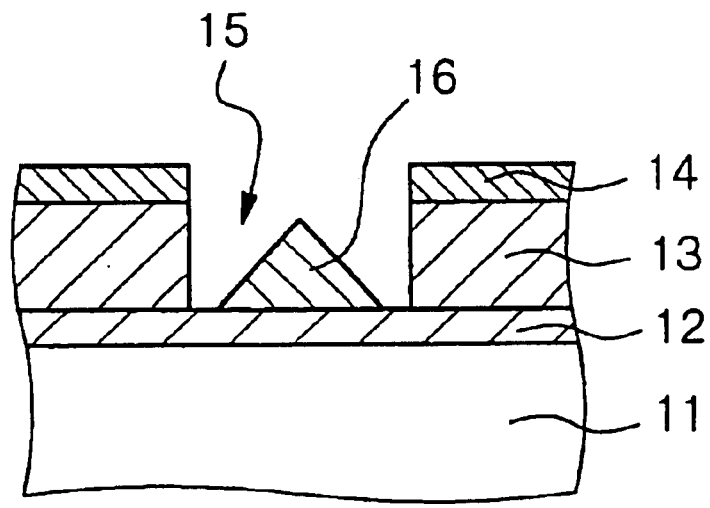

Then, the peel layer 17 is peeled off from the insulating layer 13 and the gate electrode 14 by an electrochemical process and a wet process, to selectively remove the electrically conductive layer 18 on the insulating layer 13 and the gate electrode 14. As a result, as shown in FIG. 6B, the conical electron-emitting portion 16 can be retained on the cathode electrode 12 positioned in the bottom portion of the opening portion 15.

[Step-130]

The back panel (cathode panel) 10 having such field emission devices formed in a large number and the display panel (anode panel) 20 are combined, whereby the flat-panel display shown in FIG. 1 can be obtained. Specifically, an approximately 1 mm high frame (not shown) made, for example, of ceramic or glass is provided, the frame, the back panel 10 and the display panel 20 are bonded, for example, with frit glass, and the frit glass is dried, then followed by calcining the frit glass at approximately 450° C. for 10 to 30 minutes. Then, the inner space of the flat-panel display is vacuumed until it has a vacuum degree of approximately $10^{-4}$ Pa, and then the inner space is sealed by a proper method. Alternatively, the frame, the back panel 10 and the display panel 20 may be bonded in a high-vacuum atmosphere. Alternatively, for some structure of the flat-panel display, the back panel 10 and the display panel 20 may be bonded to each other without the frame.

The above-prepared cold cathode field emission display as a flat-panel display, and a cold cathode field emission display prepared as described above as a flat-panel display using conventional phosphor particles were studied for changes of brightness with elapse of time. For the conventional phosphor particles, $Y_2O_2S:Eu$ was used as red-emitting luminescence crystal particles, ZnS:Cu,Al was used as green-emitting luminescence crystal particles, and ZnS:Ag,Al was used as blue-emitting luminescence crystal particles. Each of these three types of the luminescence crystal particles had a crystal defect density of $1 \times 10^8$ defects/cm² in a region from the surface of each of the luminescence crystal particles to a portion as deep (approximately 0.3 μm) as the energy beam entered and reached, and each of these three types of the luminescence crystal particles had an average particle diameter of 4 to 5 μM and a surface average roughness of approximately 10 nm. When these flat-panel displays were measured for a time period for which the brightness came to be 50 on the condition that the initial value of brightness was assumed to be 100, the time period for which the brightness of the flat-panel display of Example 1 came to be 50 was approximately 5 times as long as the time period of the flat-panel display using the conventional phosphor particles.

Example 2

In Examples 2 to 12, various field emission devices will be explained. In Example 2, each electron-emitting region comprises a plurality of crown-type field emission devices. Display panels 20 in Example 2 and Examples 3 to 12 to be described later can be structurally the same as that in Example 1, so that detailed explanations thereof are omitted.

Figure 9A:
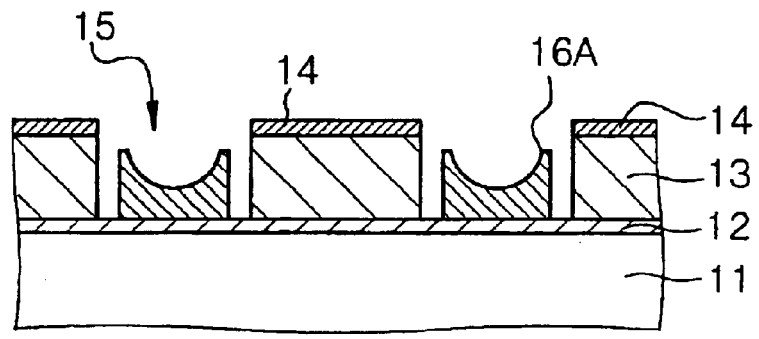
FIGS. 9A and 9B, following
Figure 9B:
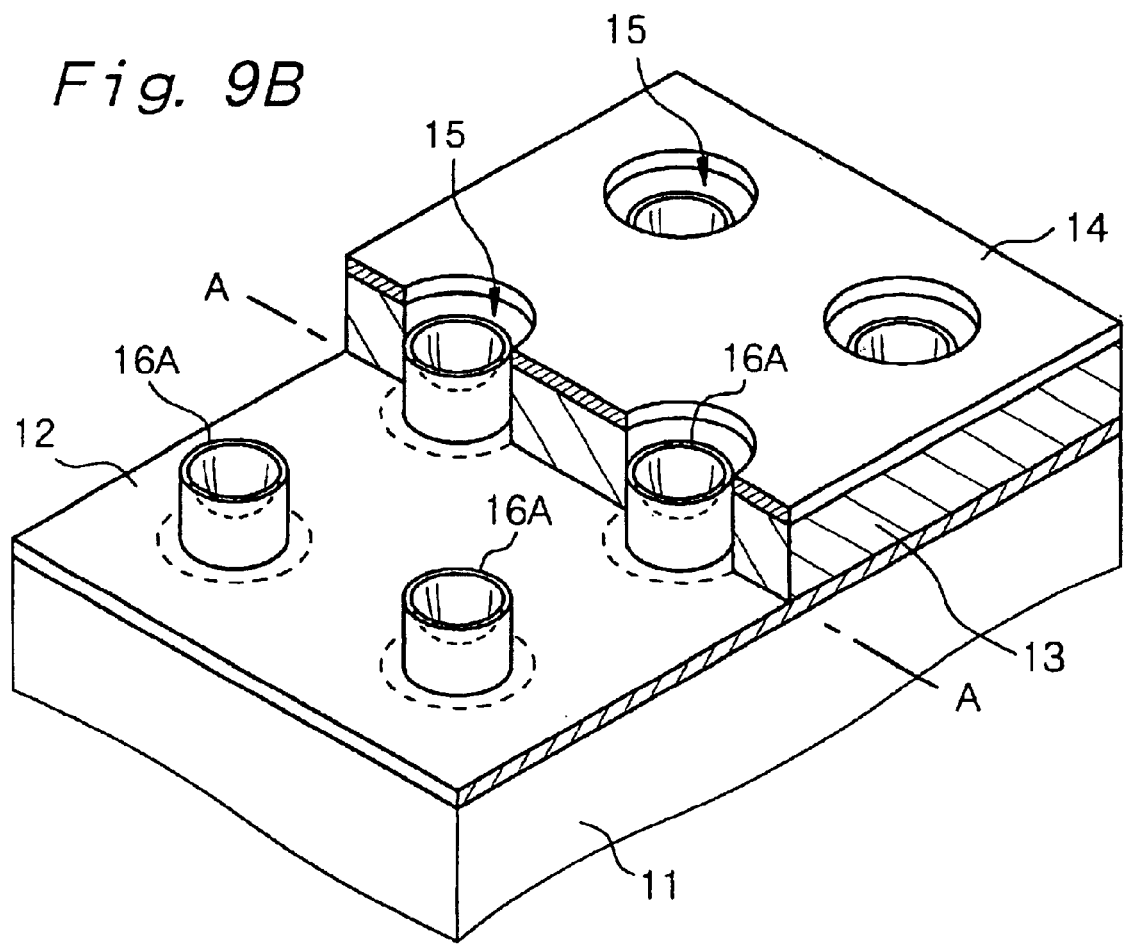

FIG. 9A shows a schematic partial end view of a field emission device having the first structure of a crown-type field emission device, and FIG. 9B shows a partial cut-off schematic perspective view thereof. The crown-type field emission device comprises a cathode electrode 12 formed on a substrate 11; an insulating layer 13 formed on the substrate 11 and the cathode electrode 12; a gate electrode 14 formed on the insulating layer 13; an opening portion 15 penetrating through the gate electrode 14 and the insulating layer 13; and a crown-type electron-emitting portion 16A formed on a portion of the cathode electrode 12 which portion is positioned in the bottom portion of the opening portion 15. The crown-type electron-emitting portions 16A exposed in the bottom portions of the opening portions 15 correspond to the electron-emitting region.

The method for producing the crown-type field emission device will be explained below with reference to FIGS. 7A, 7B, 8A, 8B, 8C, 9A and 9B showing a schematic partial end views and so on of a substrate, etc.

[Step-200]

First, the cathode electrode 12 in the form of a stripe is formed on the substrate 11 made, for example, of glass. The cathode electrode 12 extends leftward and rightward on a paper surface of the drawings. The cathode electrode 12 in the form of a stripe can be formed, for example, by forming an approximately 0.2 μm thick ITO film on the entire surface of the substrate 11 by a sputtering method and then patterning the ITO film. The cathode electrode 12 can be a single-material layer or can be formed by stacking a plurality of material layers. For example, for suppressing the fluctuation of electron emission characteristics of the electron-emitting portions to be formed at a step to come later, the surface layer portion of the cathode electrode 12 may be made of a material having a higher electric resistivity than a material constituting the remaining portion. Then, the insulating layer 13 is formed on the substrate 11 and the cathode electrode 12. In this embodiment, for example, a glass paste is screen-printed on the entire surface to form a glass paste layer having a thickness of approximately 3 μm. Then, for removing water and a solvent contained in the insulating layer 13 and flattening the insulating layer 13, two-stage calcining procedures such as temporary calcining at 100° C. for 10 minutes and main calcining at 500° C. for 20 minutes are carried out. The above screen-printing using a glass paste may be replaced with the formation of an $SiO_2$ layer, for example, by a CVD method.

Figure 7A:
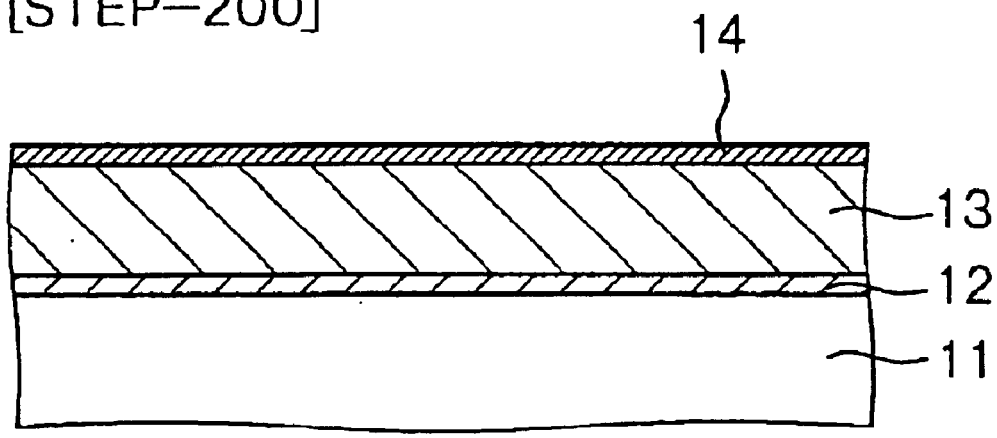
FIGS. 7A and 7B are schematic partial end views of a substrate, etc., for explaining the method for producing a cold cathode field emission device of Example 2 having a first structure of a crown-type cold cathode field emission device.

Then, the gate electrode 14 in the form of a stripe is formed on the insulating layer 13 (see FIG. 7A). The gate electrode 14 extends in the direction perpendicular to the paper surface of the drawings. The gate electrode 14 can be formed, for example, by forming an approximately 20 nm thick chromium (Cr) film and a 0.2 μm thick gold (Au) film on the entire surface of the insulating layer 13 in this order and then patterning the resultant stacked layers. The chromium film is formed for supplying insufficient adhesion of the gold film to the insulating layer 13. The extending direction of projection image of the gate electrode 14 forms an angle of 90° with the extending direction of projection image of the cathode electrode 12 in the form of a stripe.

[Step-210]

Figure 7B:
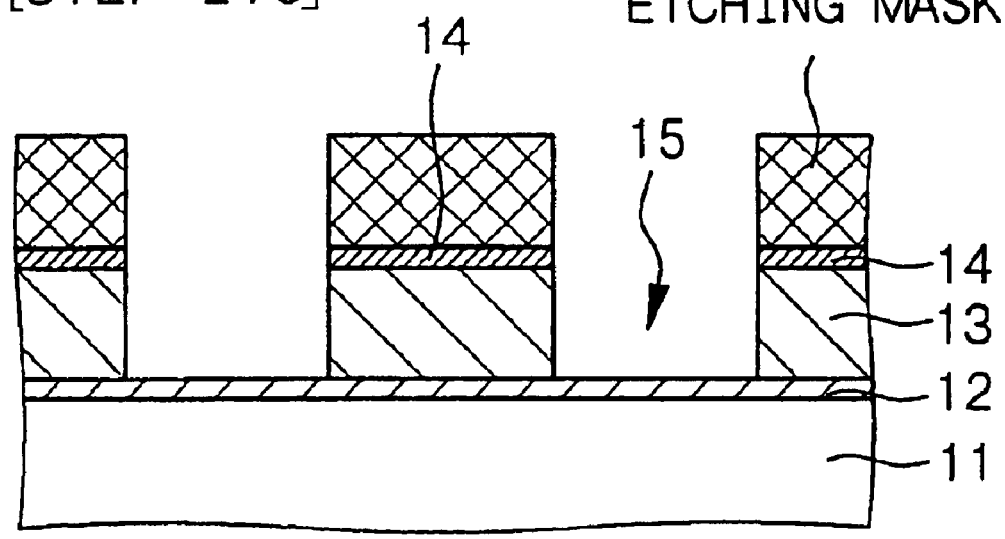

Then, the gate electrode 14 and the insulating layer 13 are etched through an etching mask composed, for example, of a photoresist material according to an RIE method, to form the opening portion 15 through the gate electrode 14 and the insulating layer 13 and to expose the cathode electrode 12 in the bottom portion of the opening portion 15 (see FIG. 7B). The opening portion 15 has a diameter of approximately 2 to 50 μm.

[Step-220]

Figure 8A:
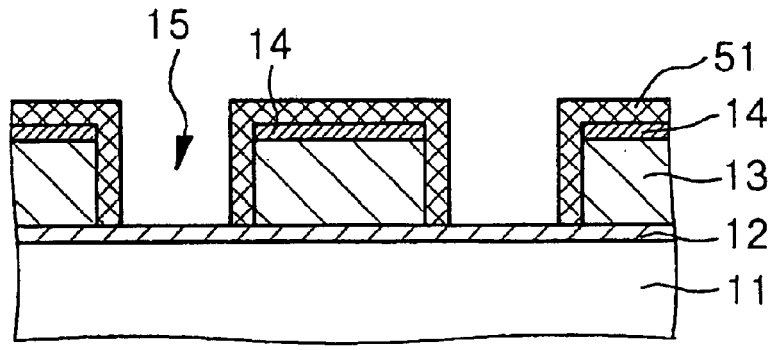
FIGS. 8A, 8B and 8C, following

Then, the etching mask is removed, and a peel layer 51 is formed on the gate electrode 14, the insulating layer 13 and the side wall surface of the opening portion 15 (see FIG. 8A). The above peel layer 51 is formed, for example, by applying a photoresist material onto the entire surface by a spin coating method and patterning the photoresist material layer such that only part on the bottom portion of the opening portion 15 is removed. At this stage, the diameter of the opening portion 15 is substantially decreased to approximately 1 to 20 μm.

[Step-230]

Figure 8B:
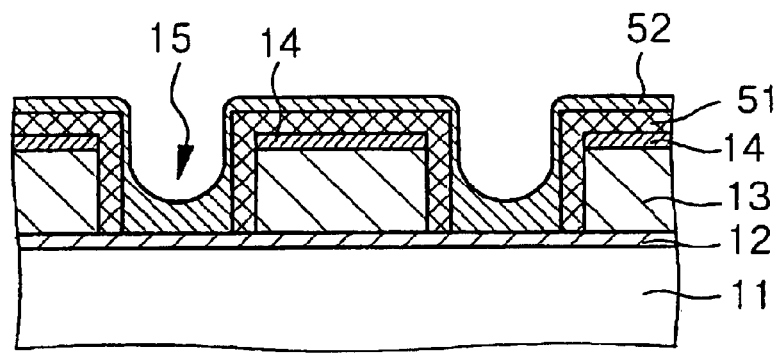

Then, as shown in FIG. 8B, an electrically conductive composition layer 52 made of a composition material is formed on the entire surface. The above composition material contains, for example, 60% by weight of graphite particles having an average particle diameter of approximately 0.1 μm as electrically conductive particles and 40% by weight of No. 4 water glass as a binder. The composition material is spin-coated on the entire surface, for example, at 1400 rpm for 10 seconds. The surface of the electrically conductive composition layer 52 in the opening portion 15 rises along the side wall surface of the opening portion 15 and dents toward the central portion of the opening portion 15 due to the surface tension of the composition material. Then, temporary calcining for removing water contained in the electrically conductive composition layer 52 is carried out, for example, in atmosphere at 400° C. for 30 minutes.

In the composition material, (1) the binder may be a dispersing medium for forming a dispersion of the electrically conductive particles in itself, or (2) the binder may coat each electrically conductive particle, or (3) the binder may constitute a dispersing medium for the electrically conductive particles when the binder is dispersed or dissolved in a proper solvent. A typical example of the above case (3) is water glass, and the water glass can be selected from Nos. 1 to 4 defined under Japan Industrial Standard (JIS) K1408 or products equivalent thereto. Nos. 1 to 4 refer to four grades based on different molar amounts (approximately 2 to 4 mols) of silicon dioxide ($SiO_2$) per mol of sodium oxide ($Na_2O$) as a component of water glass, and greatly differ from one another in viscosity. When water glass is used in a lift-off process, therefore, it is preferred to select optimum water glass while taking into account various conditions such as a kind and a content of the electrically conductive particles to be dispersed in water glass, affinity to the peel layer 51, an aspect ratio of the opening portion 15, and the like, or it is preferred to prepare water glass equivalent to such a grade before use.

The binder is generally poor in electric conductivity. When the content of the binder is too large relative to the content of the electrically conductive particles in the electrically conductive composition, therefore, the electron-emitting portion 16A formed may show an increase in electric resistance value, and electron emission may not proceed smoothly. For example, in a composition material which is a dispersion of carbon-containing material particles as electrically conductive particles in water glass, the content of the carbon-containing material particles based on the total amount of the composition material is preferably determined to be in the range of approximately 30 to 95% by weight while taking into account properties such as an electric resistance value of the electron-emitting portion 16A, a viscosity of the composition material and mutual adhesion of the electrically conductive particles. When the content of the carbon-containing material particles is selected from the above range, the electric resistance value of the electron-emitting portion 16A formed can be sufficiently decreased, and the mutual adhesion of the carbon-containing material particles can be maintained under a good condition. However, when a mixture of carbon-containing material particles with alumina particles is used as electrically conductive particels, the mutual adhesion of the electrically conductive particles is liable to decrease, so that it is preferred to increase the content of the carbon-containing material particles depending upon the content of the alumina particles. In this case, the content of the carbon-containing material particles is particularly preferably 60% by weight or more. The composition material may contain a dispersing agent for stabilizing the dispersing state of the electrically conductive particles and additives such as a pH adjuster, a desiccant, a curing agent and an antiseptic. There may be used a composition material prepared by coating the electrically conductive particles with a binder to prepare a powder and dispersing the powder in a proper dispersing medium.

For example, when the crown-shaped electron-emitting portion 16A has a diameter of approximately 1 to 20 μm and when carbon-containing material particles are used as electrically conductive particles, preferably, the particle diameter of the carbon-containing material particles is approximately in the range of from 0.1 μm to 1 μm. When the particle diameter of the carbon-contaning material particles is in the above range, an edge portion of the crown-shaped electron-emitting portion 16A is imparted with sufficiently high mechanical strength, and the adhesion of the electron-emitting portion 16A to the cathode electrode 12 comes to be excellent.

[Step-240]

Figure 8C:
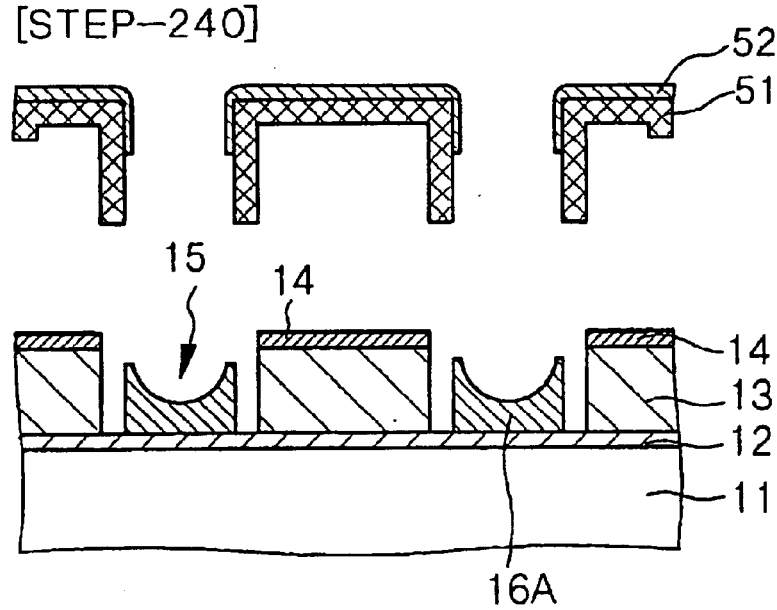

Then, as shown in FIG. 8C, the peel layer 51 is removed. The peeling is carried out by immersion in a 2 weight % sodium hydroxide aqueous solution for 30 seconds. The peeling may be carried out under ultrasonic vibration. In this manner, the peel layer 51 and part of the electrically conductive composition layer 52 on the peel layer 51 are removed together, and only that portion of the electrically conductive material layer 52 which portion is on the exposed cathode electrode 12 in the bottom portion of the opening portion 15 remains. The above remaining portion constitutes the electron-emitting portion 16A. The electron-emitting portion 16A has a surface denting toward the central portion of the opening portion 15 and comes to have the form of a crown. FIGS. 9A and 9B show a state after [Step-240] is finished. FIG. 9B is a schematic perspective view of part of the field emission devices, and FIG. 9A is a schematic partial end view taken along line A—A in FIG. 9B. In FIG. 9B, part of the insulating layer 13 and part of the gate electrode 14 are cut out for showing the whole of the electron-emitting portions 16A. It is sufficient to form approximately 5 to 100 electron-emitting portions 16A per electron-emitting region (overlapping region). For reliably exposing the electrically conductive particles on the surface of each electron-emitting portion 16A, a binder exposed on the surface of each electron-emitting portion 16A may be removed by etching.
[Step-250]

Then, the electron-emitting portion 16A is calcined or sintered. The calcining or sintering is carried out in dry atmosphere at 400° C. for 30 mintues. The calcining or sintering temperature can be selected depending upon the binder contained in the composition material. For example, when the binder is an inorganic material such as water glass, it is sufficient to carry out heat treatment at a temperature at which the inorganic material can be calcined or sintered. When the binder is a thermosetting resin, the heat treatment can be carried out at a temperature at which the thermosetting resin can be cured. For maintaining mutual adhesion of the electrically conductive particles, however, the heat treatment is preferably carried out at a temperature at which the thermosetting resin is neither decomposed to excess nor carbonized. In either case, the heat treatment temperature is required to be a temperature at which neither damage nor a defect is caused on the gate electrode, the cathode electrode and the insulating layer. The heat treatment atmosphere is preferably an inert gas atmosphere for preventing an oxidation from causing an increase in the electric resistivity of the gate electrode and the cathode electrode and for preventing the gate electrode and the cathode electrode from suffering damage or defects. When a thermoplastic resin is used as a binder, no heat treatment may be required in some case.

Example 3

In Example 3, each electron-emitting region is constituted of a plurality of plane-type electron emission devices.

Figure 10A:
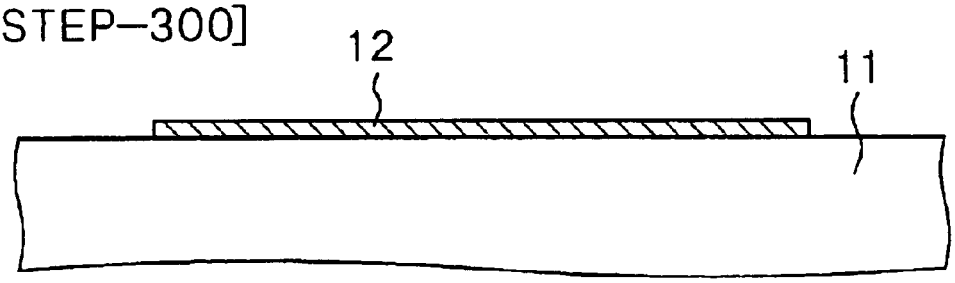
FIGS. 10A, 10B and 10C are schematic partial cross-sectional views of a substrate, etc., for explaining the method for producing a cold cathode field emission device of Example 3 having a first structure of a plane-type cold cathode field emission device.
Figure 10B:
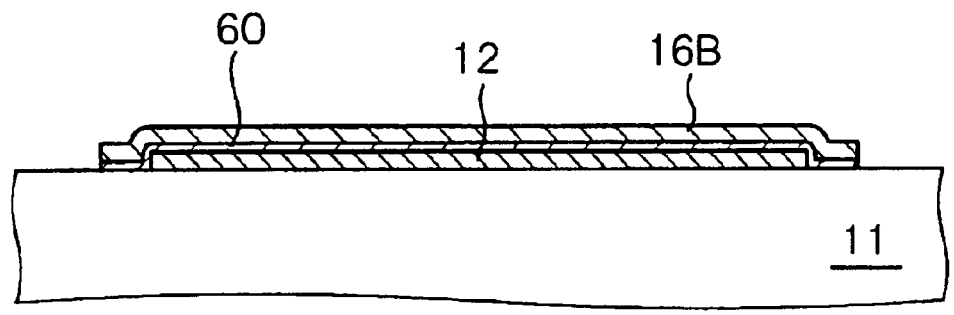
Figure 10C:
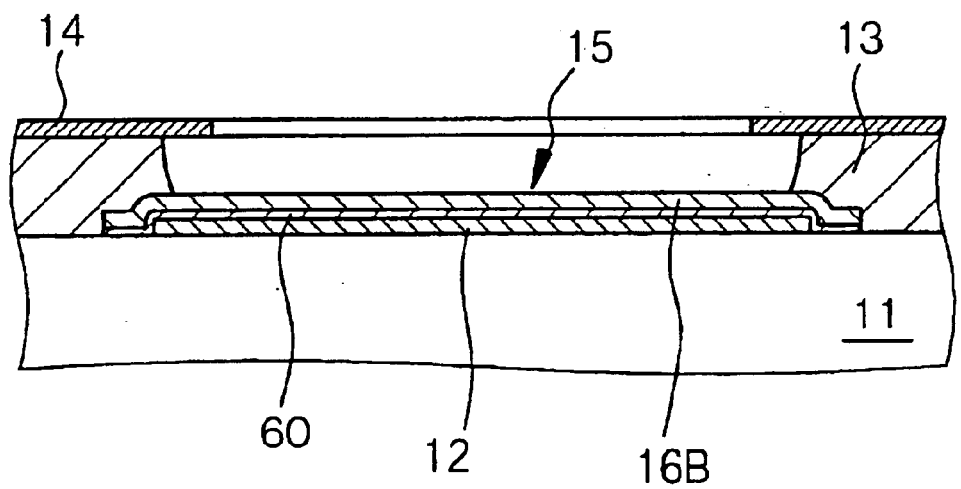

FIG. 10C shows a schematic partial cross-sectional view of a field emission device having the first structure of a plane-type field emission device. The plane-type field emission device comprises a cathode electrode 12 formed on a substrate 11 made, for example, of glass; an insulating layer 13 formed on the substrate 11 and the cathode electrode 12; a gate electrode 14 formed on the insulating layer 13; an opening portion 15 penetrating through the gate electrode 14 and the insulating layer 13; and a flat electron-emitting portion 16B formed on a portion of the cathode electrode 12 which portion is positioned in the bottom portion of the opening portion 15. The electron-emitting portion 16B is formed on the cathode electrode 12 in the form of a stripe extending in the direction perpendicular to the paper surface of FIG. 10C. Further, the gate electrode 14 extends leftward and rightward on the paper surface of FIG. 10C. The cathode electrode 12 and the gate electrode 14 are made of chromium (Cr). Specifically, the electron-emitting portion 16B is constituted of a thin layer made of a graphite powder. A resistance layer 60 made of SiC is formed between the cathode electrode 12 and the electron-emitting portion 16B for stabilizing the performance of the field emission device and attaining uniform electron emission characteristics. In the plane-type field emission device shown in FIG. 10C, the resistance layer 60 and the electron-emitting portion 16B are formed all over the surface of the cathode electrode 12. However, the present invention shall not be limited to such a structure, and it is sufficient to form the electron-emitting portion 16B at least in the bottom portion of the opening portion 15.

The method of producing the plane-type field emission device will be explained hereinafter with reference to FIGS. 10A, 10B and 10C showing the schematic partial cross-sectional views of the substrate, etc.
[Step-300]

First, an electrically conductive material layer made of chromium (Cr) for a cathode electrode is formed on the substrate 11 by a sputtering method and patterned by lithography and a dry etching method, whereby the cathode electrode 12 in the form of a stripe can be formed on the substrate 11 (see FIG. 10A). The cathode electrode 12 extends in the direction perpendicular to the paper surface of FIGS. 10A, 10B and 10C.
[Step-310]

Then, the electron-emitting portion 16B is formed on the cathode electrode 12. Specifically, the resistance layer 60 made of SiC is formed on the entire surface by a sputtering method. Then, the electron-emitting portion 16B made of a graphite powder coating is formed on the resistance layer 60 by a spin coating method and is dried. Then, the electron-emitting portion 16B and the resistance layer 60 are patterned by a known method (see FIG. 10B). The electron-emitting region is constituted of such electron-emitting portions 16B.
[Step-320]

Then, the insulating layer 13 is formed on the entire surface. Specifically, the insulating layer 13 made of $SiO_2$ is formed on the electron-emitting portion 16B and the substrate 11, for example, by a sputtering method. Alternatively, the insulating layer 13 may be formed by a method in which a glass paste is screen-printed or by a method in which a layer of $SiO_2$ is formed by a CVD method. Then, the gate electrode 14 in the form of a stripe is formed on the insulating layer 13.
[Step-330]

Then, after an etching mask is formed on the gate electrode 14 and the insulating layer 13, the opening portion 15 is formed through the gate electrode 14 and the insulating layer 13 to expose the electron-emitting portion 16B in the bottom portion of the opening portion 15. Then, the etching mask is removed, and heat treatment is carried out at 400° C. for 30 minutes for removing an organic solvent in the electron-emitting portion 16B, whereby the field emission device shown in FIG. 10C can be obtained.

Example 4

Figure 11A:
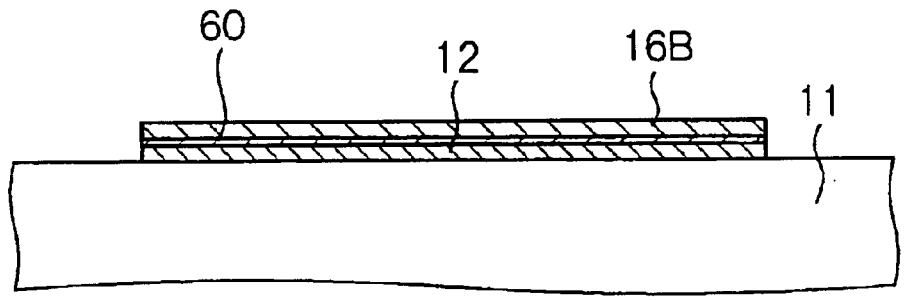
FIGS. 11A, 11B and 11C are schematic partial cross-sectional views of a substrate, etc., for explaining the method for producing a cold cathode field emission device of Example 4 having a first structure of a plane-type cold cathode field emission device.
Figure 11B:
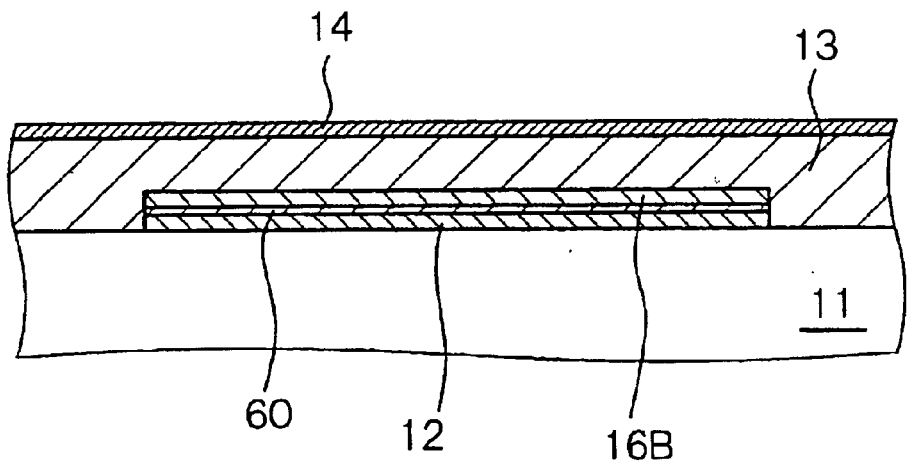
Figure 11C:
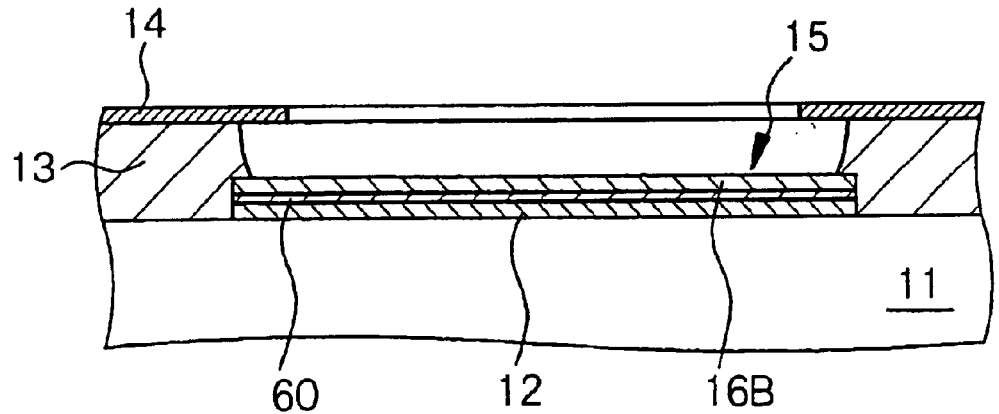

FIG. 11C shows a schematic partial cross-sectional view of a variant of the field emission device having the first structure of the plane-type field emission device. The plane-type field emission device shown in FIG. 11C differs from the plane-type field emission device shown in FIG. 10C in the structure of the electron-emitting portion 16B to some extent. The method for producing such a field emission device will be explained below with reference to FIGS. 11A, 11B and 11C showing schematic partial cross-sectional views of the substrate, etc.
[Step-400]

First, the electrically conductive material layer for a cathode electrode is formed on the substrate 11. Specifically, a resist material layer (not shown) is formed on the entire surface of the substrate 11, and then the resist material layer is removed from a portion where the cathode electrode is to be formed. Then, the electrically conductive material layer made of chromium (Cr) for a cathode electrode is formed on the entire surface by a sputtering method. Further, the resistance layer 60 made of SiC is formed on the entire surface by a sputtering method, and a graphite powder coating layer is formed on the resistance layer 60 by a spin coating method and is dried. Then, the resist material layer is removed with a peeling solution. In this case, the electrically conductive material layer for a cathode electrode, the resistance layer 60 and the graphite powder coating layer, which are formed on the resist material layer, are also removed. In this manner, a structure in which the cathode electrode 12, the resistance layer 60 and the electron-emitting portion 16B are stacked can be obtained according to a so-called lift-off method (see FIG. 11A).

[Step-410]

Then, the insulating layer 13 is formed on the entire surface, and the gate electrode 14 in the form of a stripe is formed on the insulating layer 13 (see FIG. 11B). Then, the opening portion 15 is formed through the gate electrode 14 and the insulating layer 13 to expose the electron-emitting portion 16B in the bottom portion of the opening portion 15 (see FIG. 11C). The electron-emitting region is constituted of the electron-emitting portion 16B formed on the surface of the cathode electrode 12 which surface is exposed in the bottom portion of the opening portion 15.

Example 5

Figure 13A:
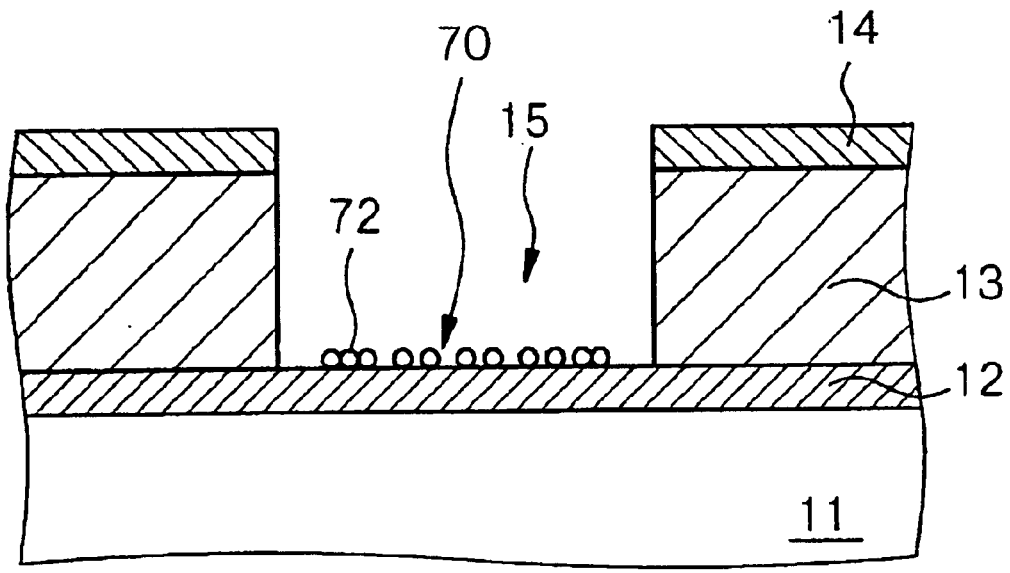
FIGS. 13A and 13B, following
Figure 13B:
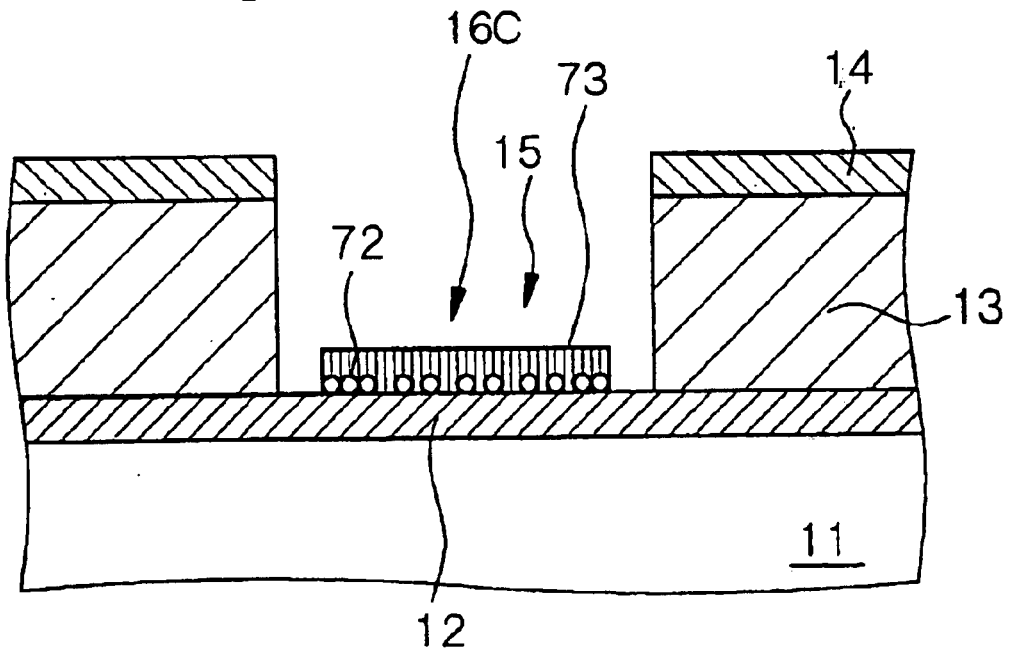

FIG. 13B shows a schematic partial end view of another variant of the electron emission device having the first structure of a plane-type field emission device. In this plane-type field emission device, an electron-emitting portion 16C is constituted of a thin carbon film formed by a CVD method.

It is preferred to constitute the electron-emitting portion of the carbon film, since carbon (C) has a low work function and since a high emitted-electron current can be attained. For allowing the thin carbon film to emit electrons, it is sufficient to bring the thin carbon film into a state where the carbon film is placed in a proper electric field (for example, an electric field having an intensity of approximately $10^6$ volts/m).

When a thin carbon film such as diamond thin film is plasma-etched with oxygen gas with using a resist layer as an etching mask, a deposition product of a $(CH_x)$— or $(CF_x)$-based carbon polymer is generated as a reaction byproduct in the etching reaction system. When a deposition product is generated in the etching reaction system in the plasma etching, generally, the deposition product is deposited on a side wall surface of the resist layer which side wall surface has a low ion incidence probability or is deposited on a processed end surface of a material being etched, to form a so-called side wall protective film, and it contributes to accomplishment of the form obtained by anisotropic processing of a material being etched. When oxygen gas is used as an etching gas, however, the side wall protective film made of the carbon polymer is removed by oxygen gas upon the formation thereof. Further, when oxygen gas is used as an etching gas, the resist layer is worn to a great extent. For these reasons, in the conventional oxygen plasma process of a diamond thin film, the pattern transfer difference of the diamond thin film from the mask is large, and an anisotropic processing is also difficult in many cases.

For overcoming the above problem, for example, there can be employed a constitution in which a thin carbon film selective-growth region is formed in or on the surface of the cathode electrode and an electron-emitting portion made of a thin carbon film is formed on the thin carbon film selective-growth region. That is, in the production of the above electron emission device, the cathode electrode is formed on the substrate, then the thin carbon film selective-growth region is formed in or on the surface of the cathode electrode and then the thin carbon film (corresponding to the electron-emitting portion) is formed on the thin carbon film selective-growth region. The step of forming the thin carbon film selective-growth region in or on the surface of the cathode electrode will be referred to as a thin carbon film selective-growth region formation step.

The above thin carbon film selective-growth region is preferably that portion of the cathode electrode onto which portion metal particles adheres, or that portion of the cathode electrode on which portion a thin metal layer is formed. For making the selective growth of the thin carbon film on the thin carbon film selective-growth region more reliable, desirably, the surface of the thin carbon film selective-growth region has sulfur (S), boron (B) or phosphorus (P) adhering thereto. It is considered that the above materials work as a kind of a catalyst, and the presence of such materials can improve the carbon film more in the property of selective growth. It is sufficient that the thin carbon film selective-growth region should be formed in or on the surface of the portion of the cathode electrode which portion is positioned in the bottom portion of the opening portion. The thin carbon film selective-growth region may be formed so as to extend from the portion of the cathode electrode which portion is positioned in the bottom portion of the opening portion to a surface of a portion of the cathode electrode which portion is located in other than the bottom portion of the opening portion. Further, the thin carbon film selective-growth region may be formed on the entirety of the surface of the portion of the cathode electrode which portion is positioned in the bottom portion of the opening portion, or it may be formed in part of the above portion.

Preferably, the thin carbon film selective-growth region formation step comprises the step of allowing metal particles to adhere onto, or forming a metal thin layer on, the surface of the portion of the cathode electrode (sometimes, to be referred to as cathode electrode surface) on which portion the thin carbon film selective-growth region is to be formed, whereby there is formed the thin carbon film selective-growth region constituted of the portion of the cathode electrode which portion has the surface onto which the metal particles adhere or on which the metal thin layer is formed. In this case, for making more reliable the selective growth of the carbon film on the thin carbon film selective-growth region, desirably, sulfur (S), boron (B) or phosphorus (P) is allowed to adhere onto the surface of the thin carbon film selective-growth region, whereby the carbon film can be more improved in the property of selective growth. The method for allowing sulfur, boron or phosphorus to adhere onto the surface of the thin carbon film selective-growth region includes, for example, a method in which a compound layer composed of a compound containing sulfur, boron or phosphorus is formed on the surface of the thin carbon film selective-growth region, and then, the compound layer is heat-treated to decompose the compound constituting the compound layer, to retain sulfur, boron or phosphorus on the surface of the thin carbon film selective-growth region. The sulfur-containing compound includes thionaphthene, thiophthene and thiophene. The boron-containing compound includes triphenylboron. The phosphorus-containing compound includes triphenylphosphine.

Otherwise, for making more reliable the selective growth of the carbon film on the thin carbon film selective-growth region, after the metal particles are allowed to adhere onto, or the metal thin layer is formed on, the cathode electrode surface, it is preferred to remove a metal oxide (so-called natural oxide film) on the surface of each metal particle or on the surface of the metal thin layer. The metal oxide on the surface of each metal particle or on the surface of the metal thin layer is preferably removed, for example, by plasma reduction treatment in a hydrogen gas atmosphere according to a microwave plasma method, a transformer-coupled plasma method, an inductively coupled plasma method, an electron cyclotron resonance plasma method or an RF plasma method; by sputtering in an argon gas atmosphere; or by washing, for example, with an acid such as hydrofluoric acid or a base. When the step of allowing sulfur, boron or phosphorus to adhere onto the surface of the thin carbon film selective-growth region, or the step of removing the metal oxide on the surface of each metal particle or on the surface of the metal thin layer is included, preferably, these steps are carried out after the formation of the opening portion in the insulating layer and before the formation of the thin carbon film on the thin carbon film selective-growth region.

The method for allowing the metal particles to adhere onto the cathode electrode surface for obtaining the thin carbon film selective-growth region includes, for example, a method in which, in a state where a region other than the region in the cathode electrode where the thin carbon film selective-growth region is to be formed is covered with a proper material (for example, a mask layer), a layer composed of a solvent and the metal particles is formed on the cathode electrode surface where the thin carbon film selective-growth region is to be formed, and then, the solvent is removed while retaining the metal particles. Alternatively, the step of allowing the metal particles to adhere onto the cathode electrode surface includes, for example, a method in which, in a state where a region other than the region in the cathode electrode where the thin carbon film selective-growth region is to be formed is covered with a proper material (for example, a mask layer), metal compound particles containing metal atoms constituting the metal particles are allowed to adhere onto the cathode electrode surface, and then the metal compound particles are heated to decompose them, to obtain the thin carbon film selective-growth region constituted of the portion of the cathode electrode which portion has the surface onto which the metal particles adhere. In the above method, specifically, a layer composed of a solvent and metal compound particles is formed on the cathode electrode surface where the thin carbon film selective-growth region is to be formed, and the solvent is removed while retaining the metal compound particles. The above metal compound particles are preferably composed of at least one material selected from the group consisting of halides (for example, iodides, chlorides, bromides, etc.), oxides and hydroxides of the metal for constituting the metal particles. In the above methods, the material (for example, mask layer) covering the region other than the region in the cathode electrode where the thin carbon film selective-growth region is to be formed is removed at a proper stage.

The method for forming the metal thin layer on the cathode electrode surface for obtaining the thin carbon film selective-growth region includes, for example, known methods such as an electroplating method, an electroless plating method, a chemical vapor deposition method (CVD method) including an MOCVD method, a physical vapor deposition method (PVD method), etc., which are carried out in a state where a region other than the region in the cathode electrode where the thin carbon film selective-growth region is to be formed is covered with a proper material. The physical vapor deposition method includes (a) vacuum deposition methods such as an electron beam heating method, a resistance heating method and a flash deposition method, (b) a plasma deposition method, (c) sputtering methods such as a bipolar sputtering method, a DC sputtering method, a DC magnetron sputtering method, a high-frequency sputtering method, a magnetron sputtering method, an ion beam sputtering method and a bias sputtering method, and (d) ion plating methods such as a DC (direct current) method, an RF method, a multi-cathode method, an activating reaction method, an electric field deposition method, a high-frequency ion plating method and a reactive ion-plating method.

The above metal particles or the metal thin layer for forming the carbon film selective-growth region are/is composed of at least one metal selected from the group consisting of molybdenum (Mo), nickel (Ni), titanium (Ti), chromium (Cr), cobalt (Co), tungsten (W), zirconium (Zr), tantalum (Ta), iron (Fe), copper (Cu), platinum (Pt) and zinc (Zn).

The above thin carbon film includes a graphite thin film, an amorphous carbon thin film, a diamond-like carbon thin film and a fullerene thin film. The method for forming the thin carbon film includes CVD methods based on a microwave plasma method, a transformer-coupled plasma method, an inductively coupled plasma method, an electron cyclotron resonance plasma method or an RF plasma method. The form of the thin carbon film includes the form of a thin film, and it also includes the form of a carbon whisker and the form of a nano-tube (including hollow and solid tubes).

The cathode electrode may have any structure such as a single-layer structure of an electrically conductive material layer or a three-layered structure having a lower electrically conductive material layer, a resistance layer formed on the lower electrically conductive material layer and an upper electrically conductive material layer formed on the resistance layer. In the latter case, the thin carbon film selective-growth region is formed on a surface of the upper electrically conductive material layer. The above-formed resistance layer works to attain uniform electron emission properties of the electron-emitting portions.

One example of the method for producing the plane-type electron emission device will be explained hereinafter with reference to schematic partial end views of the substrate, etc., shown in FIGS. 12A, 12B, 13A and 13B.

[Step-500]

First, an electrically conductive material layer for a cathode electrode is formed on the substrate 11 made, for example, of glass. Then, the electrically conductive material layer is patterned by known lithography and a known RIE method, to form the cathode electrode 12 having the form of a stripe on the substrate 11. The cathode electrode 12 in the form of a stripe extends leftward and rightward on the paper surface of the drawing. The cathode electrode 12 is made, for example, of an approximately 0.2 μm thick chromium (Cr) layer formed by a sputtering method.

[Step-510]

Then, the insulating layer 13 is formed on the entire surface, specifically, on the substrate 11 and the cathode electrode 12.

[Step-520]

Figure 12A:
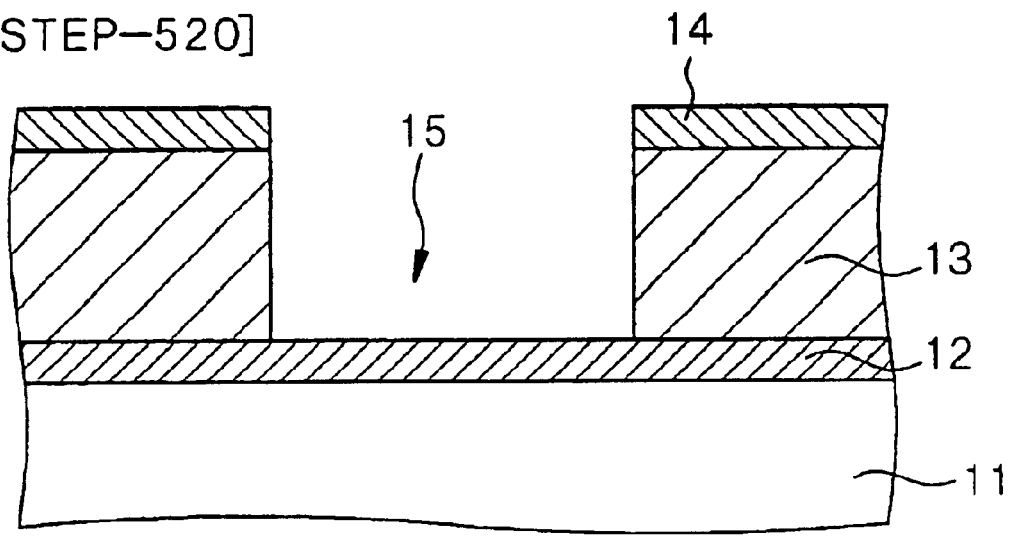
FIGS. 12A and 12B are schematic partial end views of a substrate, etc., for explaining the method for producing a cold cathode field emission device of Example 5 having a first structure of a plane-type cold cathode field emission device.
Figure 12B:
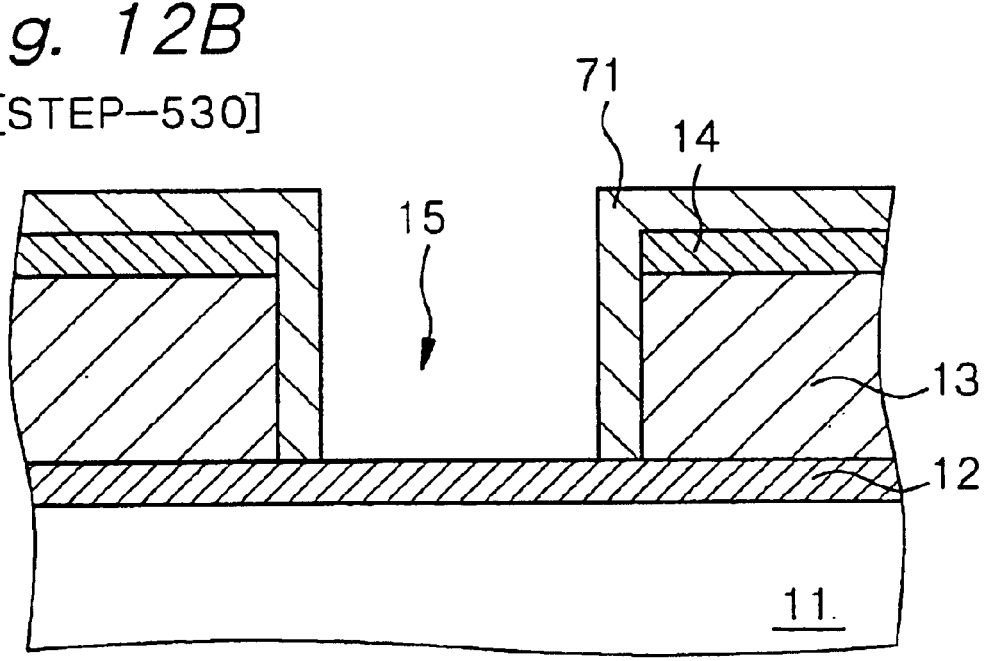

Then, the gate electrode 14 having the form of a stripe is formed on the insulating layer 13, and then the opening portion 15 is formed in the gate electrode 14 and the insulating layer 13 to expose the cathode electrode 12 in the bottom portion of the opening portion 15 (see FIG. 12A). The gate electrode 14 in the form of a stripe extends perpendicularly to the paper surface of the drawing. When viewed as a plan view, the opening portion 15 has the form of a circle having a diameter of 1 to 30 μm. It is sufficient to form such opening portions 15 in the quantity of approximately 1 to 3000 per pixel (overlapping region).

[Step-530]

Then, the electron-emitting portion 16C is formed on the cathode electrode 12 exposed in the bottom portion of the opening portion 15. Specifically, the thin carbon film selective-growth region 70 is formed on the surface of the portion of the cathode electrode 12 which portion is positioned in the bottom portion of the opening portion 15. For this purpose, first, a mask layer 71 is formed so as to expose the surface of the cathode electrode 12 in the central portion of the bottom portion of the opening portion 15 (see FIG. 12B). Specifically, a resist material layer is formed on the entire surface including the inner surface of the opening portion 15 by a spin coating method, and then a hole is formed in the resist material layer positioned in the central portion of the bottom portion of the opening portion 15 by lithography, whereby the mask layer 71 can be obtained. The mask layer 71 covers part of the cathode electrode 12 which part is positioned in the bottom portion of the opening portion 15, the side wall of the opening portion 15, the gate electrode 14 and the insulating layer 13. While the thin carbon film selective-growth region is to be formed on the surface of the portion of the cathode electrode 12 which portion is positioned in the central portion of the bottom portion of the opening portion 15 in a step to come thereafter, the above mask layer can reliably prevent short-circuiting between the cathode electrode 12 and the gate electrode 14 with metal particles.

Then, metal particles are allowed to adhere onto the mask layer 71 and the exposed surface of the cathode electrode 12. Specifically, a dispersion prepared by dispersing nickel (Ni) fine particles in a polysiloxane solution (using isopropyl alcohol as a solvent) is applied to the entire surface by a spin coating method, to form a layer composed of the solvent and the metal particles on the surface of the portion of the cathode electrode 12 on which portion the thin carbon film selective-growth region 70 is to be formed. Then, the mask layer 71 is removed, and the solvent is removed by heating the above layer up to approximately 400° C., to retain the metal particles 72 on the exposed surface of the cathode electrode 12, whereby the thin carbon film selective-growth region 70 can be obtained (see FIG. 13A). The above polysiloxane works to fix the metal particles 72 to the exposed surface of the cathode electrode 12 (so-called adhesive function).

[Step-540]

Then, the thin carbon film 73 having a thickness of approximately 0.2 μm is formed on the thin carbon film selective-growth region 70, to obtain the electron-emitting portion 16C. FIG. 13B shows the thus-obtained state. Table 1 shows a condition of forming the thin carbon film 73 by a microwave plasma CVD method.

TABLE 1

| (Condition of forming thin carbon film) | |
|---|---|
| Gas used | $CH_4/H_2$ = 100/10 SCCM |
| Pressure | $1.3 \times 10^3$ Pa |
| Microwave power | 500 W (13.56 Mz) |
| Film forming temperature | 500° C. |

Example 6

Figure 14A:
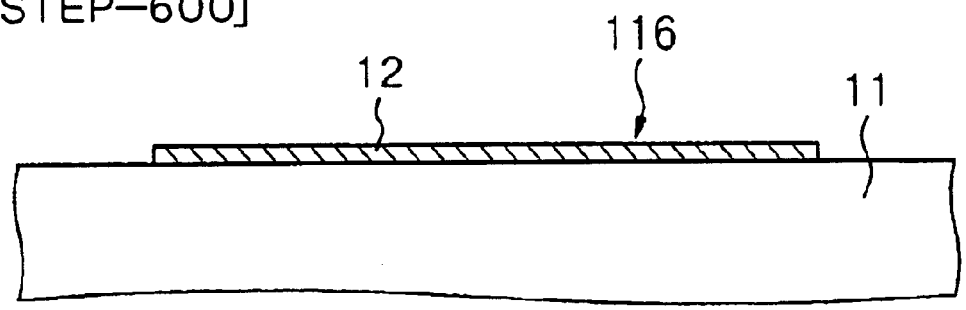
FIGS. 14A, 14B and 14C are schematic partial cross-sectional views of a substrate, etc., for explaining the method for producing a cold cathode field emission device of Example 6 having a second structure of a flat-type cold cathode field emission device.
Figure 14B:
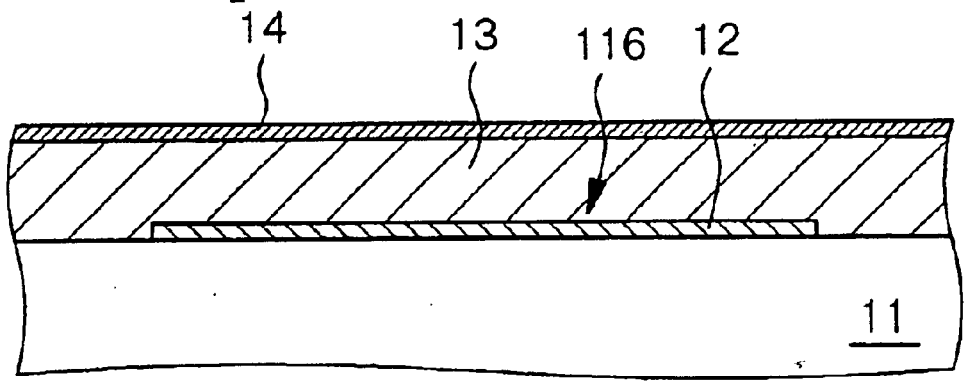
Figure 14C:
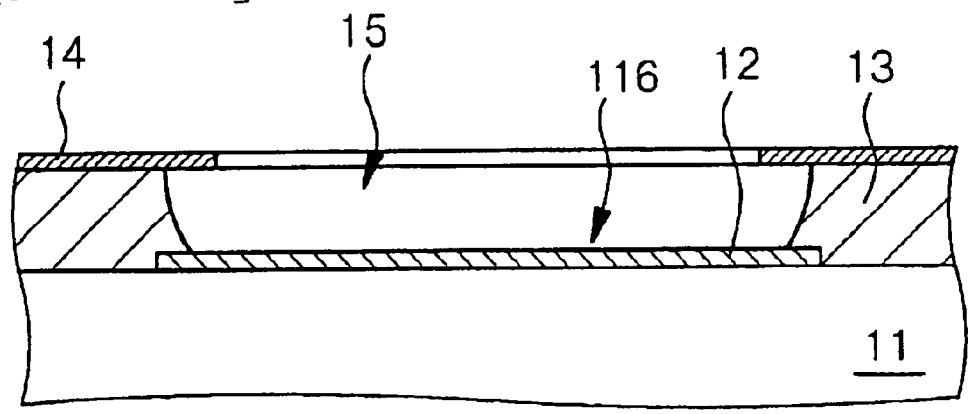

FIG. 14C shows a schematic partial cross-sectional view of a field emission device having the second structure of a flat-type field emission device. The flat-type field emission device comprises a stripe-shaped cathode electrode 12 formed on a substrate 11 made, for example, of glass; an insulating layer 13 formed on the substrate 11 and the cathode electrode 12; a stripe-shaped gate electrode 14 formed on the insulating layer 13; and an opening portion 15 which penetrates the gate electrode 14 and the insulating layer 13 and has the cathode electrode 12 exposed in the bottom portion thereof. The cathode electrode 12 extends in the direction perpendicular to the paper surface of FIG. 14C, and the gate electrode 14 extends rightward and leftward on the paper surface of the FIG. 14C. The cathode electrode 12 and the gate electrode 14 are made of chromium (Cr), and the insulating layer 13 is made of $SiO_2$. A portion of the cathode electrode 12 which portion is exposed in the bottom portion of the opening portion 15 corresponds to an electron-emitting region 116.

The method for producing the flat-type field emission device will be explained hereinafter with reference to FIGS. 14A, 14B and 14C showing schematic partial cross-sectional views of the substrate, etc.

[Step-600]

First, the cathode electrode 12 which is to work as the electron-emitting region 116 is formed on the substrate 11. Specifically, an electrically conductive material layer made of chromium (Cr) for constituting a cathode electrode is formed on the substrate 11 by a sputtering method, and then the electrically conductive material layer is patterned by lithography and a dry etching method, whereby the cathode electrode 12 in the form of a stripe can be formed on the substrate 11 (see FIG. 14A). The cathode electrode 12 extends in the direction perpendicular to the paper surface of FIGS. 14A, 14B and 14C.

[Step-610]

Then, the insulating layer 13 made of $SiO_2$ is formed on the substrate 11 and the cathode electrode 12, for example, by a CVD method. Alternatively, the insulating layer 13 can be formed from a glass paste according to a screen printing method.

[Step-620]

The gate electrode 14 in the form of a stripe is formed on the insulating layer 13. Specifically, an electrically conductive material layer made of chromium is formed on the entire surface by a sputtering method, and then the electrically conductive material layer is patterned according to lithography and a dry etching method, whereby the stripe-shaped gate electrode 14 can be formed (see FIG. 14B). The gate electrode 14 extends leftward and rightward on the paper surface of FIGS. 14B and 14C. The stripe-shaped gate electrode 14 can be formed directly on the insulating layer 13, for example, by a screen printing method.

[Step-630]

Then, the opening portion 15 is formed in the gate electrode 14 and the insulating layer 13 to expose the cathode electrode 12 in the bottom portion of the opening portion 15. The cathode electrode 12 is to work as the electron-emitting region 116 (see FIG. 14C).

Example 7

Figure 15A:
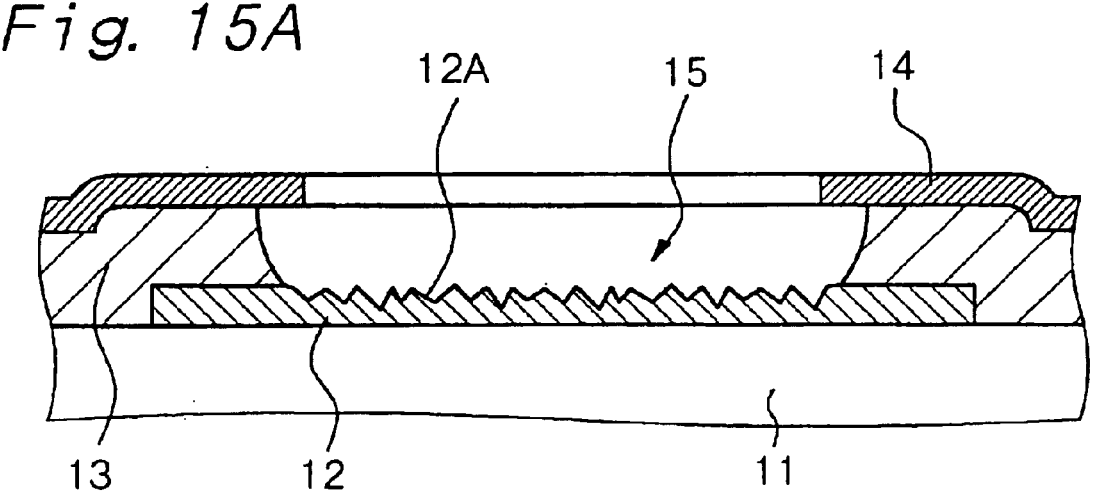
FIGS. 15A and 15B are schematic partial cross-sectional views of a variant of the cold cathode field emission device having the second structure of the flat-type cold cathode field emission device.

FIG. 15A shows a schematic partial cross-sectional view of a flat-type field emission device. The flat-type field emission device shown in FIG. 15A differs from the flat-type field emission device shown in FIG. 14C in that a fine convexo-concave portion 12A is formed in the surface (corresponding to the electron-emitting region 116) of the cathode electrode 12 which surface is exposed in the bottom portion of the opening portion 15. The above flat-type field emission device can be produced by the following method.

[Step-700]

In the same manner as in [Step-600] to [Step-620] in Example 6, the stripe-shaped cathode electrode 12 is formed on the substrate 11, the insulating layer 13 is formed on the entire surface, and then the stripe-shaped gate electrode 14 is formed on the insulating layer 13. That is, a tungsten layer having a thickness of approximately 0.2 µm is formed on the substrate 11 made, for example, of glass by a sputtering method, and the tungsten layer is patterned in the form of a stripe according to conventional procedures, to form the cathode electrode 12. Then, the insulating layer 13 is formed on the substrate 11 and the cathode electrode 12. The insulating layer 13 can be formed by a CVD method using TEOS (tetraethoxysilane) as a source gas. Further, an approximately 0.2 µm thick electrically conductive material layer made of chromium is formed on the insulating layer 13 and patterned in the form of a stripe, to form the gate electrode 14. A state where the above process is thus far completed is substantially as shown in FIG. 14B.

[Step-710]

Then, in the same manner as in [Step-630], the opening portion 15 is formed in the gate electrode 14 and the insulating layer 13, to expose the cathode electrode 12 in the bottom portion of the opening portion 15. Then, a fine convexo-concave portion 12A is formed in a portion of the cathode electrode 12 which portion is exposed in the bottom portion of the opening portion 15. For forming the fine convexo-concave portion 12A, $SF_6$ is used as an etching gas, and dry etching is carried out according to an RIE method under a condition where the etching rate differs between the crystal grains and the grain boundary of tungsten constituting the cathode electrode 12. As a result, the fine convexo-concave portion 12A having dimensions nearly reflecting the crystal grain diameter of the tungsten can be formed.

In the above flat-type field emission device, an intense electric field from the gate electrode 14 is applied to the fine convexo-concave portion 12A of the cathode electrode 12, more specifically to convex portions of the fine convexo-concave portion 12A. In this case, the electric field applied on the convex portions is intense as compared with a case where the surface of the cathode electrode 12 is flat and smooth, so that electrons are efficiently emitted from the convex portions due to a quantum tunnel effect. It can be therefore expected that the flat-panel display into which the above flat-type field emission devices are incorporated is improved in brightness as compared with the flat-type field emission device having a simply flat and smooth cathode electrode 12 exposed in the bottom portion of the opening portion 15. In the flat-type field emission device shown in FIG. 15A, therefore, a sufficient current density of emitted electrons can be obtained even if the potential difference between the gate electrode 14 and the cathode electrode 12 is relatively small, and higher brightness of the flat-panel display can be achieved. In other words, the gate voltage required can be decreased if the levels of the brightness are the same, so that the power consumption can be lowered.

In the above embodiment, the opening portion 15 is formed by etching the insulating layer 13 and then the fine convexo-concave portion 12A is formed in the cathode electrode 12 by an anisotropic etching method. However, the fine convexo-concave portion 12A can be also simultaneously formed by the etching which is carried out for forming the opening portion 15. That is, when the insulating layer 13 is etched, an anisotropic etching condition which is expected to have ion-sputtering functions to some extent is employed, and the etching is continued until after the opening portion 15 having a perpendicular wall is formed, whereby the fine convexo-concave portion 12A can be formed in that portion of the cathode electrode 12 which is exposed in the bottom portion of the opening portion 15. Then, the insulating layer 13 can be isotropically etched.

In a step similar to [Step-600], an electrically conductive material layer made of tungsten for a cathode electrode is formed on the substrate 11 by a sputtering method, and then, the above electrically conductive material layer is patterned by lithography and a dry etching method. Then, the fine convexo-concave portion 12A is formed in a surface of the above electrically conductive material layer, and steps similar to [Step-610] to [Step-630] are carried out, whereby a field emission device similar to one shown in FIG. 15A can be produced.

Otherwise, in a step similar to [Step-600], the electrically conductive material layer made of tungsten for a cathode electrode is formed on the substrate 11 by a sputtering method, and then, the fine convexo-concave portion 12A is formed in a surface of the above electrically conductive material layer. Then, the above electrically conductive material layer is patterned by lithography and a dry etching method, and steps similar to [Step-610] to [Step-630] are carried out, whereby a field emission device similar to one shown in FIG. 15A can be produced.

Figure 15B:
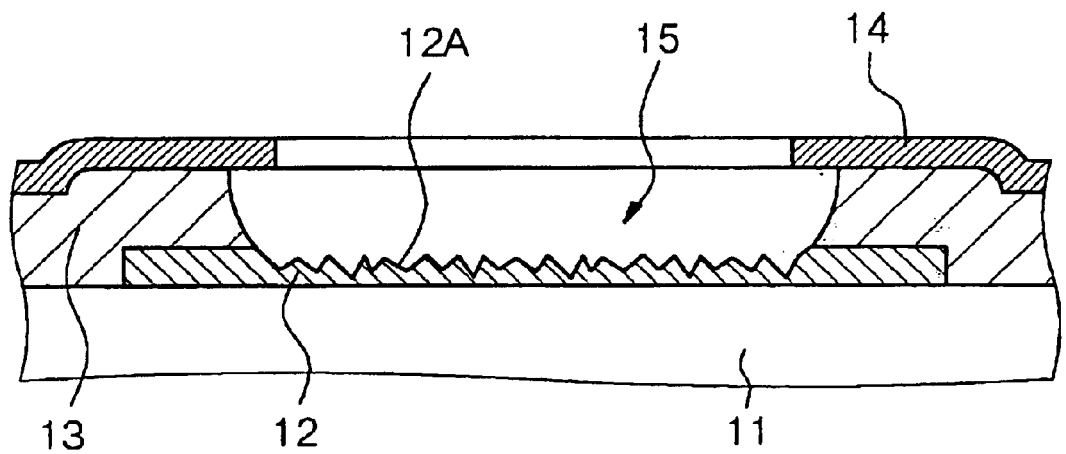

FIG. 15B shows a variant of the field emission device shown in FIG. 15A. In the field emission device shown in FIG. 15B, the average height position of peaks of the fine convexo-concave portion 12A is present at a level lower than the lower surface of the insulating layer 13 on the substrate side (that is, lowered). For producing such a field emission device, the dry etching in a step similar to [Step-710] can be continued for a longer period of time. In such a constitution, the electric field intensity near the central portion of the opening portion 15 can be further increased.

Figure 16:
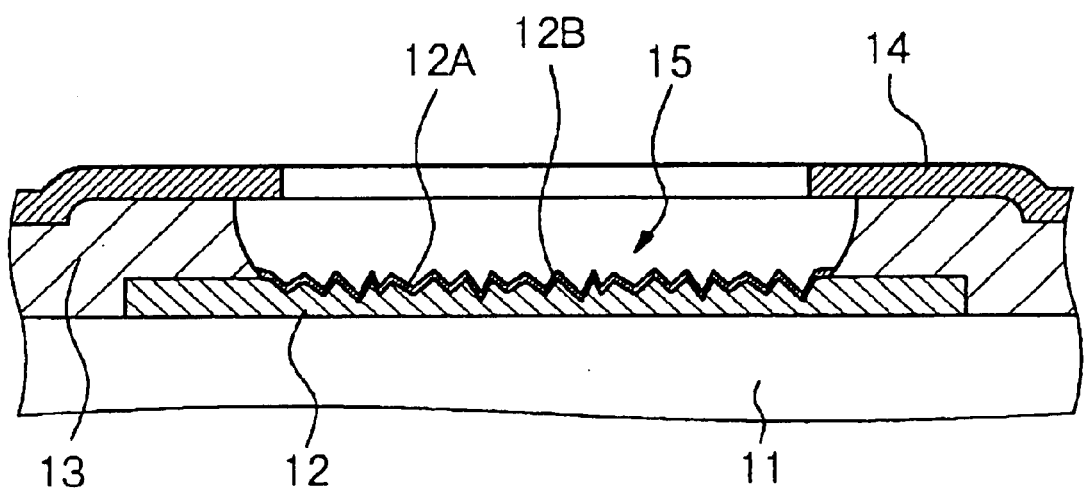
FIG. 16 is a schematic partial cross-sectional view of another variant of the cold cathode field emission device having the second structure of the flat-type cold cathode field emission device.

FIG. 16 shows a flat-type field emission device in which a coating layer 12B is formed on the surface of the cathode electrode 12 corresponding to the electron-emitting region 116 (more specifically, at least on the fine convexo-concave portion 12A).

Preferably, the above coating layer 12B is made of a material having a smaller work function Φ than a material constituting the cathode electrode 12. The material for the coating layer 12B can be determined depending upon the work function of a material constituting the cathode electrode 12, a potential difference between the gate electrode 14 and the cathode electrode 12, and the current density of emitted electrons to be required. The material for the coating layer 12B includes amorphous diamond. When the coating layer 12B is made of amorphous diamond, the current density of emitted electrons required for a flat-panel display can be obtained at an electric field of $5 \times 10^7$ V/m or less.

The thickness of the coating layer 12B is determined to such an extent that the coating layer 12B can reflect the fine convexo-concave portion 12A. That is because it is meaningless to form the fine convexo-concave portion 12A if the concave portions of the fine convexo-concave portion 12A are filled with the coating layer 12B to flatten the surface of the electron-emitting region. Therefore, when the fine convexo-concave portion 12A is formed while reflecting, for example, crystal grain diameters of the electron-emitting region, preferably, the thickness of the coating layer 12B is approximately 30 to 100 nm, although the thickness differs depending upon dimensions of the fine convexo-concave portion 12A. When the average height position of peaks of the fine convexo-concave portion 12A is lowered to a level below the lower surface position of the insulating layer, to be exact, it is more preferred to lower the average height position of peaks of the coating layer 12B to a level below the lower surface position of the insulating layer.

Specifically, after [Step-710], the coating layer 12B made of amorphous diamond can be formed on the entire surface, for example, by a CVD method. The coating layer 12B is also deposited on an etching mask (not shown) formed on the gate electrode 14 and the insulating layer 13. This deposit portion is removed concurrently with the removal of the etching mask. The coating layer 12B can be formed by a CVD method using, for example, $CH_4/H_2$ mixed gas or $CO/H_2$ mixed gas as a source gas, and the coating layer 12B made of amorphous diamond is formed by thermal decomposition of the compound containing carbon.

Otherwise, the field emission device shown in FIG. 16 can be formed as follows. In a step similar to [Step-600], an electrically conductive material layer made of tungsten for a cathode electrode is formed on the substrate 11 by a sputtering method, then, the above electrically conductive material layer is patterned by lithography and a dry etching method, and then, the fine convexo-concave portion 12A is formed in a surface of the above electrically conductive material layer. Then, the coating layer 12B is formed, and then, procedures similar to those in [Step-610] to [Step-630] are carried out.

Otherwise, in a step similar to [Step-600], an electrically conductive material layer made of tungsten for a cathode electrode is formed on the substrate 11 by a sputtering method, then, the fine convexo-concave portion 12A is formed in a surface of the above electrically conductive material layer, and then, the coating layer 12B is formed. Then, the coating layer 12B and the above electrically conductive material layer are patterned by lithography and a dry etching method, and procedures similar to those in [Step-610] to [Step-630] are carried out, whereby the field emission device shown in FIG. 16 can be produced.

Otherwise, the material for the coating layer can be properly selected from materials which have a larger secondary electron gain δ than an electrically conductive material which is to constitute the cathode electrode.

The coating layer may be formed on the electron-emitting region 116 (on the surface of the cathode electrode 12) of the flat-type field emission device shown in FIG. 14C. In this case, after [Step-630], the coating layer 12B can be formed on the surface of the cathode electrode 12 which surface is exposed in the bottom portion of the opening portion 15. Otherwise, in [Step-600], for example, an electrically conductive material layer for a cathode electrode is formed on the substrate 11, then, the coating layer 12B is formed on the above electrically conductive material layer, and these layers are patterned by lithography and a dry etching method.

Example 8

Figure 19A:
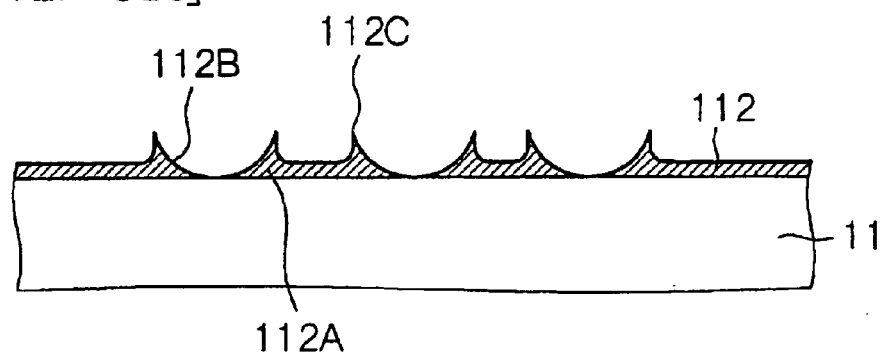
FIGS. 19A and 19B, following
Figure 19B:
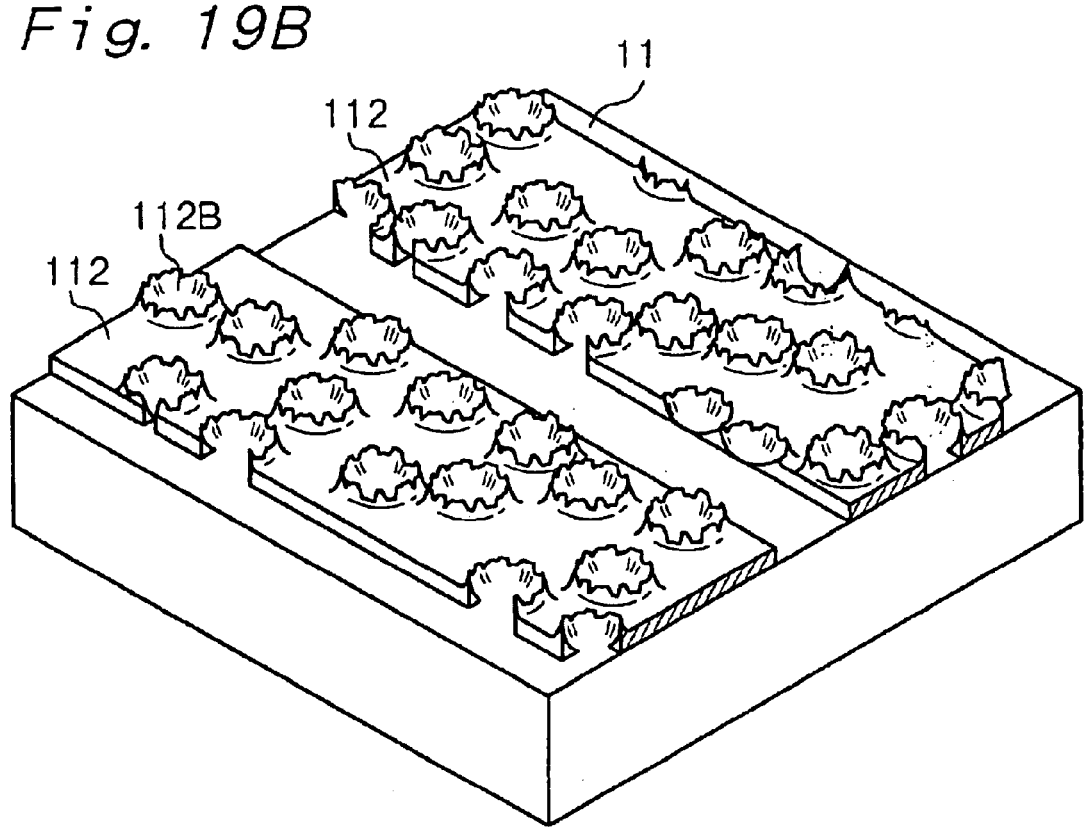
Figure 20A:
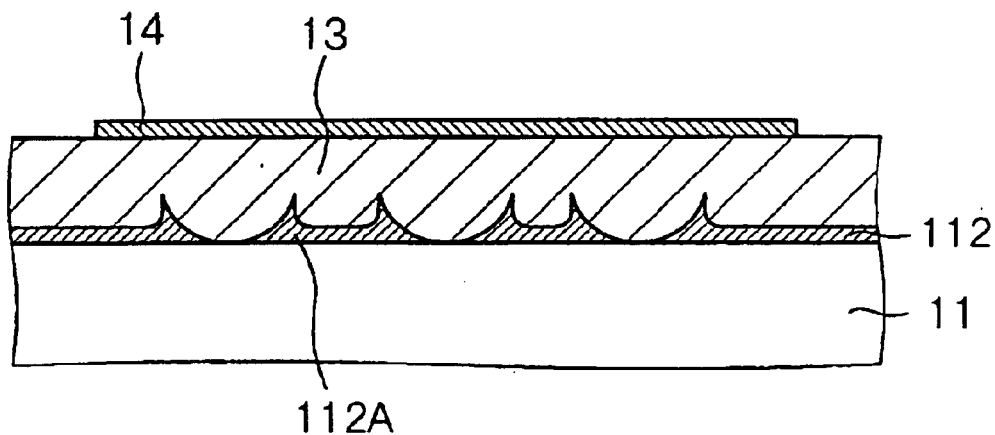
FIGS. 20A and 20B, following
Figure 20B:
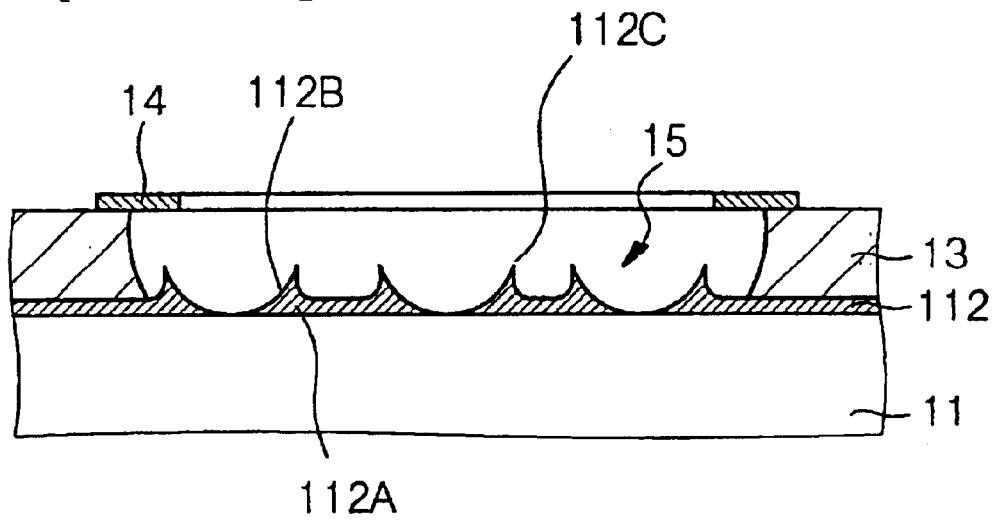

FIG. 20B shows a schematic partial cross-sectional view of the crater-type field emission device. In the crater-type field emission device, a cathode electrode 112 having a plurality of projection portions 112A for emitting electrons and concave portions 112B each of which is surrounded by the projection portion 112A is provided on the substrate 11. FIG. 19B shows a schematic perspective view of the crater-type field emission device from which an insulating layer 13 and a gate electrode 14 are removed.

While the form of each concave portion is not specially limited, each concave portion typically has a nearly spherical surface, which is related to the following fact. In the production of the above crater-type field emission device, spheres are used, and part of each sphere is reflected in the formation of each concave portion 112B. When each concave portion 112B has a nearly spherical surface, the projection portion 112A surrounding the concave portion 112B is ringed or circular, and in this case, the concave portion 112B and the projection portion 112A as a whole have a crater-like or caldera-like form. The projection portion 112A is for emitting electrons, so that the top end portion 112C of each particularly preferably is sharp in view of improving electron emission efficiency. The profile of top end portion 112C of each projection portion 112A may have an irregular convexo-concave form or may be flat. The layout of the projection portions 112A per pixel may be regular or random. Each concave portion 112B may be surrounded by the projection portion 112A continued along the circumferential direction of the concave portion 112B, and in some cases, each concave portion 112B may be surrounded by the projection portion 112A discontinuous along the circumferential direction of the concave portion 112B.

In the method of producing the above crater-type field emission device, more specifically, the step of forming the cathode electrode in the form of a stripe on the substrate comprises the steps of forming a cathode electrode in the form of a stripe on the substrate, the cathode electrode covering a plurality of spheres; and removing the spheres to remove a portion of the cathode electrode which portion covers the spheres, to form the cathode electrode having a plurality of projection portions for emitting electrons and concave portions each of which is surrounded by the projection portion and reflects part of the sphere.

Preferably, the spheres are removed by state change and/or chemical change of the spheres. The state change and/or chemical change of the sphere refer(s) to changes such as expansion, sublimation, foaming, gas generation, decomposition, combustion and carbonization and combinations of these. For example, when the spheres are made of an organic material, more preferably, the spheres are removed by combustion. The removal of the spheres and the removal of portion of the cathode electrode which portion covers the sphere are not necessarily required to take place concurrently, or the removal of the spheres and the removal of portions of the cathode electrode, the insulating layer and the gate electrode which portions cover the sphere are not necessarily required to take place concurrently. For example, when part of the spheres remain after the portion of the cathode electrode which portion covers the sphere is removed or after the above portion and the portions of the insulating layer and the gate electrode are removed, the remaining spheres can be removed later.

In particular, when the spheres are made of an organic material and when the spheres are combusted, for example, carbon monoxide, carbon dioxide and vapor steam are generated to increase a pressure in a closed space near the sphere, and the cathode electrode near the sphere bursts when a pressure durability limit is exceeded. The portion of the cathode electrode which portion covers the sphere is dissipated by the force of the burst, to form the projection portion and the concave portion, and the sphere is also removed. Otherwise, when the spheres are, for example, combusted, the cathode electrode, the insulating layer and the gate electrode burst according to a similar mechanism when a pressure durability limit is exceeded. The portions of the cathode electrode, the insulating layer and the gate electrode which portions cover the sphere are dissipated by the force of the burst, to form the projection portion and the concave portion and to form the opening portion at the same time, and the sphere is also removed. That is, no opening portion exists in the insulating layer and the gate electrode before the removal of the spheres, and the opening portion is formed together with the removal of the sphere. In this case, the initial process of combustion proceeds in a closed space, so that part of the spheres may be carbonized. Preferably, the thickness of portion of the cathode electrode which portion covers the sphere is decreased to such an extent that said portion can be dissipated by the burst. Otherwise, preferably, the thickness of each of portions of the cathode electrode, the insulating layer and the gate electrode which portions cover the sphere is decreased to such an extent that said portions can be dissipated by the burst. In the insulating layer, particularly preferably, its portion covering no spheres has a thickness nearly equal to a diameter of each sphere.

In Example 10 to be described later, the spheres can be removed by state change and/or chemical change of the spheres. Since, however, the bursting of the cathode electrode is not involved, the spheres can be easily removed by exerting an external force in some cases. In Example 11 to be described later, the opening portion is formed prior to the removal of the sphere. When the opening portion has a larger diameter than the sphere, the sphere can be removed with an external force. The external force includes physical forces such as a pressure caused by blowing with air or an inert gas, a pressure caused by blowing a wash liquid, a magnetic suction force, an electrostatic force and a centrifugal force. Unlike Example 8, in Example 10 or 11, it is not required to dissipate the portion of the cathode electrode which covers the sphere, or, in some cases, it is not required to dissipate the above portion and portions of the insulating layer and the gate electrode, so that there is an advantage that there is caused no residue from the cathode electrode, the insulating layer or the gate electrode.

In Example 10 or 11 to be described later, preferably, at least the surface of the sphere used therein is made of a material having a larger interfacial tension (surface tension) than a material constituting a cathode electrode, or in some cases, than materials constituting an insulating layer and a gate electrode. In Example 11, the cathode electrode, the insulating layer and the gate electrode thereby do not cover at least top portions of the spheres, and there can be obtained a state where the opening portion is formed in the insulating layer and the gate electrode from the beginning. The diameter of the opening portion differs depending, for example, upon a relationship between the thickness of a material for each of the cathode electrode, the insulating layer and the gate electrode and the diameter of each sphere; methods of forming the cathode electrode, the insulating layer and the gate electrode; and the interfacial tension (surface tension) of a material for each of the cathode electrode, the insulating layer and the gate electrode.

In Examples 10 or 11 to be described later, it is sufficient that the spheres have at least the surfaces which satisfy the above condition concerning the interfacial tension. That is, the portion having a larger interfacial tension than any one of the cathode electrode, the insulating layer and the gate electrode may be only a surface of the sphere or may be the entirety of the sphere. Further, the material for the surface and/or the entirety of the sphere may be an inorganic material, an organic material or a combination of an inorganic material with an organic material. In Example 10 or 11, when the cathode electrode and the gate electrode are made of a general metal material and when the insulating layer is made of a silicon dioxide material such as glass, generally, a highly hydrophilic state is formed since hydroxyl groups derived from adsorbed water are present on the metal material and since dangling bonds of Si—O bonds and hydroxyl group derived from adsorbed water are present on the surface of the insulating layer. It is therefore particularly effective to use spheres having hydrophobic surface-treatment layers. The material for the hydrophobic surface-treatment layer includes fluorine resins such as polytetrafluoroethylene. When the sphere has a hydrophobic surface-treatment layer, and, if a portion inside the hydrophobic surface-treatment layer is considered a core, the material for the core may be glass, ceramic or a polymer material other than the fluorine resin.

Although not specially limited, the organic material for constituting a sphere is preferably a general-purpose polymer material. When the polymer material has an extremely high polymerization degree or has an extremely large content of double and triple bonds, too high a combustion temperature is required, and when the spheres are removed by combustion, a detrimental effect may be caused on the cathode electrode, the insulating layer or the gate electrode. It is therefore preferred to select a polymer material which is combustible or carbonizable at a temperature at which no detrimental effect is caused on the above layer and electrodes. When a material which requires calcining or sintering at a post step, such as a glass paste, is used for forming the insulating layer, it is preferred to select a polymer material which is combustible or carbonizable at a calcining or sintering temperature of the glass paste, in order to decrease the number of the manufacturing steps. Since a glass paste has a typical calcining temperature of approximately 530° C., the combustion temperature of the polymer material is preferably approximately 350 to 500° C. Typical examples of the polymer material include styrene, urethane, acryl, vinyl, divinylbenzene, melamine, formaldehyde and polymethylene homopolymers or copolymers. For securing a reliable layout of the spheres on the substrate, there may be used fixable spheres capable of adhering. As fixable spheres, spheres made of an acryl resin can be used.

Otherwise, thermally expandable microspheres having, for example, a vinylidene chloride-acrylonitrile copolymer as outer shells and encapsulating isobutane as a foaming agent can be used as spheres. In Example 8, the above thermally expandable microspheres are employed and heated. In this case, a polymer constituting the outer shells is softened, and the encapsulated isobutane is gasified to undergo expansion. As a result, there are formed hollow true spheres having a diameter approximately 4 times as large as a diameter found before the expansion. As a result, in Example 8, the projection portions for emitting electrons and the concave portions each of which is surrounded by the projection portion and reflects part of form of the sphere can be formed in the cathode electrode. In addition to the above concave portions and the above projection portions, further, the opening portions can be also formed through the gate electrode and the insulating layer. In the present specification, the expansion of thermally expandable microspheres by heating is also included in the concept of the removal of the sphere. Then, thermally expandable microspheres can be removed with a proper solvent.

In Example 8, the cathode electrode covering the spheres can be formed after a plurality of the spheres are arranged on the substrate. In this case or in Example 10 or 11 to be described later, the method of arranging a plurality of the spheres on the substrate includes a dry method in which the spheres are sprayed onto the substrate. For spraying the spheres, there can be applied a method in which spacers are sprayed for maintaining a panel distance at a constant distance in the field of producing a liquid crystal display. Specifically, a so-called spray gun for ejecting the spheres through a nozzle with a compressed gas can be used. When the spheres are ejected through the nozzle, the spheres may be in a state in which they are dispersed in a volatile solvent. Otherwise, the spheres can be sprayed by means of an apparatus or a method which is generally used in the field of an electrostatic powder application or coating. For example, the spheres negatively charged can be sprayed to the substrate grounded, with an electrostatic spray gun, using a corona discharge. Since the spheres used are very small as will be described later, the spheres sprayed onto the substrate adhere to the surface of the substrate, for example, with an electrostatic force, and the adhering spheres do not easily fall off the substrate in procedures to come thereafter. When the spheres are pressed after a plurality of the spheres are arranged on the substrate, overlapping of a plurality of the spheres on the substrate can be overcome, and the spheres can be densely arranged on the substrate so as to form a single layer.

Otherwise, there may be employed a constitution in which, in Example 9 to be described later, a composition layer composed of a dispersion of the spheres and a cathode electrode material in a dispersing agent is formed on the substrate, thereby to arrange a plurality of the spheres on the substrate and to cover each sphere with the cathode electrode composed of the cathode electrode material, and thereafter, the dispersing agent is removed. The composition can have the property of a slurry or paste, and the component and viscosity of the dispersing agent can be selected as required depending upon the above properties. Preferably, the method of forming the composition layer on the substrate includes a screen-printing method. Typically, the cathode electrode material is preferably formed of fine particles having a lower precipitation rate than the sphere in the dispersing agent. The material for the above fine particles includes carbon, barium, strontium and iron. After the dispersing agent is removed, the cathode electrode is calcined or sintered as required. The method of forming the composition layer on the substrate includes a spraying method, a dropping method, a spin coating method and a screen-printing method. When the spheres are arranged, each sphere is concurrently covered with the cathode electrode made of a cathode electrode material. In some method of forming the above composition layer, it is required to pattern the cathode electrode.

Otherwise, in Example 10 or 11 to be described later, there may be employed a constitution in which a composition layer composed of a dispersion of the spheres in a dispersing agent is formed on the substrate, thereby to arrange a plurality of the spheres on the substrate, and then the dispersing agent is removed. The composition can have the property of a slurry or paste, and the component and viscosity of the dispersing agent can be selected as required depending upon the above properties to be desired. Typically, an organic solvent such as isopropyl alcohol is used as a dispersing agent, and the dispersing agent can be removed by volatilization. The method of forming the composition layer on the substrate includes a spraying method, a dropping method, a spin coating method and a screen-printing method.

The gate electrode and the cathode electrode extend in directions different from each other (for example, a projection image of the gate electrode in the form of a stripe and a projection image of the cathode electrode in the form of a stripe make an angle of 90°), and for example, they are patterned in the form of stripes. Electrons are emitted from the projection portions positioned in the electron-emitting region (overlapping region). It is therefore functionally sufficient that the projection portions are present in the electron-emitting region (overlapping region) alone. Even if the projection portions and the concave portions exist in a region different from the electron-emitting region (overlapping region), however, such projection portions and concave portions remain covered with the insulating layer and do not work to emit electrons. It is therefore no problem if the spheres are arranged on the entire surface.

In contrast, when portions of the cathode electrode, the insulating layer and the gate electrode which portions cover the sphere are removed, arrangement positions of individual spheres and formation positions of the opening portions have one-to-one correspondence, so that opening portions are made in a region different from the electron-emitting region (overlapping region). The opening portion formed in a region different from the electron-emitting region (overlapping region) will be referred to as "ineffective opening portion" and distinguished from the original opening portion which works for electron emission. Meanwhile, even if ineffective opening portions are formed in a region other than the electron-emitting region (overlapping region), the ineffective opening portions do not at all work as field emission devices, nor do they cause any detrimental effect on the performance of the field emission devices formed in the electron-emitting region (overlapping region). The reason therefore is as follows. Even if the projection portion and the concave portion are exposed in the bottom portion of the ineffective opening portion, no gate electrode is formed on the upper end portion of the ineffective opening portion. Otherwise, even if the gate electrode is formed in the upper end portion of the ineffective opening portion, neither the projection portion nor the concave portion is exposed in the bottom portion; or neither the projection portion nor the concave portion is exposed in the bottom portion of the ineffective opening portion and no gate electrode is formed in the upper end portion and the surface of the substrate is merely exposed. It therefore causes no problem even if the spheres are arranged on the entire surface. A hole formed in a boundary between the electron-emitting region (overlapping region) and other region is included in the opening portion.

The diameter of the sphere can be selected depending upon the diameter of a desired opening portion, the diameter of the concave portion, display screen dimensions of a flat-panel display having the field emission devices, the number of pixels, dimensions of the overlapping region and the number of the field emission devices per pixel. The diameter of the sphere is preferably in the range of from 0.1 to 10 $\mu$m. For example, spheres commercially available as spacers for a liquid crystal display are preferred since they have a particle diameter distribution of 1 to 3%. While the form of the sphere is ideally truly spherical, it is not necessarily required to be truly spherical. In some method of producing the field emission devices, opening portions or ineffective opening portions can be formed in portions where the spheres are arranged, and it is preferred to arrange the spheres on the substrate in a density of approximately 100 to 5000 spheres/mm$^2$. For example, when the spheres are arranged on the substrate in a density of approximately 1000 spheres/mm$^2$, and for example, if the overlapping region has dimensions of 0.5 mm×0.2 mm, approximately 100 spheres are present in the overlapping region, and approximately 100 projection portions are formed. When the projection portions approximately in such a number are formed per overlapping region, the fluctuation of diameters of the concave portions, caused by the fluctuation in the particle diameter distribution and the sphericity of the spheres, is nearly averaged, and the current density of emitted electrons per pixel (or per subpixel) and the brightness come to be uniform in practice.

In Example 8 or any one of Examples 9 to 11 to be described later, part of the form of the sphere is reflected in the form of the concave portion constituting the electron-emitting portion. The profile of top end portion of each projection portion may have an irregular convexo-concave form or may be flat. In Example 8 or 9 in particular, the above top end portion is formed by fracture of the cathode electrode, so that the top end portion of each projection portion is liable to have an irregular form. When the top end portion is sharpened by fracture, advantageously, the top end portion can function as a highly efficient electron-emitting portion. In Examples 8 to 11, the projection portion surrounding the concave portion comes to be ringed or circular, and in this case, the concave portion and the projection portion as a whole have the form of a crater or caldera.

The layout of the projection portions on the substrate may be regular or random and depends upon the method of arranging the spheres. When the above dry method or the wet method is employed, the layout of the projection portions on the substrate comes to be random. Each concave portion may be surrounded by the projection portion continued along the circumferential direction of the concave portion, and in some cases, each concave portion may be surrounded by the projection portion discontinuous along the circumferential direction of the concave portion.

In Examples 8 to 11, when the opening portion is formed in the insulating layer after the formation of the insulating layer, there may be employed a constitution in which a protective layer is formed for avoiding damage of top end portions of the projection portions after the formation of the projection portions, and the protective layer is removed after the opening portion is formed. The material for the protective layer includes chromium.

Figure 17A:
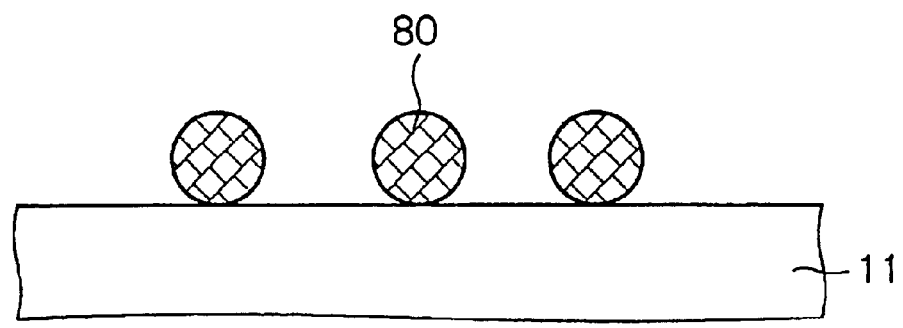
FIGS. 17A and 17B are a schematic partial end view and a partial perspective view of a substrate, etc., for explaining a cold cathode field emission device of Example 8 having a second structure of a flat-type cold cathode field emission device.
Figure 17B:
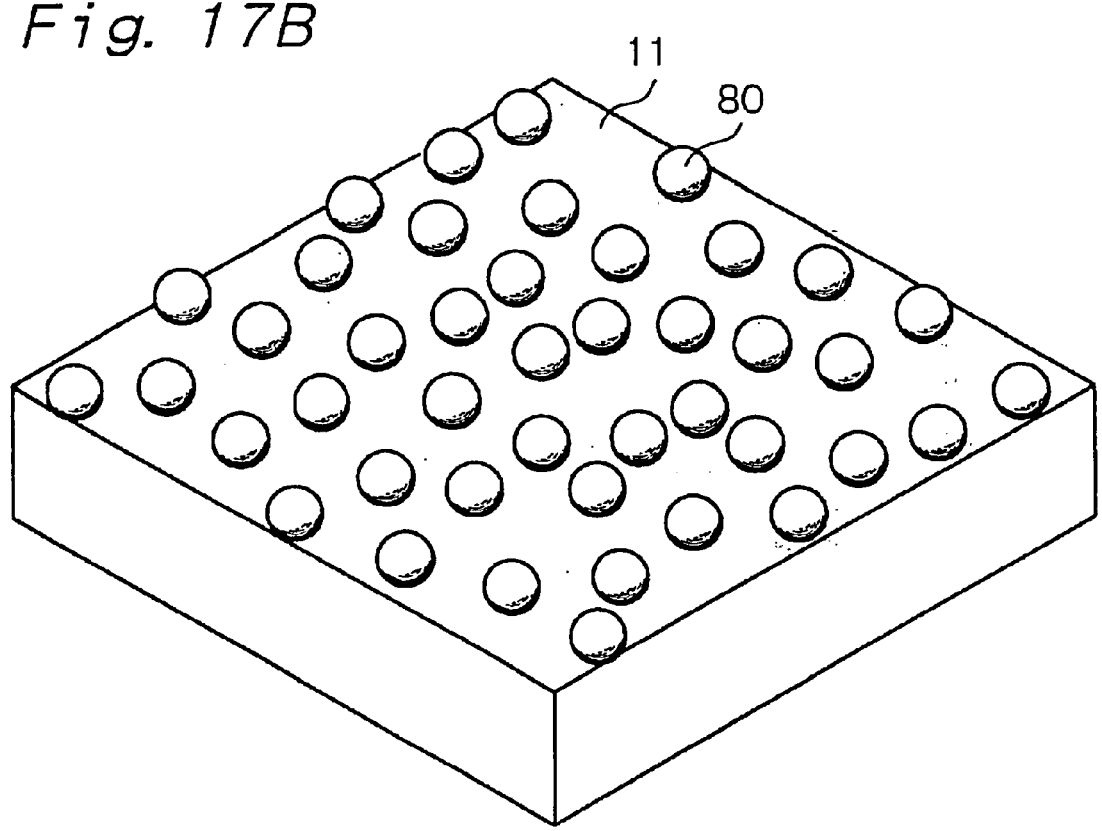
Figure 18A:
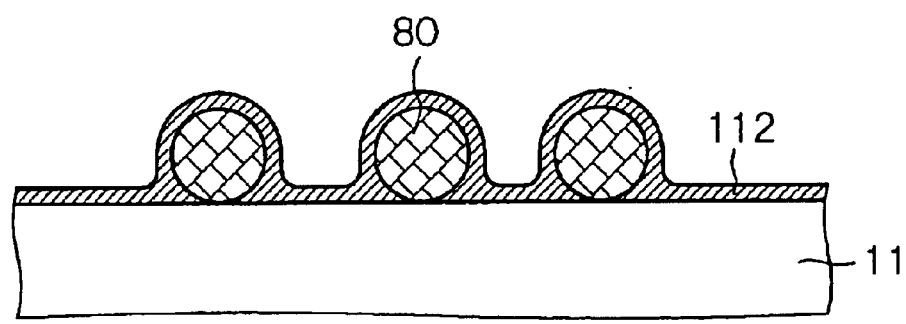
FIGS. 18A and 18B, following
Figure 18B:
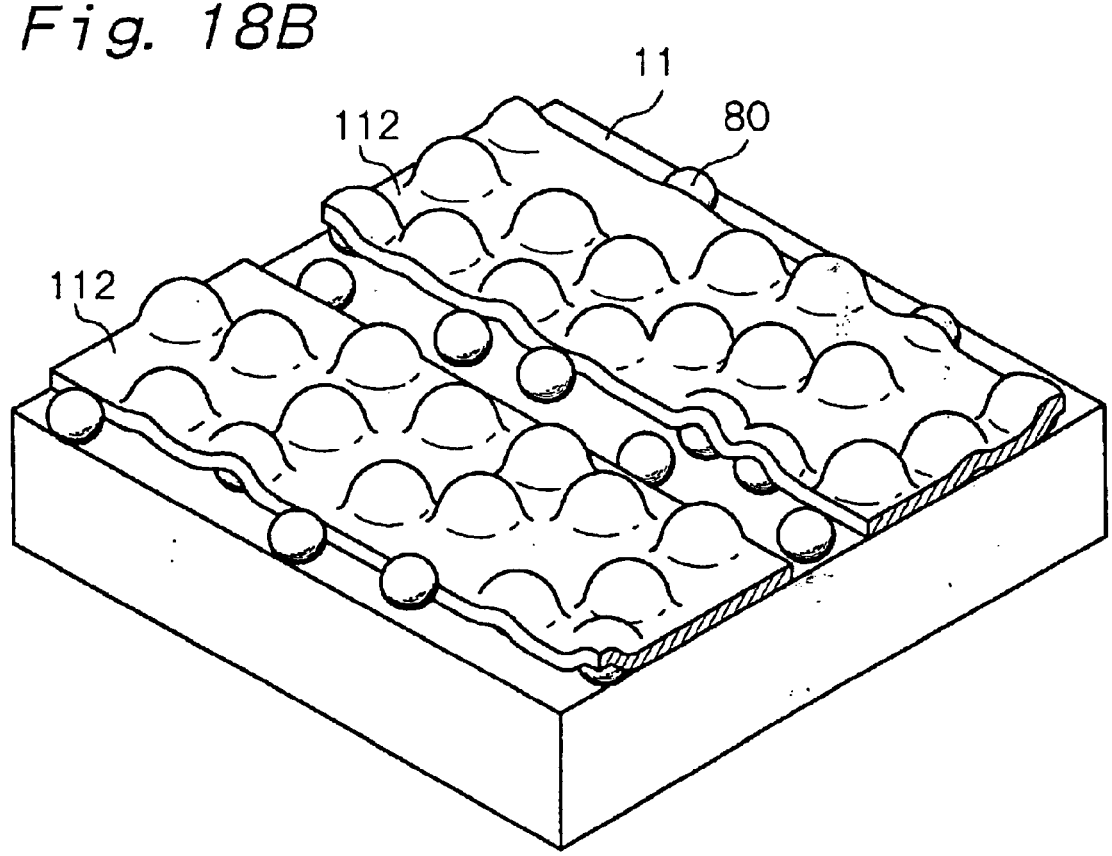

The method of producing the field emission device of Example 8 will be explained with reference to FIGS. 17A, 17B, 18A, 18B, 19A, 19B, 20A and 20B. FIGS. 17A, 18A and 19A are schematic partial cross-sectional views, FIGS. 20A and 20B are schematic partial cross-sectional views, and FIGS. 17B, 18B and 19B are schematic partial perspective views showing wider ranges than those in FIGS. 17A, 18A and 19A.

[Step-800]

First, the cathode electrode 112 covering a plurality of spheres 80 is formed on the substrate 11. Specifically, the spheres 80 are arranged on the entire surface of the substrate 11 made, for example, of glass. The spheres 80 are made, for example, of a polymethylene-based polymer material, and they have an average particle diameter of approximately 5 µm and a particle diameter distribution of less than 1%. The spheres 80 are arranged on the substrate 11 at random at a density of approximately 1000 spheres/mm$^2$ with a spray gun. The method of spraying the spheres with a spray gun includes a method of spraying a mixture of the spheres with a volatile solvent and a method of ejecting the spheres in a powder state from a nozzle. The arranged spheres 80 are held on the substrate 11 by an electrostatic force. FIGS. 17A and 17B shows such a state.

[Step-810]

The cathode electrode 112 is formed on the spheres 80 and the substrate 11. FIGS. 18A and 18B show a state where the cathode electrode 112 is formed. The cathode electrode 112 can be formed, for example, by screen-printing a carbon paste in the form of a stripe. In this case, the spheres 80 are arranged on the entire surface of the substrate 11, so that some of the spheres 80 are naturally not covered with the cathode electrode 112 shown in FIG. 18(B). Then, the cathode electrode 112 is dried, for example, at 150° C. for removing water and a solvent contained in the cathode electrode 112 and flattening the cathode electrode 112. At this temperature, the spheres 80 do not undergo any state change and/or chemical change. The above screen-printing using a carbon paste may be replaced with a method in which an electrically conductive material for a cathode electrode 112 is formed on the entire surface and the above electrically conductive material layer is patterned by general lithography and a general dry etching method to form the cathode electrode 112 in the form of a stripe. When the lithography is applied, generally, a resist layer is formed by a spin coating method. In the spin coating, if the number of spinning of the substrate 11 is approximately 500 rpm and if the spinning time period is approximately several seconds long, the spheres 80 are held on the substrate 11 without dropping off or shifting in position.

[Step-820]

Portions of the cathode electrode 112 which portions cover the spheres 80 are removed by removing the spheres 80, whereby there is formed a cathode electrode 112 having a plurality of projection portions 112A for emitting electrons and concave portions 112B each of which is surrounded by the projection portion 112A and reflects part of form of each sphere 80. FIGS. 19A and 19B show the thus-obtained state. Specifically, the spheres 80 are combusted by heating around 530° C. while the cathode electrode 112 is also calcined. The pressure in each closed space in which each sphere 80 is captured increases together with the combustion of the spheres 80, and the portion of the cathode electrode 112 which portion covers the sphere 80 bursts when a certain pressure durability limit is exceeded, and such a portion is removed. As a result, the projection portions 112A and the concave portions 112B are formed in part of the cathode electrode 112 formed on the substrate 11. When some portions of the sphere remain as a residue after the removal of the spheres, the residue can be removed with a proper wash liquid depending upon a material constituting the spheres used.

[Step-830]

Then, the insulating layer 13 is formed on the cathode electrode 112 and the substrate 11. Specifically, for example, a glass paste is screen-printed on the entire surface to form a layer having a thickness of approximately 5 µm. Then, the insulating layer 13 is dried, for example, at 150° C. to remove water and a solvent contained in the insulating layer 13 and to flatten the insulating layer 13. The above screen-printing using a glass paste may be replaced, for example, with the formation of an SiO$_2$ layer by a plasma CVD method.

[Step-840]

Then, the stripe-shaped gate electrode 14 is formed on the insulating layer 13 (see FIG. 20A). The gate electrode 14 can be formed by screen-printing, for example, with a carbon paste in the form of a stripe. In this case, the extending direction of projection image of the stripe-shaped gate electrode 14 forms an angle of 90° with the extending direction of projection image of the stripe-shaped cathode electrode 112. Then, the gate electrode 14 is dried, for example, at 150° C. for removing water and a solvent contained in the gate electrode 14 and flattening the gate electrode 14, and then the materials constituting the gate electrode 14 and the insulating layer 13 are calcined or sintered. The screen printing with a carbon paste may be replaced with the procedures of forming an electrically conductive material layer on the entire surface of the insulating layer 13 and patterning the electrically conductive material layer by general lithography and a general drying etching method.

[Step-850]

Then, in the overlapping region where the projection image of the gate electrode 14 and the projection image of the cathode electrode 112 overlap, the opening portion 15 is formed in the gate electrode 14 and the insulating layer 13, thereby to expose a plurality of the projection portions 112A and the concave portions 112B in the bottom portion of the opening portion 15. The opening portion 15 can be obtained by forming a resist mask according to general lithography and etching through the resist mask. Preferably, the etching is carried out under a condition where sufficiently high etching selectivity to the cathode electrode 112 is secured. Alternatively, after the formation of the projection portions 112A, preferably, a protective layer made of chromium is formed in advance, and after the opening portion 15 is formed, the protective layer is removed. Then, the resist mask is removed. In this manner, the field emission device shown in FIG. 20B can be obtained.

As a variant of the method of producing the field emission device in Example 8, there may be employed a constitution in which [Step-830] to [Step-850] are carried out after [Step-810] and then [Step-820] is carried out. In this case, the combustion of the spheres and the calcining of the materials for the gate electrode 14 and the insulating layer 13 can be carried out concurrently.

Otherwise, [Step-830] is carried out after [Step-810], and in a step similar to [Step-840], further, a stripe-shaped gate electrode free of the opening portion is formed on the insulating layer. Then, [Step-820] is carried out. In this manner, portions of the cathode electrode 112, the insulating layer 13 and the gate electrode 14 which portions cover the sphere 80 are removed, whereby the opening portion can be formed through the gate electrode 14 and the insulating layer 13 and the electron-emitting portion having the projection portion 112A for emitting electrons and the concave portion 112B which is surrounded by the projection portion 112A and reflects part of the form of each sphere 80 can be formed in the cathode electrode 112 which is positioned in the bottom portion of the opening portion. That is, the pressure in each closed space in which each sphere 80 is captured increases together with the combustion of the spheres 80, and portions of the cathode electrode 112, the insulating layer 13 and the gate electrode 14 which portions cover the sphere are burst when a certain pressure durability limit is exceeded, and the opening portion is formed together with the projection portion 112A and the concave portion 112B. Further, the spheres 80 are removed. The opening portion is formed through the gate electrode 14 and the insulating layer 13 and reflects part of the sphere 80. In the bottom portion of the opening portion, there remains the projection portion 112A for emitting electrons and the concave portion 112B which is surrounded by the projection portion 112A and reflects part of the form of the sphere 80.

Example 9

Example 9 is a variant of the method of forming the crater-type field emission device. The method of Example 9 will be explained with reference to FIGS. 21A, 21B and 21C. The method of Example 9 differs from the method of Example 8 in that the step of arranging a plurality of the spheres 80 on the substrate 11 includes the steps of forming, on the substrate 11, a composition layer 81 composed of a composition which is a dispersion of the spheres 80 and the cathode electrode material in a dispersing agent, thereby to arrange a plurality of the spheres 80 on the substrate 11, covering the spheres 80 with the cathode electrode 112 made of the cathode electrode material, and then, removing the dispersing agent, that is, the above step is a wet method.

[Step-900]

Figure 21A:
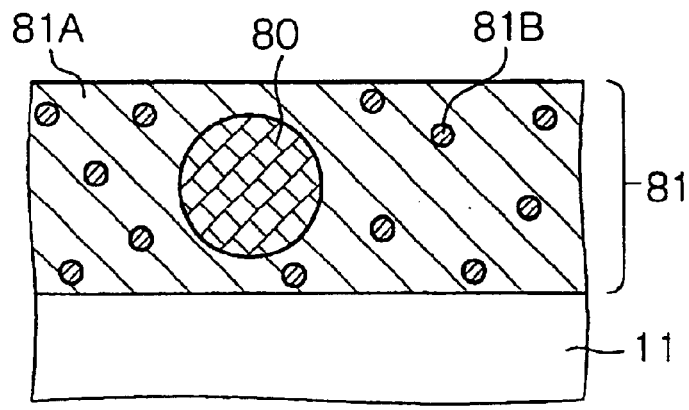
FIGS. 21A, 21B and 21C are schematic partial cross-sectional views of a substrate, etc., for explaining the method for producing a cold cathode field emission device of Example 9 having a second structure of a flat-type cold cathode field emission device.

First, a plurality of the spheres 80 are arranged on the substrate 11. Specifically, the composition layer 81 composed of a composition which is a dispersion of the spheres 80 and the cathode electrode material 81B in a dispersing agent 81A is formed on the substrate 11. That is, for example, isopropyl alcohol is used as a dispersing agent 81A, and the composition is prepared by dispersing the spheres 80 which are made of a polymethylene polymer material and have an average particle diameter of approximately 5 μm and carbon particles having an average particle diameter of 0.05 μm as the cathode electrode material 81B, in the dispersing agent 81A. The composition is screen-printed on the substrate 11 in the form of a stripe, to form the composition layer 81. FIG. 21A shows a state found immediately after the formation of the composition layer 81.

[Step-910]

Figure 21B:
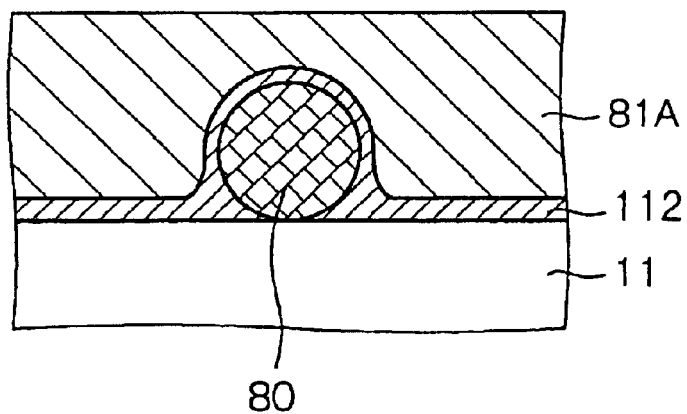

In the composition layer 81 held on the substrate 11, the spheres 80 soon precipitates to be arranged on the substrate 11 and the cathode electrode material 81B also precipitates on the spheres 80 and the substrate 11 to form a cathode electrode 112, whereby a plurality of the spheres 80 can be arranged on the substrate 11 and the spheres 80 can be covered with the cathode electrode 112 made of the cathode electrode material. FIG. 21B shows the thus-obtained state.

[Step-920]

Figure 21C:
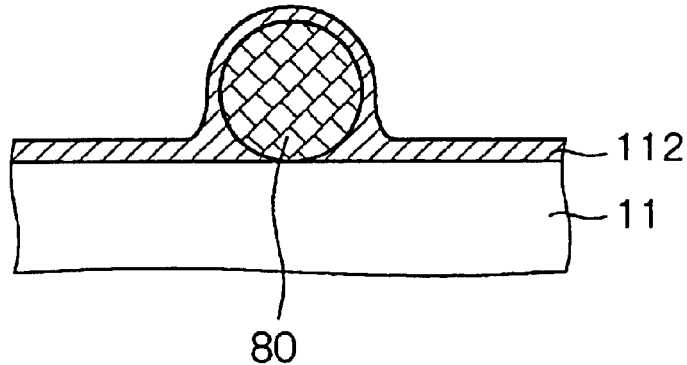

Then, the dispersing agent 81A is removed by volatilization. FIG. 21C shows the thus-obtained state.

[Step-930]

Then, steps similar to [Step-820] to [Step-850] in Example 8 or variants of the production method in Example 8 is carried out, whereby a field emission device similar to the field emission device shown in FIG. 20B can be completed.

Example 10

Example 10 is also a variant of the method of producing the crater-type field emission device. In the production method of Example 10, more specifically, the step of forming the cathode electrode in the form of a stripe on the substrate comprises the steps of arranging a plurality of spheres on a substrate; forming a cathode electrode which has a plurality of the projection portions for emitting electrons and the concave portions each of which is surrounded by the projection portion and reflects part of the sphere, on the substrate; and removing the spheres. The spheres are arranged on the substrate by spraying. The spheres have a hydrophobic surface-treatment layer. Example 10 will be explained with reference to FIGS. 22A, 22B and 22C hereinafter.

[Step-1000]

Figure 22A:
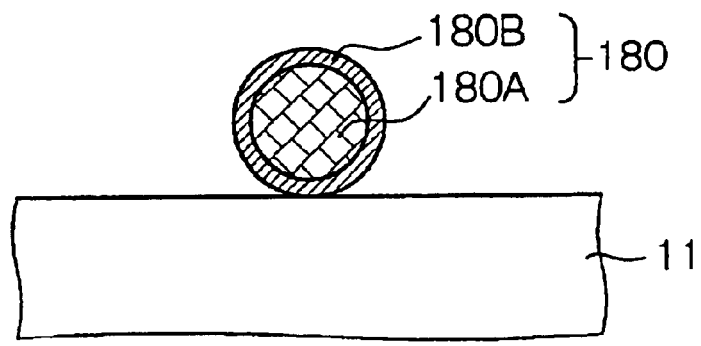
FIGS. 22A, 22B and 22C are schematic partial end views of a substrate, etc., for explaining the method for producing a cold cathode field emission device of Example 10 having a second structure of a flat-type cold cathode field emission device.

First, a plurality of spheres 180 are arranged on the substrate 11. Specifically, a plurality of the spheres 180 are arranged on the entire surface of the substrate 11 made, for example, of glass. The spheres 180 are formed by providing a core material 180A made, for example, of a divinylbenzene polymer material and coating the core material 180A with a surface-treatment layer 180B made of a polytetrafluoroethylene resin, and the spheres 180 have an average diameter of approximately 5 μm and a particle diameter distribution of less than 1%. The spheres 180 are arranged on the substrate 11 in a density of approximately 1000 spheres/mm² at random with a spray gun. The arranged spheres 180 are held on the substrate 11 by an electrostatic force. FIG. 22A shows the thus-obtained state.

[Step-1010]

Figure 22B:
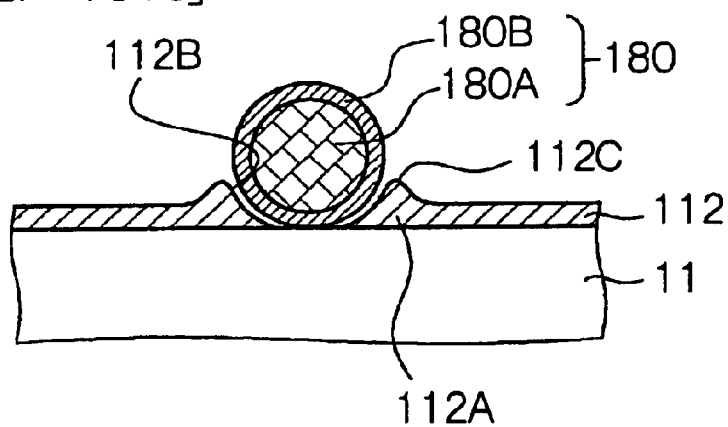

Then, on the substrate 11 is formed a cathode electrode 112 having a plurality of projection portions 112A for emitting electrons and concave portion 112B each of which is surrounded by the projection portion 112A and reflects part of form of the sphere 180, the projection portions 112A being formed around the spheres 180. Specifically, as described in Example 8, for example, a carbon paste is screen-printed in the form of a stripe. In Example 10, the surface of each sphere 180 has hydrophobic nature due to the surface-treatment layer 180B, so that the carbon paste screen-printed on the sphere 180 is immediately repelled and dropped off and is deposited around the sphere 180 to form the projection portion 112A. The top end portion 112C of each projection portion 112A is not so sharpened as that in Example 8. A portion of the cathode electrode 112 which portion enters between the sphere 180 and the substrate 11 constitutes the concave portion 112B. While FIG. 22B shows a state where a gap is present between the cathode electrode 112 and the sphere 180, the cathode electrode 112 and the sphere 180 are in contact with each other in some cases. Then, the cathode electrode 112 is dried, for example, at 150° C. FIG. 22B shows the thus-obtained state.

[Step-1020]

Figure 22C:
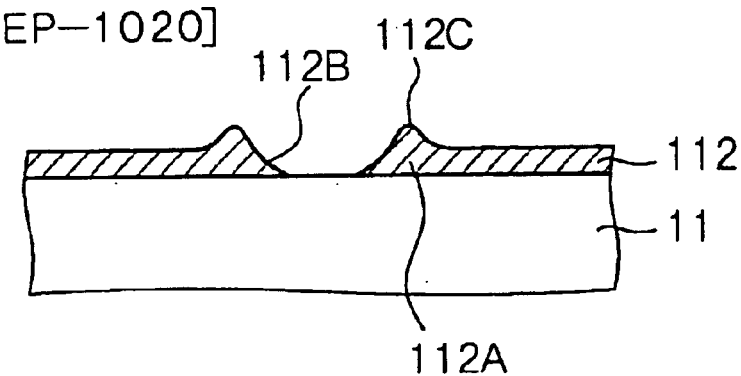

Then, an external force is exerted on the spheres 180 to remove the spheres 180 from the substrate 11. Specifically, the method of removal includes a washing method and a method of blowing a compressed gas. FIG. 22C shows the thus-obtained state. The spheres can be also removed by the state change and/or chemical change of the spheres, more specifically, for example, by combustion, which is also applicable to Example 11 to be described below.

[Step-1030]

Then, [Step-830] to [Step-850] in Example 8 are carried out, whereby there can be obtained a field emission device which is almost the same as the device shown in FIG. 20B.

In a variant of the production method of Example 10, there may be employed a constitution in which [Step-830] to [Step-850] of Example 8 are carried out after [Step-1010] and then [Step-1020] is carried out.

Example 11

Example 11 is also a variant of the method of producing the crater-type field emission device. In the production method of Example 11, more specifically, the step of forming the cathode electrode in the form of a stripe on the substrate comprises the steps of arranging a plurality of spheres on a substrate; and forming a cathode electrode which has a plurality of the projection portions for emitting electrons and the concave portions each of which is surrounded by the projection portion and reflects part of the form of the sphere, on the substrate, each projection portion being formed in a circumference of each sphere. When an insulating layer is formed on the entire surface, the insulating layer having opening portions above the spheres is formed on the cathode electrode and the substrate. The spheres are removed after the opening portions are formed. In the method of producing the field emission device in Example 11, a plurality of the spheres are arranged on the substrate by spraying the spheres. Each sphere has a hydrophobic surface-treatment layer. Example 11 will be explained with reference to FIGS. 23A, 23B, 24A and 24B.

[Step-1100]

First, a plurality of the spheres 180 are arranged on the substrate 11. Specifically, a step similar to the [Step-1000] of Example 10 is carried out.

[Step-1110]

Then, formed on the substrate 11 is a cathode electrode 112 having a plurality of projection portions 112A for emitting electrons and concave portions each of which is surrounded by the projection portion 112A and reflects part of the form of the sphere 180, each projection portion 112A being formed in a circumference of each sphere 180. Specifically, a step similar to [Step-1010] of Example 10 is carried out.

[Step-1120]

Figure 23A:
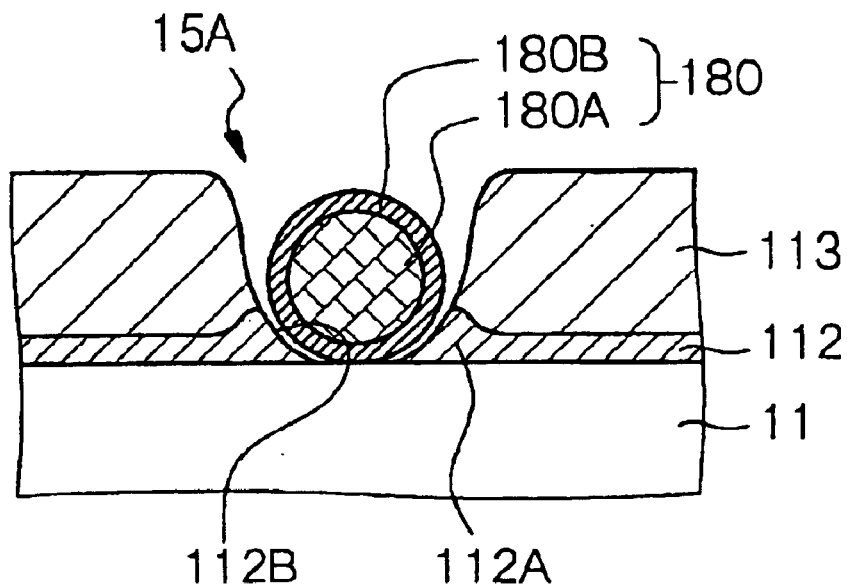
FIGS. 23A and 23B are schematic partial end views of a substrate, etc., for explaining the method for producing a cold cathode field emission device of Example 11 having a second structure of a flat-type cold cathode field emission device.

An insulating layer 113 having opening portions 15A above the spheres is formed on the cathode electrode 112 and the substrate 11. Specifically, a glass paste is screen-printed on the entire surface to form a layer for the insulating layer having a thickness of approximately 5 μm. The screen-printing with a glass paste can be carried out in the same manner as in Example 8. The surface of each sphere 180 has hydrophobic nature due to the surface-treatment layer 180B, so that the screen-printed glass paste is immediately repelled and dropped off and that a portion of the insulating layer 113 which portion is on each sphere 180 shrinks due to its surface tension. As a result, the top portion of each sphere 180 is exposed into the opening portion 15A without being covered with the insulating layer 113. FIG. 23A shows the thus-obtained state. In a shown embodiment, the top end portion of the opening portion 15A has a larger diameter than the sphere 180. When the surface-treatment layer 180B has a smaller interfacial tension than the glass paste, the opening portion 15A tends to have a smaller diameter. When the surface-treatment layer 180B has an extremely larger interfacial tension than the glass paste, the opening portion 15A tends to have a larger diameter. Then, the insulating layer 113 is dried, for example, at 150° C.

[Step-1130]

Figure 23B:
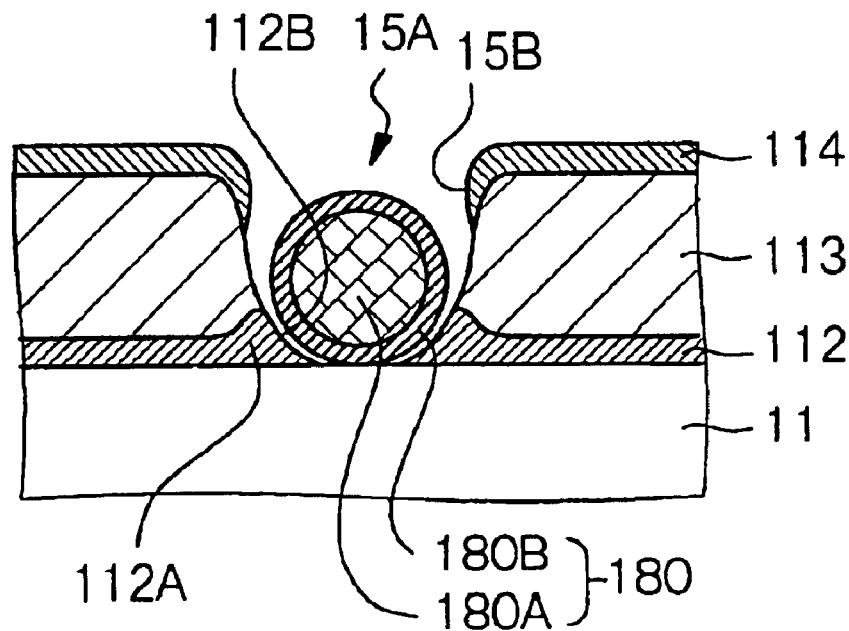

Then, a gate electrode 114 having an opening portion 15B communicating with the opening portion 15A is formed on the insulating layer 113. Specifically, a carbon paste is screen-printed in the form of a stripe. The screen-printing with a carbon paste can be carried out in the same manner as in Example 8. Since, however, the surface of the sphere 180 has hydrophobic nature due to the surface-treatment layer 180B, the carbon paste screen-printed on the sphere 180 is immediately repelled and shrinks due to its own surface tension to form a state where it adheres only to the surface of the insulating layer 113. In this case, the gate electrode 114 may be sometimes formed so as to droop from the opening end portion of the insulating layer 113 into the opening portion 15A to some extent. Then, the gate electrode 114 is dried, for example, at 150° C. FIG. 23B shows the thus-completed state. When the surface-treatment layer 180B has a smaller interfacial tension than the carbon paste, the opening portion 15A tends to have a smaller diameter. When the surface-treatment layer 180B has an extremely larger interfacial tension than the paste, the opening portion 15A tends to have a larger diameter.

[Step-1140]

Figure 24A:
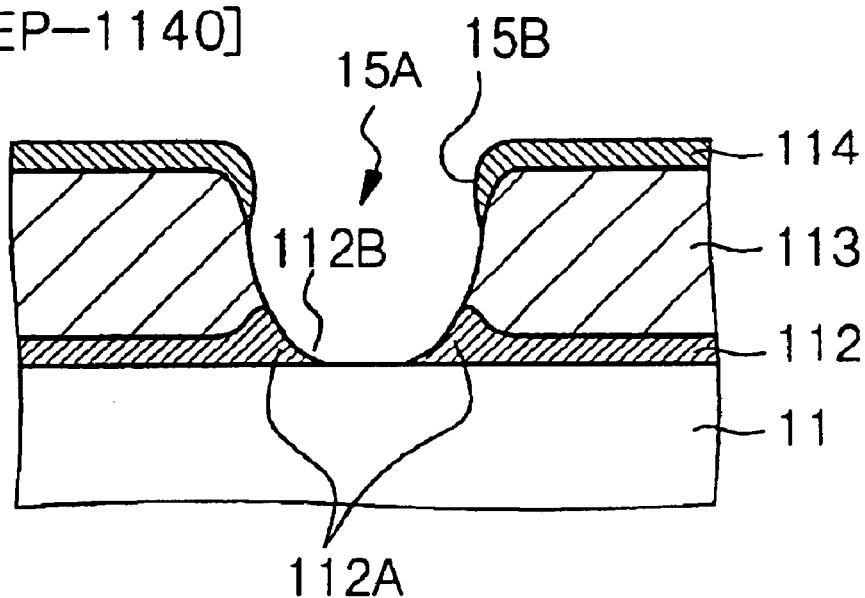
FIGS. 24A and 24B, following

Then, the sphere 180 exposed in the opening portions 15A and 15B is removed. Specifically, the sphere 180 is combusted by heating the sphere at approximately 530° C., a typical temperature for calcining a glass paste, which heating also works to calcine or sinter the cathode electrode 112 and the insulating layer 113. In this case, the insulating layer 113 and the gate electrode 114 have the opening portions 15A and 15B from the beginning unlike Example 8, so that part of the cathode electrode 112, the insulating layer 113 or the gate electrode 114 is not dissipated in any case, and the sphere 180 is readily removed. When the upper end portion of the opening portions 15A and 15B has a larger diameter than the sphere 180, the sphere 180 can be removed by an external force such as washing or blowing of a compressed gas without combusting the sphere 180. FIG. 24A shows the thus-completed state.

[Step-1150]

Figure 24B:
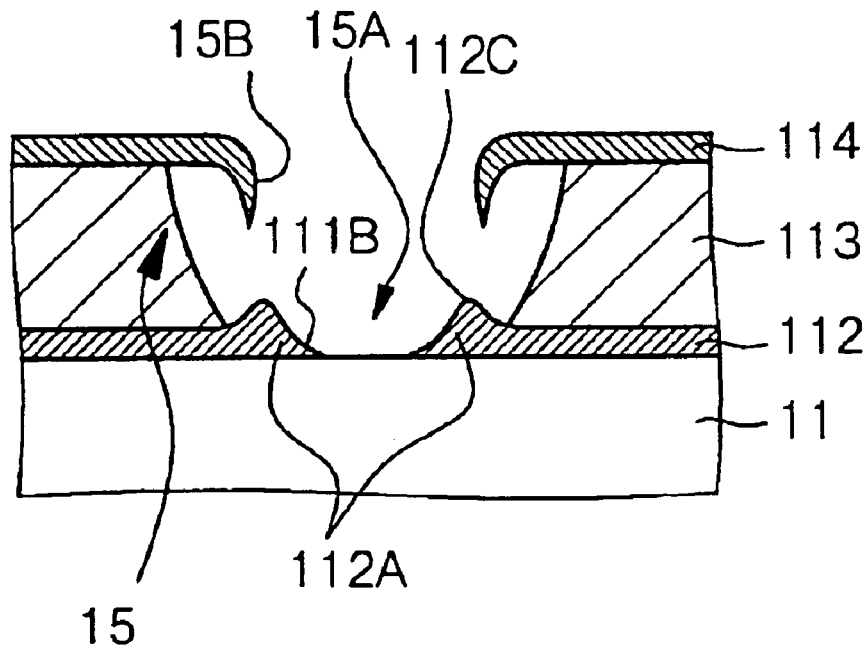

Part of the insulating layer 113 which part corresponds to the side wall surface of the opening portion 15A is isotropically etched, whereby a field emission device shown in FIG. 24B can be completed. In this embodiment, the lower end of the gate electrode 114 faces downward, which is preferred for increasing the electric field intensity in the opening portion 15.

Example 12

Figure 25A:
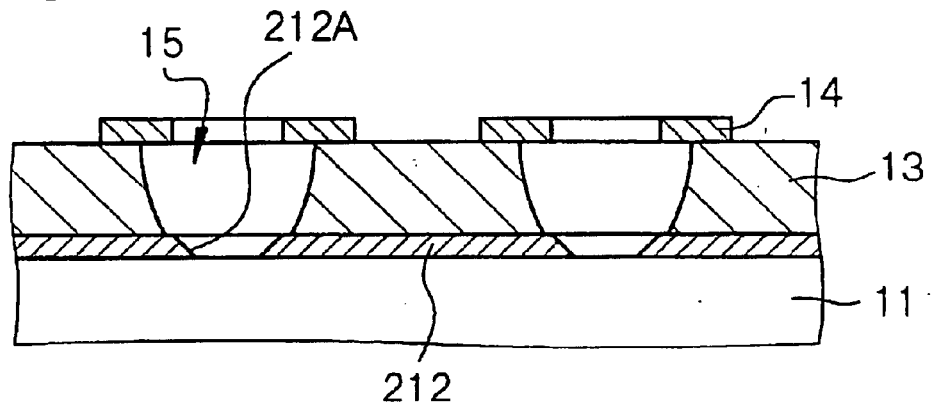
FIGS. 25A, 25B and 25C are schematic partial cross-sectional views of cold cathode field emission devices of Example 12 having a third structure of an edge-type cold cathode field emission device.

Example 12 is concerned with an edge-type field emission device. FIG. 25A shows a schematic partial cross-sectional view of the edge-type field emission device. The edge-type field emission device comprises a cathode electrode 212 formed on a substrate 11 in the form of a stripe; an insulating layer 13 formed on the substrate 11 and the cathode electrode 212; and a gate electrode 14 formed on the insulating layer 13 in the form of a stripe. An opening portion 15 is formed through the gate electrode 14 and the insulating layer 13. An edge portion 212A of the cathode electrode 212 is exposed in the bottom portion of the opening portion 15. A voltage is applied to the cathode electrode 212 and the gate electrode 14, whereby electrons are emitted from the edge portion 212A of the cathode electrode 212.

Figure 25B:
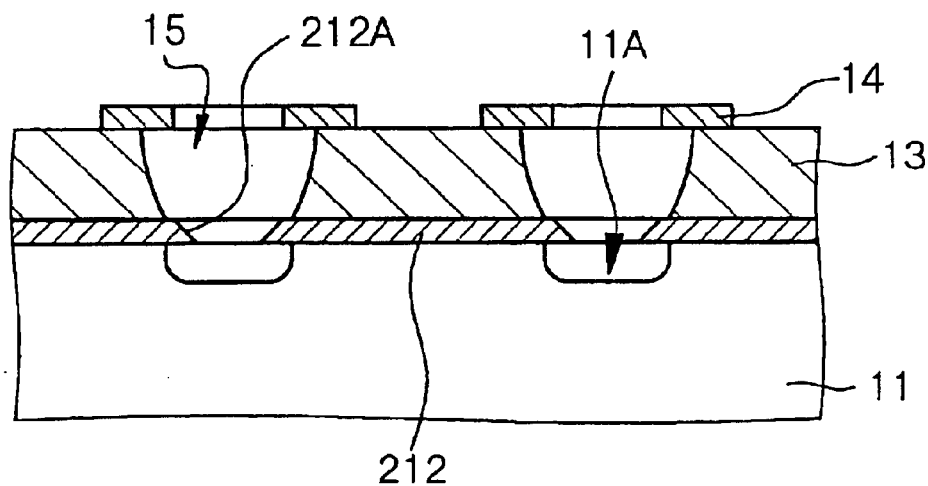
Figure 25C:
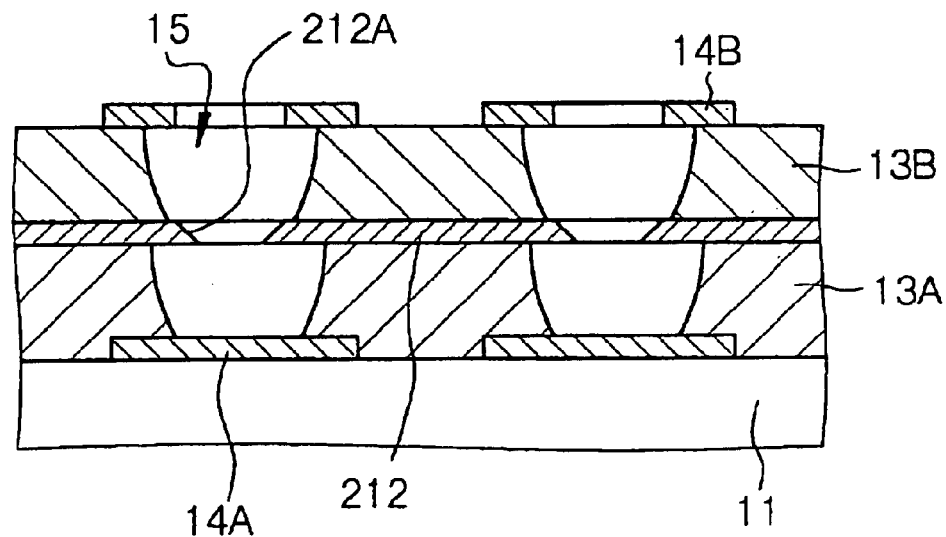

As shown in FIG. 25B, a concave portion 11A may be formed in the substrate 11 below the cathode electrode 212 inside the opening portion 15. Otherwise, as FIG. 25C shows a schematic partial cross-sectional view, the edge-type field emission device may comprise a first gate electrode 14A formed on the substrate 11; a first insulating layer 13A formed on the substrate 11 and the first gate electrode 14A; a cathode electrode 212 formed on the first insulating layer 13A; a second insulating layer 13B formed on the first insulating layer 13A and the cathode electrode 212; and a second gate electrode 14B formed on the first insulating layer 13B. And, an opening portion 15 is formed through the second gate electrode 14B, the second insulating layer 13B, the cathode electrode 212 and the first insulating layer 13A. An edge portion 212A of the cathode electrode 212 is exposed on a side wall of the opening portion 15. A voltage is applied to the cathode electrode 212 and the first and second gate electrodes 14A and 14B, whereby electrons are emitted from the edge portion 212A of the cathode electrode 212.

Figure 26A:
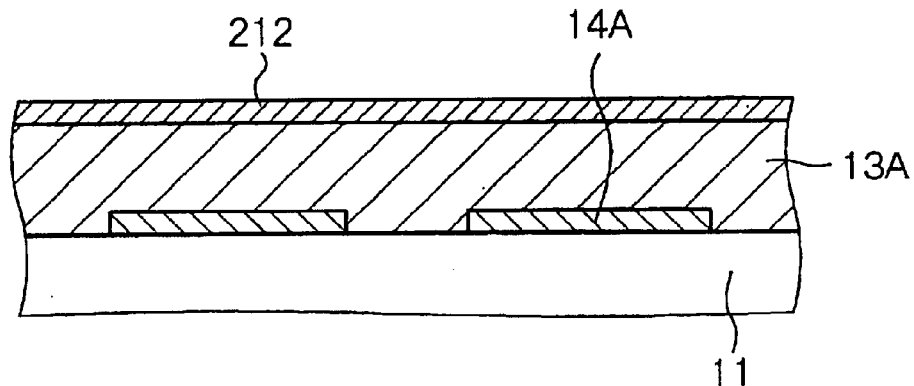
FIGS. 26A, 26B and 26C are schematic partial end views of a substrate, etc., for explaining the method for producing the cold cathode field emission device of Example 12 having the third structure of the edge-type cold cathode field emission device.
Figure 26B:
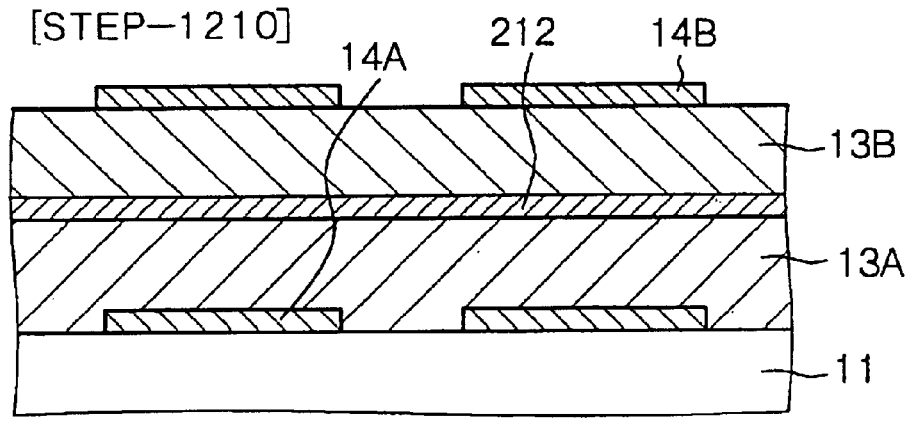
Figure 26C:
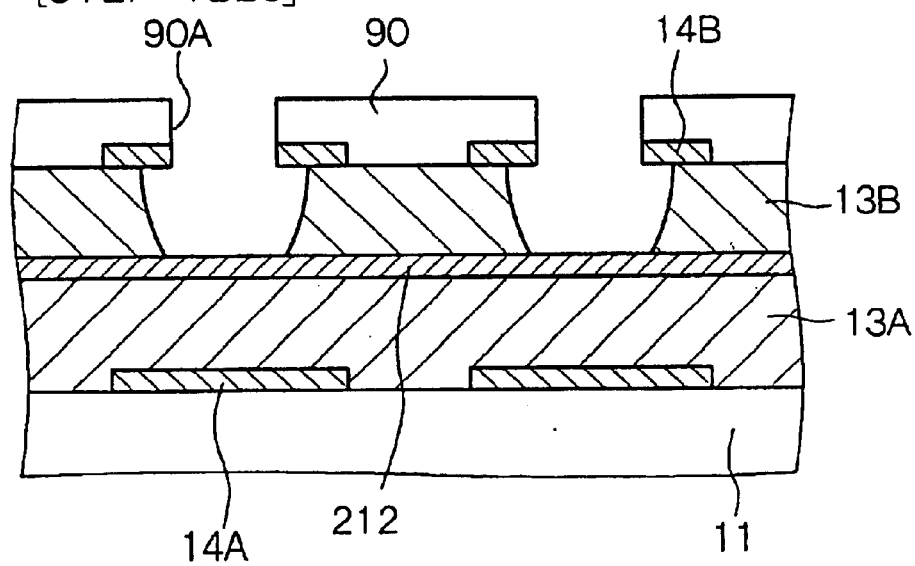

The method of producing the edge-type field emission device shown, for example, in FIG. 25C will be explained with reference to FIGS. 26A, 26B and 26C showing schematic partial end views of the substrate, etc.

[Step-1200]

First, an approximately 0.2 μm thick tungsten layer is formed on the substrate 11 made, for example, of glass by a sputtering method, and the tungsten layer is patterned by photolithography and a dry etching method, to form the first gate electrode 14A. Then, the first insulating layer 13A, which is made of $SiO_2$ and has a thickness of approximately 0.3 μm, is formed on the entire surface, and then the cathode electrode 212 made of tungsten in the form of a stripe is formed on the first insulating layer 13A (see FIG. 26A).

[Step-1210]

Then, the second insulating layer 13B, which, for example, is made of $SiO_2$ and has a thickness of 0.7 μm, is formed on the entire surface, and then the second gate electrode 14B in the form of a stripe is formed on the second insulating layer 13B (see FIG. 26B). The material for the second gate electrode 14B may be the same as, or different from, the material for the first gate electrode 14A.

[Step-1220]

Then, a resist layer 90 is formed on the entire surface, and a resist opening portion 90A is formed in the resist layer 90 such that part of the surface of the second gate electrode 14B is exposed. The resist opening portion 90A has a rectangular form when viewed as a plan view. The rectangular form has a major side length of approximately 100 μm and a minor side length of several μm to 10 μm. Then, the second gate electrode 14B exposed in the bottom portion of the resist opening portion 90A is anisotropically etched, for example, by an RIE method, to form an opening portion. Then, the second insulating layer 13B exposed in the bottom portion of the opening portion is isotropically etched to form an opening portion (see FIG. 26C). Since the second insulating layer 13B is made of $SiO_2$, wet etching is carried out using a buffered hydrofluoric acid aqueous solution. The side wall surface of the opening portion formed in the second insulating layer 13B recedes from the opening end portion of the opening portion formed in the second gate electrode 14B. In this case, the recess amount can be controlled by adjusting the etching time period. In this embodiment, the wet etching is carried out until the lower end of the opening portion formed in the second insulating layer 13B recedes from the opening end portion of the opening portion formed in the second gate electrode 14B.

The cathode electrode 212 exposed in the bottom portion of the opening portion is dry-etched under a condition where ions are used as main etching species. In the dry-etching using ions as main etching species, ions as charged particles can be accelerated by applying a biased voltage to an object to be etched or utilizing interaction of plasma and a magnetic field, and generally, anisotropic etching proceeds, so that the etched object has a perpendicular wall as a processed surface. In this step, however, the main etching species in plasma contains some incidence components having angles different from the perpendicularity, and obliquely entering components are also generated due to scattering on the end portion of the opening portion, so that, at some probability, main etching species enter regions which ion originally should not reach since the regions are shielded by the opening portion. In this case, main etching species having a smaller incidence angle with regard to the normal of the substrate 11 show a higher entering probability, and main etching species having a larger incidence angle show a lower entering probability.

Therefore, while the position of upper end portion of the opening portion formed in the cathode electrode 212 is nearly lined up with the lower end portion of the opening portion formed in the second insulating layer 13B, the position of the lower end portion of the opening portion formed in the cathode electrode 212 is projected from the upper end portion thereof. That is, the thickness of the edge portion 212A of the cathode electrode 212 decreases toward the forward end portion in the projection direction, and the edge portion 212A is sharpened. For example, when $SF_6$ is used as an etching gas, the cathode electrode 212 can be excellently processed.

The first insulating layer 13A exposed in a bottom portion of the opening portion formed in the cathode electrode 212 is isotropically etched, to form an opening portion in the first insulating layer 13A, whereby the opening portion 15 is completed. In this embodiment, wet etching is carried out using a buffered hydrofluoric acid aqueous solution. The side wall surface of the opening portion formed in the first insulating layer 13A recedes from the lower end portion of the opening portion formed in the cathode electrode 212. In this case, the recess amount can be controlled by adjusting the etching time period. After the completion of the opening portion 15, the resist layer 90 is removed, whereby the constitution shown in FIG. 25C can be obtained.

Example 13

Figure 27:
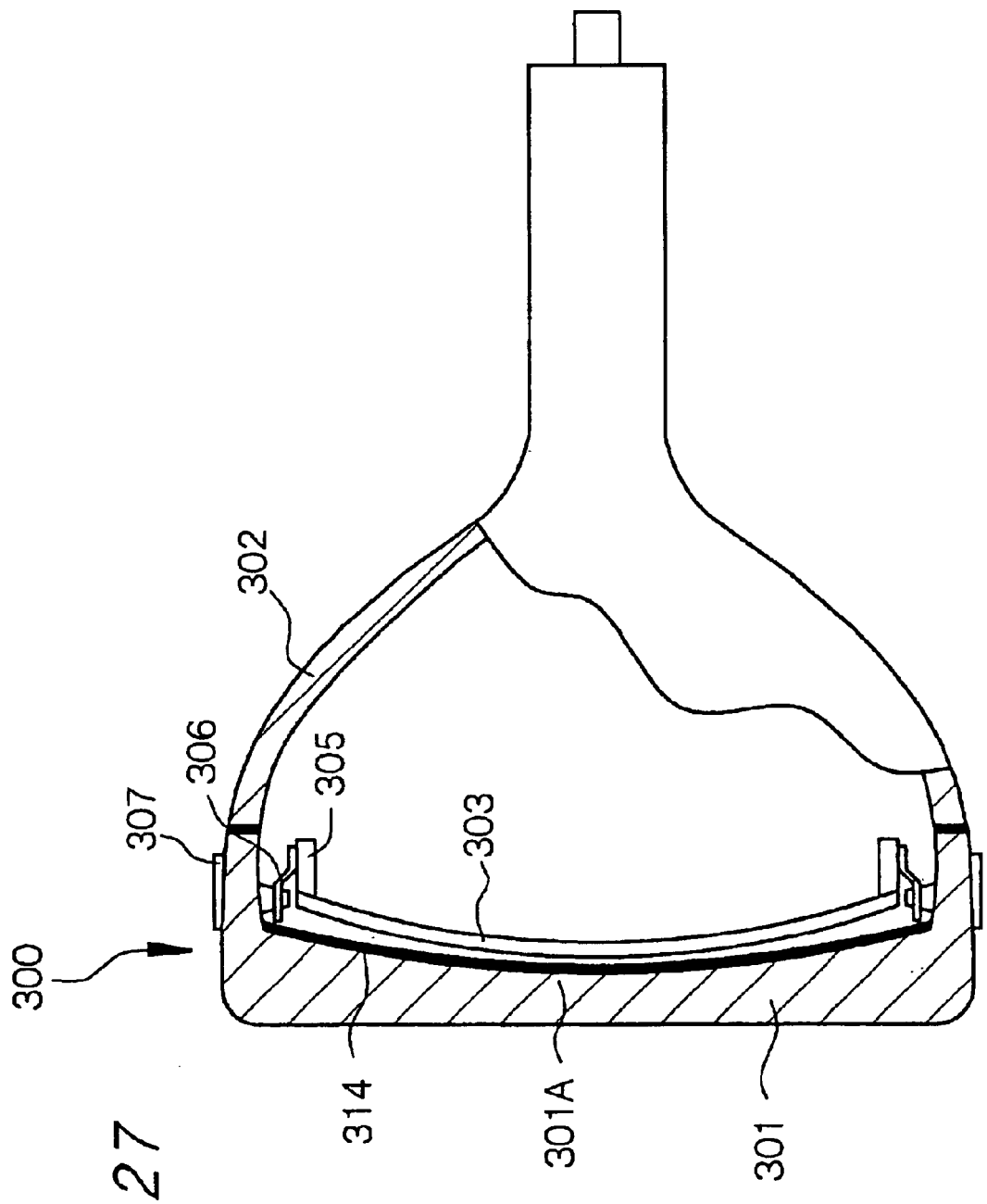
FIG. 27 is a schematic partial cut-off view of a color television glass bulb.
Figure 28:
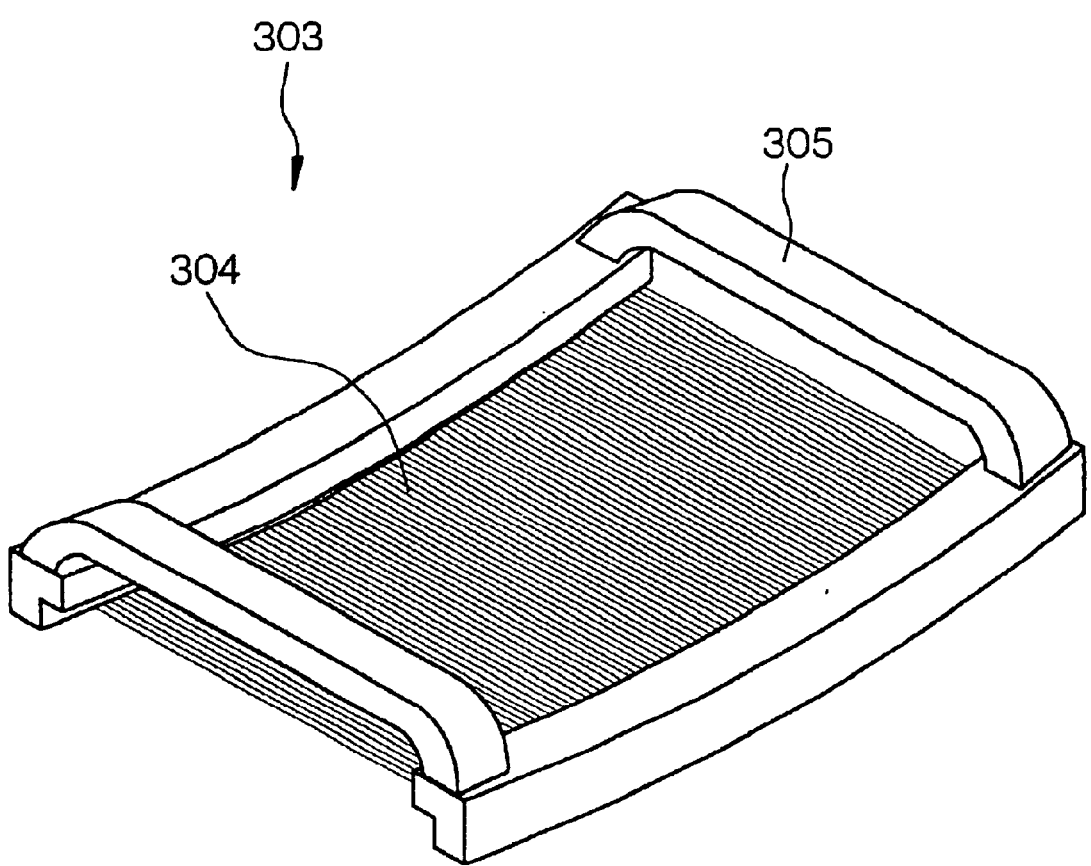
FIG. 28 is a schematic perspective view of a color selection member of an aperture grille type.

In Example 13, the luminescence crystal particles of the present invention are applied to a cathode ray tube. Further, the display panel is used as a face plate of the cathode ray tube. FIG. 27 shows a schematic partial cut-off view of a color television glass bulb. As shown in FIG. 27, a face plate 300 is formed by bonding a glass panel 301 and a funnel 302 with a glass adhesive. A tension band 307 is wound around the glass panel 301 near the funnel 302, to increase the strength of the color television glass bulb. As shown in the schematic perspective view of FIG. 28, a color selection member 303 has slits 304. The aperture grille type color selection member 303 is attached to a frame member 305 by a resistance welding method or a laser welding method in a state where a tension is applied thereto in the extending direction of the slits 304. The frame member 305 is removably attached to the glass panel 301 with an attaching tool 306 made of a spring. Phosphor layers 314 are formed in an inner surface 301A of the glass panel 301. The phosphor layers 314 are formed of the luminescence crystal particles explained in Example 1. A metal back layer is formed on the phosphor layers 314. However, showing of the metal back layer is omitted.

Figure 29A:
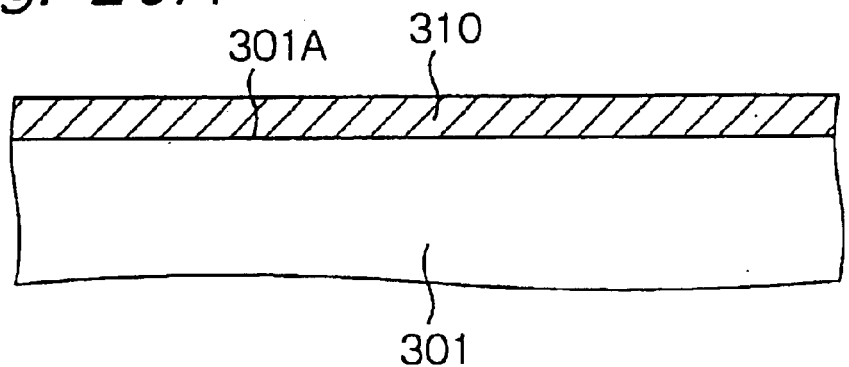
FIGS. 29A, 29B and 29C are schematic partial end views of a face plate, etc., for explaining processes of producing a color television glass bulb.
Figure 29B:
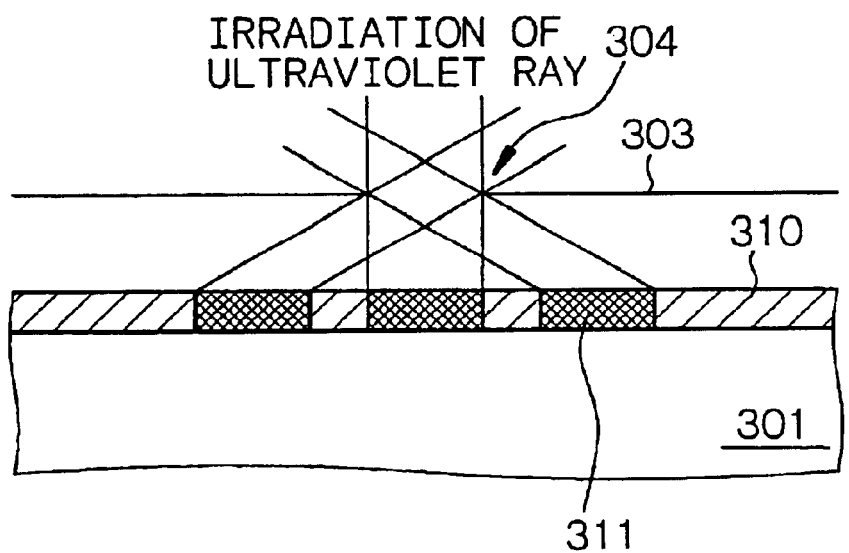
Figure 29C:
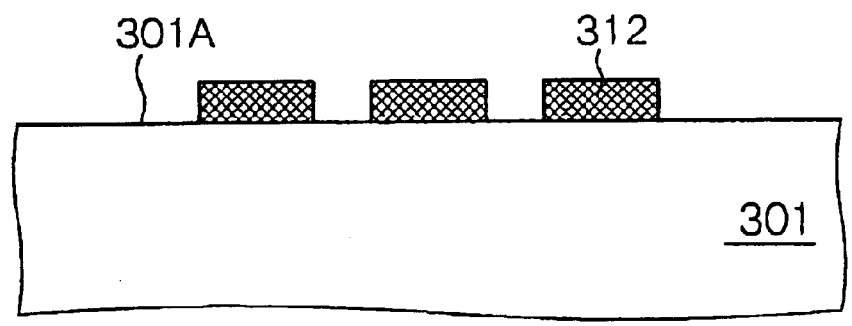
Figure 30A:
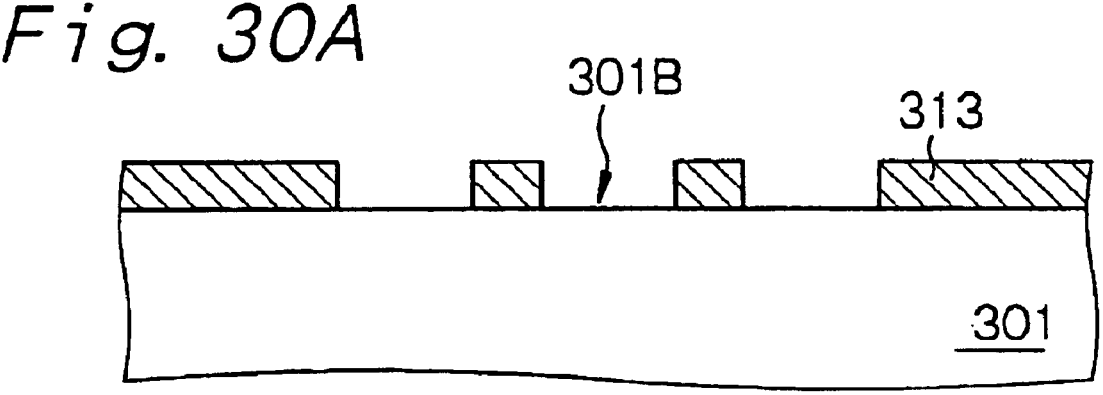
FIGS. 30A and 30B, following
Figure 30B:
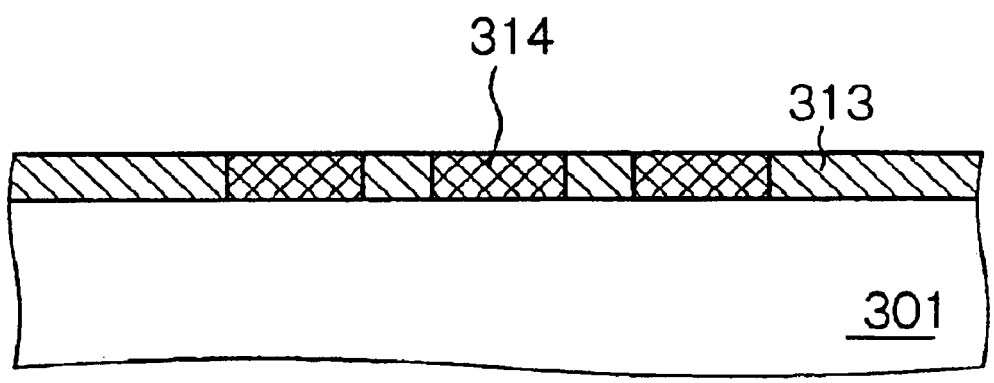

The method for producing the face plate, particularly, the method for forming the phosphor layers 314, will be explained with reference to FIGS. 29A, 29B, 29C, 30A and 30B showing schematic partial end views of the glass panel, etc. The stripe-shaped color phosphor layers are formed with the glass panel 301 having the aperture grille type color selection member 303 having the stripe-shaped slits 304 extending in parallel with the perpendicular direction of the glass panel 301. The color selection member 303 is shown in FIG. 29B alone.

First, a photosensitive coating 310 is applied to the inner surface 301A of the glass panel 301 and dried (see FIG. 29A), and then a stripe-shaped exposure region 311 is formed in the photosensitive coating 310 with an ultraviolet ray which is radiated from a light source (not shown) and passes through the stripe-shaped slit 304 (see FIG. 29B). The above exposure treatment is carried out three times by changing the light source in position for forming the phosphor layers for red, green and blue. Then, the photosensitive coating 310 is developed to selectively remove it, and a remaining portion (exposed and developed photosensitive coating) 312 is retained on the inner surface 301A of the glass panel 301 (see FIG. 29C). Then, a carbon agent is applied to the entire surface, and the remaining photosensitive coating 312 and the carbon agent thereon are removed by a lift-off method, to form stripe-shaped black matrices 313 made of the carbon agent (see FIG. 30A). Then, the stripe-shaped phosphor layers 314 for red, green and blue are formed on the exposed inner surface 301B of the glass panel 301 (exposed inner surface portion 301B between the black matrices 313 in the face plate 301) (see FIG. 30B). Specifically, luminescence crystal particle compositions prepared from the luminescence crystal particles (phosphor particles) explained in Example 1 are used, and for example, a red photosensitive luminescence crystal particle composition (phosphor slurry) can be applied to the entire surface, exposed to light and developed, then, a green photosensitive luminescence crystal particle composition (phosphor slurry) can be applied to the entire surface, exposed to light and developed, and then a blue photosensitive luminescence crystal particle composition (phosphor slurry) is applied to the entire surface, exposed to light and developed.

The color selection member may be a dot type shadow mask type or a slot type shadow mask type color selection member.

Example 14

Figure 31:
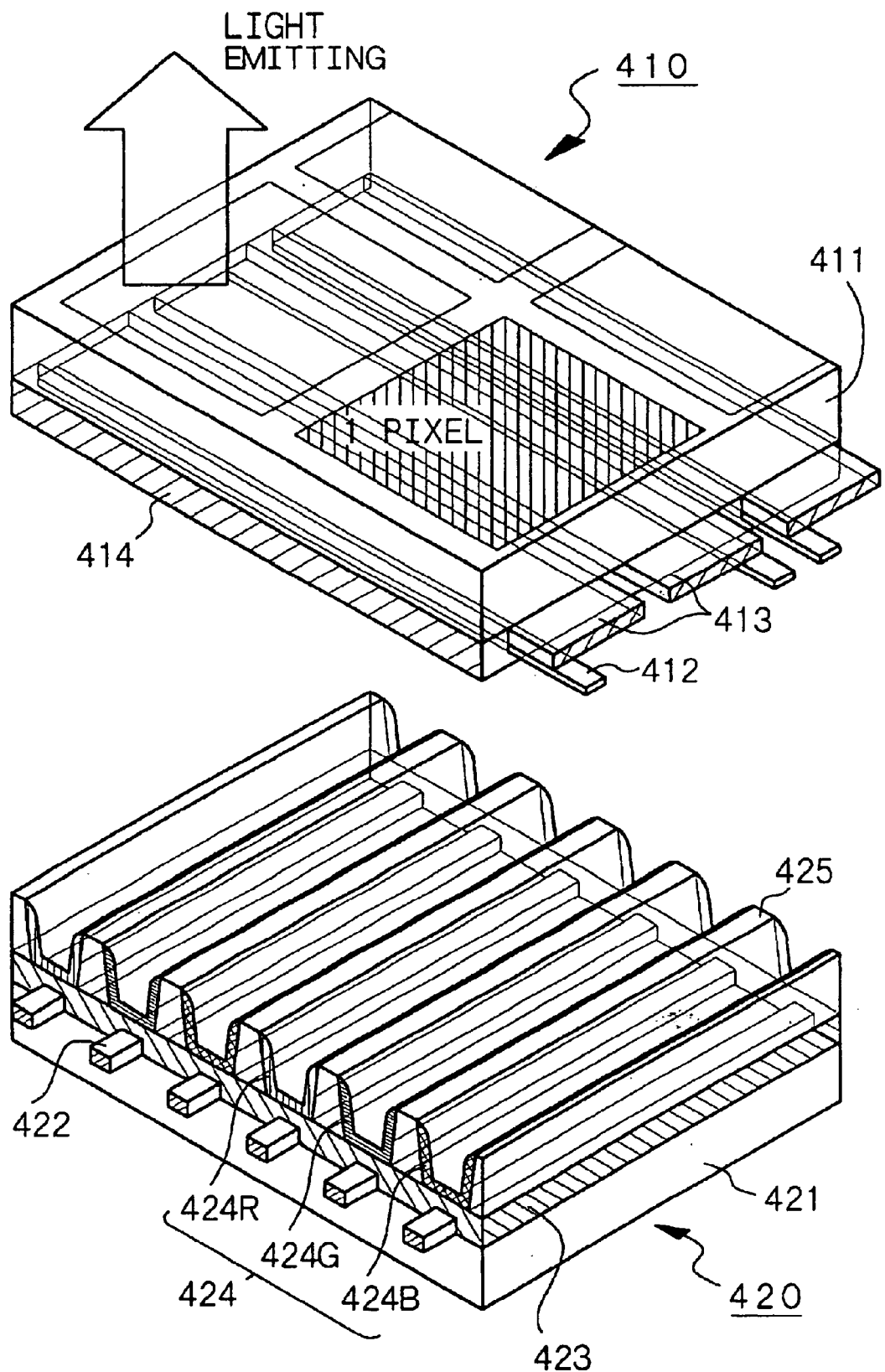
FIG. 31 is a conceptual exploded perspective view of a plasma display.
Figure 32:
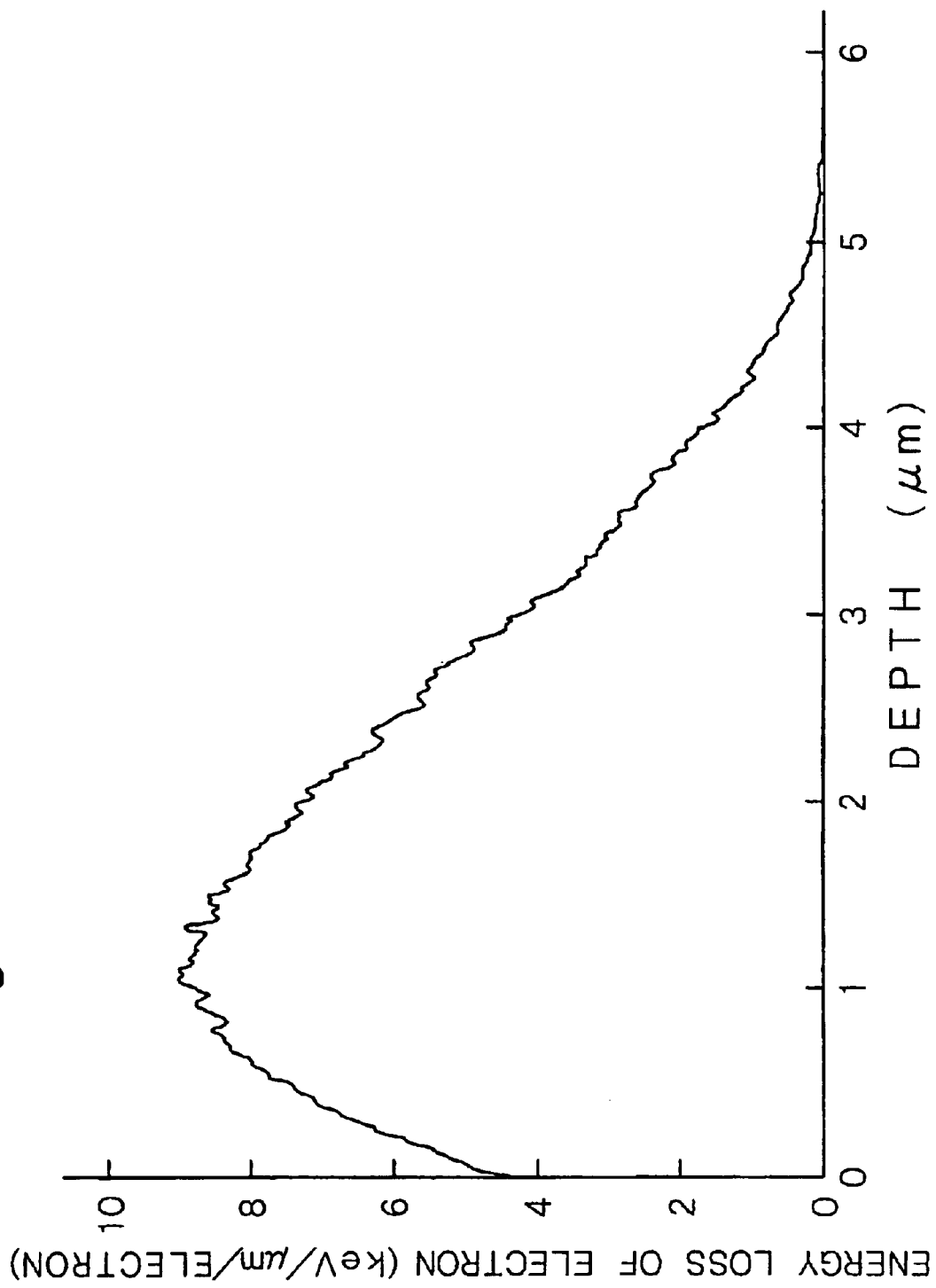
FIG. 32 is a graph showing a result of Monte Carlo simulation with regard to a relationship between an energy loss of electrons which have entered the phosphor layer and the electron penetration depth into the phosphor layer on the basis of the Bethe expression when the accelerating voltage is set at 31.5 kilovolts and when the phosphor layer is made of ZnS.
Figure 33:
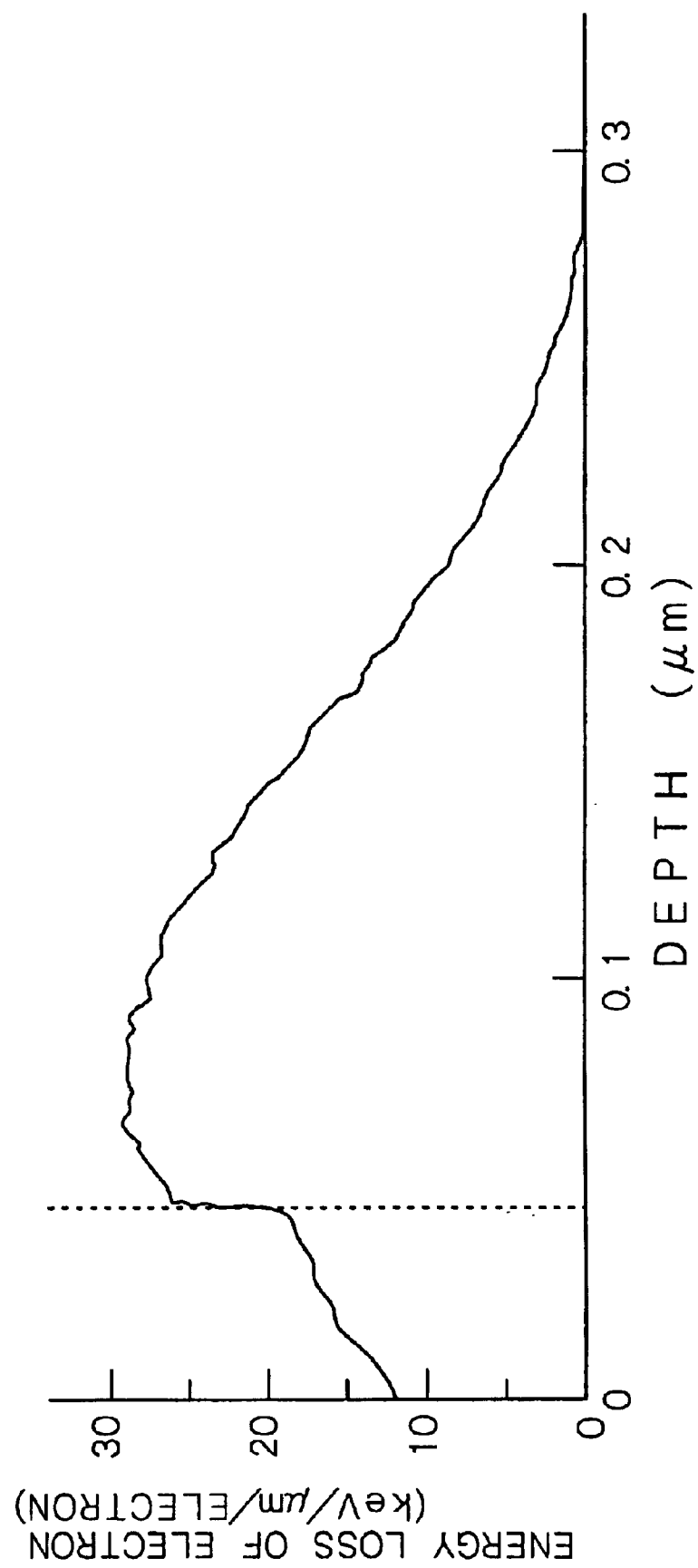
FIG. 33 is a graph showing a result of Monte Carlo simulation with regard to a relationship between an energy loss of electrons which have entered the phosphor layer and the electron penetration depth into the phosphor layer on the basis of the Bethe expression when the accelerating voltage is set at 6 kilovolts and when the phosphor layer is made of ZnS.
Figure 34:
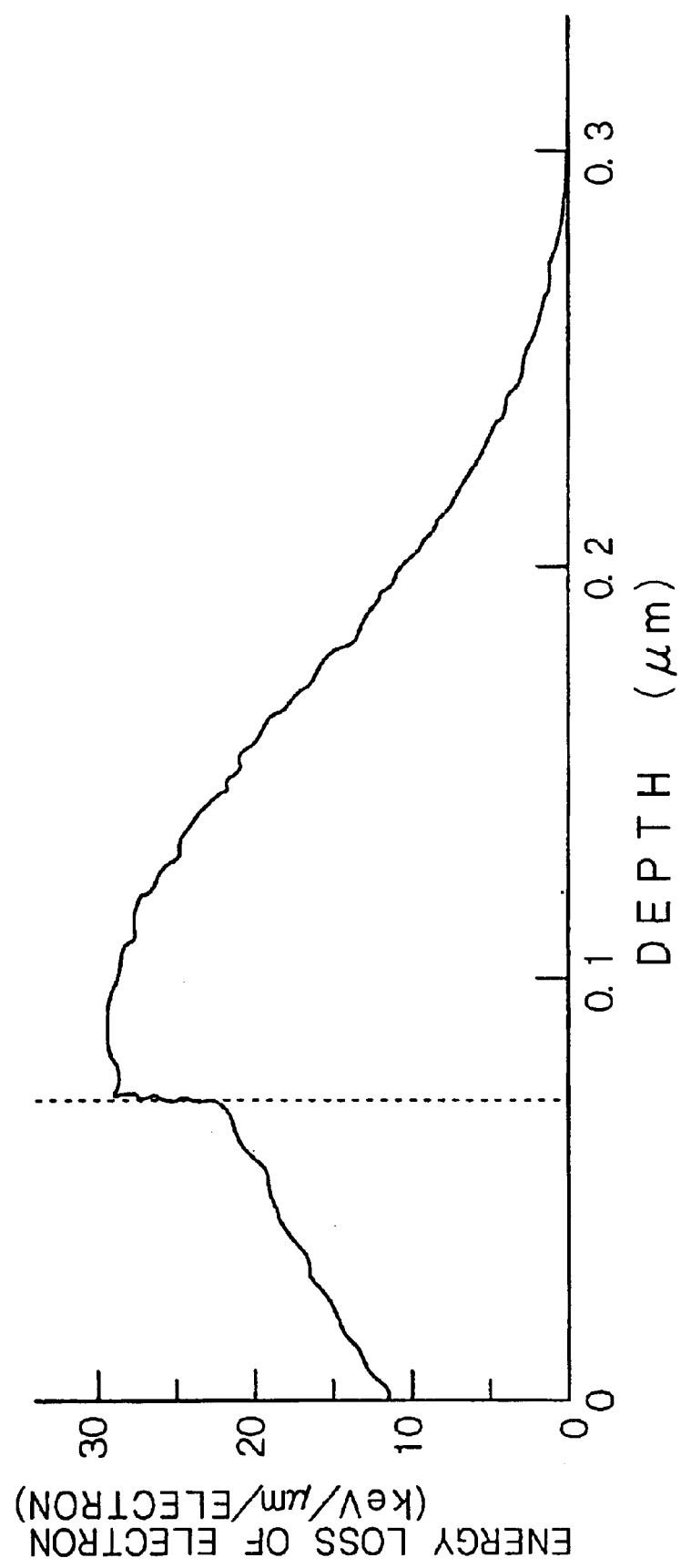
FIG. 34 is a graph showing a result of Monte Carlo simulation with regard to a relationship between an energy loss of electrons which have entered the phosphor layer and the electron penetration depth into the phosphor layer on the basis of the Bethe expression when the accelerating voltage is set at 6 kilovolts and when the phosphor layer is made of ZnS.
Figure 35:
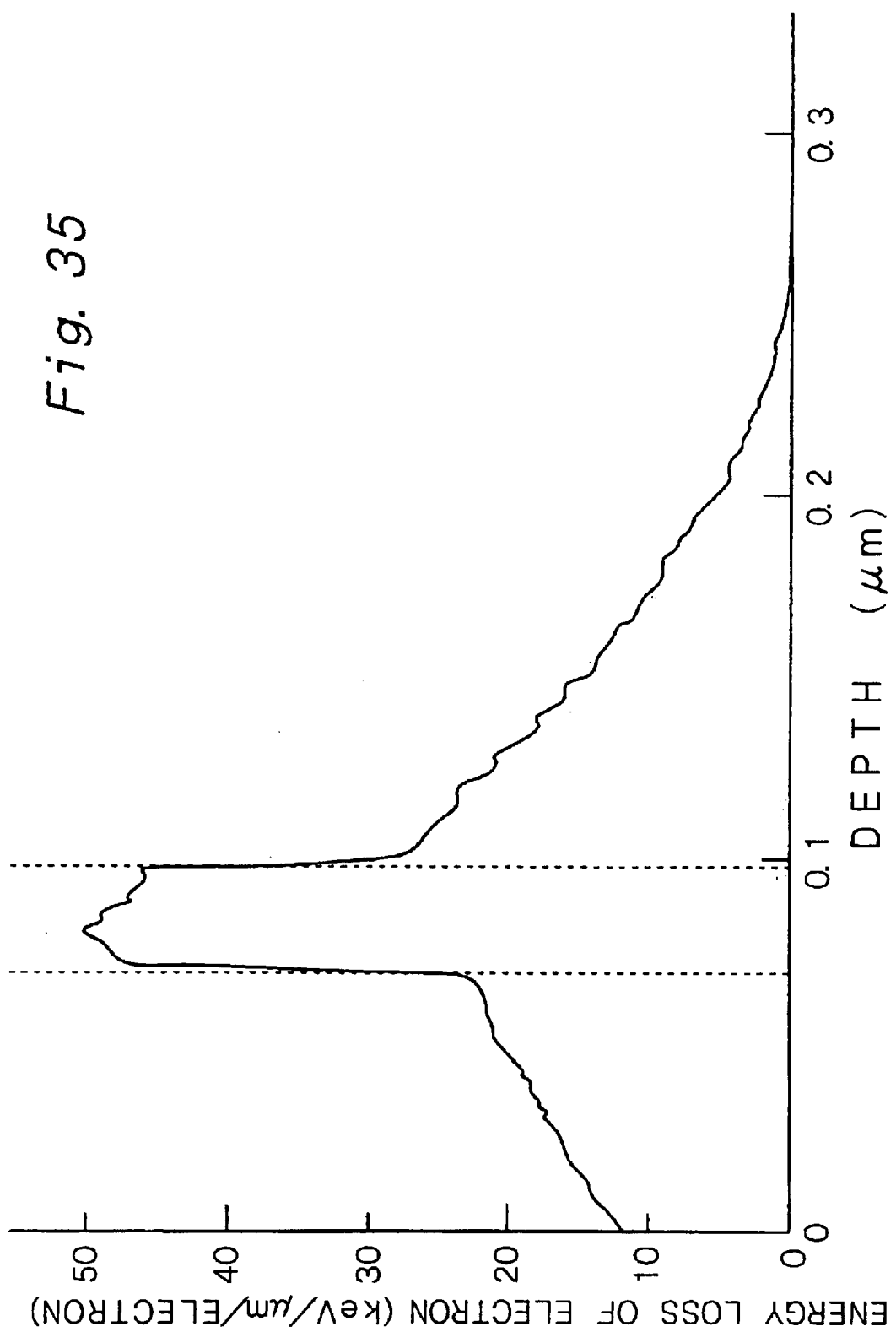
FIG. 35 shows a result of Monte Carlo simulation with regard to a relationship between an energy loss of electrons which have entered the phosphor layer and the electron penetration depth into the phosphor layer on the basis of the Bethe expression when the accelerating voltage is set at 6 kilovolts and when the phosphor layer is made of Zn and ZnS.

In Example 14, the luminescence crystal particles of the present invention are applied to a plasma display (PDP). FIG. 31 shows a typical constitution of an Ac plasma display. This AC plasma display comes under a so-called three-electrode type, and discharge takes place between a pair of discharge sustain electrodes 413. The AC plasma display shown in FIG. 31 is formed by bonding a front panel 410 and a rear panel 420 in circumferential portions. Light emission of phosphor layers 424 on the rear panel 420 is observed through the front panel 410.

The front panel 410 comprises a transparent first substrate 411; a plurality of pairs of discharge sustain electrodes 413 formed on the first substrate 411 in the form of stripes and made of a transparent electrically conductive material; bus electrodes 412 provided for decreasing the impedance of the discharge sustain electrodes 413 and made of a material having a lower electric resistance than the discharge sustain electrodes 413; and a protective layer 414 which is formed on the first substrate 411, the bus electrodes 412 and the discharge sustain electrodes 413 and which works as a dielectric film.

The rear panel 420 comprises a second substrate 421; address electrodes (also called data electrodes) 422 formed on the second substrate 421 in the form of stripes; a dielectric film 423 formed on the second substrate 421 and the address electrodes 422; insulating separation walls 425 each of which exists in a region on the dielectric film 423 and between one address electrode 422 and neighboring another address electrode 422 and extends in parallel with the address electrodes 422; and phosphor layers 424 each of which is formed on the dielectric film 423 and extends over side walls of the separation walls 425. The phosphor layers 424 are constituted of red phosphor layers 424R, green phosphor layers 424G and blue phosphor layers 424B, and the phosphor layers 424R, 424G and 424B for these colors are formed in a predetermined order. These phosphor layers 424R, 424G and 424B are made of the luminescence crystal particles explained in Example 1. The method for forming the phosphor layers includes a thick-film printing method in which luminescence crystal particle compositions containing the luminescence crystal particles (phosphor particles) explained in Example 1 are used, a method in which the phosphor particles are sprayed, a method in which an adhesive material is attached, beforehand, to a site where the phosphor layers are to be formed and the phosphor particles are bonded, a method in which photosensitive luminescence material paste is used and the phosphor layers are patterned by exposure and development, and a method in which the phosphor layers are formed on the entire surface and unnecessary portions are removed by a sand blasting method.

FIG. 31 shows an exploded perspective view, and in an actual embodiment, the top portion of each separation wall 425 on the rear panel side is in contact with the protective layer 414 on the front panel side.

A region where a pair of the discharge sustain electrodes 413 and the address electrode 422 positioned between two separation walls 425 overlap corresponds to a discharge cell. A space surrounded by neighboring separation walls 425, the phosphor layer 424 and the protective layer 414 is charged with a rare gas.

The extending direction of the discharge sustain electrodes 413 and the extending direction of the address electrodes 422 make an angle of 90 degrees, and a region where a pair of the discharge sustain electrodes 413 and one set of the phosphor layers 424R, 424G and 424B for emitting light in three primary colors overlap corresponds to one pixel. Glow discharge takes place between a pair of the discharge sustain electrodes 413, so that the plasma display of this type is called "surface discharge type". In each discharge cell, the phosphor layer excited upon irradiation with a vacuum ultraviolet ray generated by glow discharge in the rare gas emits light in a color characteristic of the luminescence material. A vacuum ultraviolet ray having a wavelength dependent upon the type of the closed rare gas is generated. As a rare gas, He (wavelength of resonance line=58.4 nm), Ne (ditto=74.4 nm), Ar (ditto=107 nm), Kr (ditto=124 nm) and Xe (ditto=147 nm) can be used alone or as a mixture. However, a mixed gas is particularly useful since a decrease in the discharge start voltage based on a Penning effect can be expected. Examples of the above mixed gas includes Ne—Ar mixed gas, He—Xe mixed gas and Ne—Xe mixed gas. Of these rare gases, Xe having the longest resonance line wavelength is suitable since it also radiates intense vacuum ultraviolet ray having a wavelength of 172 nm.

The present invention has been explained on the basis of Examples hereinabove, while the present invention shall not be limited thereto. The structures and the constitutions of the flat-panel display, the cathode ray tube, the plasma display, the cold cathode field emission display and the cold cathode field emission device, the composition of the luminescence crystal particles and the method for preparation thereof are shown as examples and can be altered or modified as required. Further, the method of production of each of the flat-panel display, the cold cathode field emission device and the cathode ray tube are also shown as examples and may be altered or modified as required.

Further, those various materials used in the production of the cold cathode field emission devices are also shown as examples and may be altered or modified as required. In the cold cathode field emission devices, the embodiment in which one electron-emitting portion is principally related to one opening portion has been explained. In some structures of the cold cathode field emission device, however, there may be employed a constitution in which a plurality of the electron-emitting portions are related to one opening portion or a constitution in which one electron-emitting portion is related to a plurality of the opening portions.

Further, there may be structured a cold cathode field emission device having a constitution in which the electron-emitting portions are formed on the substrate, gate electrode supporting portions are also formed on the substrate, and stripe-shaped electrically conductive material foils having a plurality of holes are disposed in a state where they are supported on the gate electrode supporting portions so that a plurality of the holes are positioned above the electron-emitting region, whereby the gate electrode which is made of the stripe-shaped electrically conductive material foil and has a plurality of holes is positioned above the electron-emitting region.

Further, the electron-emitting region can be also constituted of devices generally called surface conduction type field emission devices. The surface conduction type field emission device comprises a substrate made of glass and pairs of electrodes formed on the substrate in the form of matrix, the electrodes being made of an electrically conductive material such as tin oxide ($SnO_2$), gold (Au), indium oxide ($In_2O_3$)/tin oxide ($SnO_2$), carbon or palladium oxide (PdO) and having a fine area and a pair of the electrodes being arranged at constant intervals (gaps). A carbon thin film is formed on each electrode. A row-direction wiring is connected to one electrode of a pair of the electrodes, and a column-direction wiring is connected to the other electrode. When a voltage is applied to a pair of the electrodes, an electric field is applied to the carbon thin films opposed to each other through the gap, and electrons are emitted from the carbon thin film. Such electrons are allowed to collide with a luminescence layer on a display panel (anode panel) to excite the luminescence layer, whereby a desired image can be obtained.

In the present invention, since the crystal defect density in a region located from the surface of the luminescence crystal particle to a portion as deep as the energy beam enters and reaches or the electrons enter and reach (region of the luminescence crystal particle which region substantially contributes to luminescence) is defined, not only the luminescence efficiency of the luminescence crystal particles can be improved but also the deterioration of the luminescence crystal particles can be prevented. As a result, the deterioration of the brightness, for example, of the flat-panel display with elapse of time can be decreased to such an extent that the deterioration causes almost no problems in practical use.

What is claimed is:

1. A luminescence crystal particle which emits light upon irradiation with an energy beam and which has a crystal defect density of $5 \times 10^7$ defects/$cm^2$ or less in a region located from the surface of the luminescence crystal particle to a portion as deep as the energy beam reaches.

2. The luminescence crystal particle according to claim 1, in which the crystal defect density in a region located from the surface of the luminescence crystal particle to a portion as deep as the energy beam reaches is $1 \times 10^7$ defects/$cm^2$ or less.

3. The luminescence crystal particle according to claim 1, in which the luminescence crystal particle is a phosphor particle.

4. The luminescence crystal particle according to claim 1, in which the energy beam is an electron beam.

5. The luminescence crystal particle according to claim 4, in which the energy of the electron beam for irradiation of the luminescence crystal particle is 0.5 keV to 35 keV.

6. The luminescence crystal particle according to claim 4, in which the energy of the electron beam for irradiation of the luminescence crystal particle is 0.5 keV to 10 keV and the electron penetration depth from the surface of the luminescence crystal particle is 0.5 $\mu$m or less.

7. The luminescence crystal particle according to claim 1, in which the energy beam is an ultraviolet ray.

8. The luminescence crystal particle according to claim 7, in which the ultraviolet ray for irradiation of the luminescence crystal particle has a wavelength of 100 nm to 400 nm.

9. The luminescence crystal particle according to claim 1, in which the average particle diameter of the luminescence crystal particle is $1 \times 10^{-8}$ m to $1 \times 10^{-5}$ m.

10. The luminescence crystal particle according to claim 1, in which the luminescence crystal particle has an average surface roughness of 5 nm or less.

11. A display panel comprising a support member, a luminescence layer made of luminescence crystal particles which emit light upon irradiation with electrons flying from a vacuum space, and an electrode, said luminescence crystal particle having a crystal defect density of $5\times10^7$ defects/cm$^2$ or less in a region located from the surface of the luminescence crystal particle to a portion as deep as the electrons reach.

12. A flat-panel display having a display panel and a back panel having a plurality of electron-emitting regions, wherein the display and the back panel face each other through a vacuum space, said display panel comprising a support member, a luminescence layer made of luminescence crystal particles which emit light upon irradiation with electrons flying from the electron-emitting region, and an electrode, and said luminescence crystal particle having a crystal defect density of $5\times10^7$ defects/cm$^2$ or less in a region located from the surface of the luminescence crystal particle to a portion as deep as the electrons reach.

13. The flat-panel display according to claim 12, in which each electron-emitting region comprises one cold cathode field emission device or a plurality of cold cathode field emission devices, said cold cathode field emission device comprises;

(A) a substrate, (B) a stripe-shaped cathode electrode formed on the substrate, (C) an insulating layer formed on the substrate and the cathode electrode, (D) a stripe-shaped gate electrode formed on the insulating layer, (E) an opening portion penetrating through the gate electrode and the insulating layer, and (F) an electron-emitting portion formed on a portion of the cathode electrode which portion is positioned in the bottom portion of the opening portion, and the electron-emitting portion exposed in the bottom portion of the opening portion is for emitting electrons.

14. The flat-panel display according to claim 12, in which each electron-emitting region comprises one cold cathode field emission device or a plurality of cold cathode field emission devices, said cold cathode field emission device comprises;

(A) a substrate, (B) a stripe-shaped cathode electrode formed on the substrate, (C) an insulating layer formed on the substrate and the cathode electrode, (D) a stripe-shaped gate electrode formed on the insulating layer, and (E) an opening portion penetrating through the gate electrode and the insulating layer, the cathode electrode being exposed in the bottom portion of the opening portion, and the portion of the cathode electrode which portion is exposed in the bottom portion of the opening portion is for emitting electrons.

15. The flat-panel display according to claim 12, in which each electron-emitting region comprises one cold cathode field emission device or a plurality of cold cathode field emission devices, said cold cathode field emission device comprises;

(A) a substrate, (B) a stripe-shaped cathode electrode having an edge portion formed on or above the substrate, (C) an insulating layer formed at least on the cathode electrode, (D) a stripe-shaped gate electrode formed on the insulating layer, and (E) an opening portion penetrating through at least the gate electrode and the insulating layer, and the edge portion of the cathode electrode which edge portion is exposed in the bottom portion or the side wall of the opening portion is for emitting electrons.

16. A luminescence crystal particle composition comprising a dispersion of luminescence crystal particles which emit light upon irradiation with an energy beam and each of which has a crystal defect density of $5\times10^7$ defects/cm$^2$ or less in a region located from the surface of the luminescence crystal particle to a portion as deep as the energy beam reaches, in a dispersing medium.

* * * * *